US007825199B1

(12) United States Patent
Matyjaszewski et al.

(10) Patent No.: US 7,825,199 B1
(45) Date of Patent: Nov. 2, 2010

(54) CATALYTIC PROCESSES FOR THE CONTROLLED POLYMERIZATION OF FREE RADICALLY (CO)POLYMERIZABLE MONOMERS AND FUNCTIONAL POLYMERIC SYSTEMS PREPARED THEREBY

(75) Inventors: Krzysztof Matyjaszewski, Pittsburgh, PA (US); Scott G. Gaynor, Pittsburgh, PA (US); Hyun-jong Paik, Pittsburgh, PA (US); Tomislav Pintauer, Pittsburgh, PA (US); Jeff Pyun, Pittsburgh, PA (US); Jian Qiu, Pittsburgh, PA (US); Mircea Teodorescu, Bucharest (RO); Jianhui Xia, Pittsburgh, PA (US); Xuan Zhang, Woburn, MA (US); Peter J. Miller, Imperial, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/534,827

(22) Filed: Mar. 23, 2000

Related U.S. Application Data

(60) Provisional application No. 60/142,980, filed on Jul. 12, 1999, provisional application No. 60/125,809, filed on Mar. 23, 1999.

(51) Int. Cl.
*C08F 4/00* (2006.01)
*C08F 4/44* (2006.01)
*C08F 4/06* (2006.01)
(52) U.S. Cl. ............... 526/90; 526/111; 526/135; 526/145; 526/146; 526/147
(58) Field of Classification Search .......... 526/90, 526/111, 135, 145, 146, 147
See application file for complete search history.

(56) References Cited

U.S. PATENT DOCUMENTS 3,183,217 A    5/1965    Serniuk et al.

(Continued)

FOREIGN PATENT DOCUMENTS

EP          0341012          11/1989

(Continued)

OTHER PUBLICATIONS

Patten et al., "Atom Transfer Radical Polymerization and the Synthesis of Polymeric Materials", Advanced Materials 1998, 10 No. 12, p. 901-915.*

(Continued)

*Primary Examiner*—William K Cheung
(74) *Attorney, Agent, or Firm*—K&L Gates LLP

(57) ABSTRACT

Further improvements have been made in processes for controlled polymerization of free radically (co)polymerizable monomers mediated by a transition metal complex participating in a redox reaction which involves transfer of a radically transferable atom or group to and from an initiator or dormant polymer and the growing active polymer chain ends. Two improvements involve the choice of counterion in the transition metal complex. In one improvement the transition metal is held in close conjunction with a solid support through interaction with a counterion directly attached to the support. This cognition also allows for improvements in catalyst utilization including catalyst recovery and recycle. In another improvement, particularly suitable for controlled polymerization of certain monomers with an expanded range of transition metals, the function of counterion and ligand in the development of the transition metal based catalyst is superseded by use of salt containing a soluble organic counterion. These and other process improvements have been employed to prepare an extended range of novel polymeric materials and novel processes for the preparation of functional polymers including a novel catalytic Atom Transfer Coupling Reaction.

51 Claims, 17 Drawing Sheets

U.S. PATENT DOCUMENTS

| | | | |
|---|---|---|---|
| 3,959,225 | A | 5/1976 | Kuntz |
| 4,007,165 | A | 2/1977 | MacLeay et al. |
| 4,374,751 | A | 2/1983 | Dudgeon |
| 4,728,706 | A | 3/1988 | Farnham et al. |
| 4,940,648 | A | 7/1990 | Geiger |
| 4,954,416 | A | 9/1990 | Wright et al. |
| 5,089,135 | A | 2/1992 | Yoneyama et al. |
| 5,169,914 | A | 12/1992 | Kaszas et al. |
| 5,312,871 | A | 5/1994 | Mardare et al. |
| 5,405,913 | A | 4/1995 | Harwood et al. |
| 5,451,647 | A | 9/1995 | Faust et al. |
| 5,470,928 | A | 11/1995 | Harwood et al. |
| 5,510,307 | A | 4/1996 | Narayanan et al. |
| 5,763,548 | A | 6/1998 | Matyjaszewski et al. |
| 5,789,487 | A | 8/1998 | Matyjaszewski et al. |
| 5,807,937 | A | 9/1998 | Matyjaszewski et al. |
| 5,910,549 | A | 6/1999 | Matyjaszewski et al. |
| 5,945,491 | A * | 8/1999 | Matyjaszewski et al. .... 526/111 |
| 5,986,015 | A | 11/1999 | Midha et al. |
| 6,111,022 | A | 8/2000 | Matyjaszewski et al. |
| 6,121,371 | A | 9/2000 | Matyjaszewski et al. |
| 6,124,411 | A | 9/2000 | Matyjaszewski et al. |
| 6,162,882 | A | 12/2000 | Matyjaszewski et al. |
| 6,288,186 | B1 | 9/2001 | Matyjaszewski et al. |
| 6,407,187 | B1 | 6/2002 | Matyjaszewski et al. |
| 6,512,060 | B1 | 1/2003 | Matyjaszewski et al. |
| 6,538,091 | B1 | 3/2003 | Matyjaszewski et al. |
| 6,541,580 | B1 | 4/2003 | Matyjaszewski et al. |
| 6,624,262 | B2 | 9/2003 | Matyjaszewski et al. |
| 6,624,263 | B2 | 9/2003 | Matyjaszewski et al. |
| 6,627,314 | B2 | 9/2003 | Matyjaszewski et al. |

FOREIGN PATENT DOCUMENTS

| | | |
|---|---|---|
| EP | 0870809 | 10/1998 |
| WO | WO 98/01480 | 1/1998 |
| WO | WO 00/56795 | 9/2000 |

OTHER PUBLICATIONS

U.S. Appl. No. 10/269,556, filed Oct. 11, 2002.
U.S. Appl. No. 09/359,359, filed Jul. 23, 1999.
U.S. Appl. No. 09/972,056, filed Oct. 5, 2001.
U.S. Appl. No. 10/034,908, filed Dec. 21, 2001.
U.S. Appl. No. 10/118,519, filed Apr. 6, 2002.
U.S. Appl. No. 10/271,025, filed Oct. 15, 2002.
U.S. Appl. No. 10/289,545, filed Nov. 7, 2002.
Carter et al., "Polyimide Nanofoams From Phase-Separated Block Copolymers", Electrochemical Society Proceedings, 1997, pp. 32-43, vol. 97, No. 8, Electrochemical Society, Pennington, NJ, US.
Chen et al., "Pryolytic Behavior and In-Situ Paramagnetism of Starlike C60(CH3)x(PAN)xcopolymers", European Polymer Journal, Mar. 1, 1998, pp. 421-429, vol. 34, No. 3-4, Elsevier Science Ltd., Oxford, GB.
Dorota Greszta et al., "Gradient Copolymers of Styrene and Acrylonitrille Via Atom Transfer Radical Polymerization", Polymer Preprints, Apr. 1997, pp. 709-710, vol. 38(1).
Gromada, J.; Matyjaszewski, K. Macromolecules 2001, 34, 7664-7671.
Matyjaszewski, K.; Editor Controlled/Living Radical Polymerization. Progress in ATRP, NMP, and RAFT. In: ACS Symp. Ser., 2000; 768, 2000., Chapter 19 "Reverse Atom Transfer Radical Polymerization Using AIBN or BPO as Initiator" pp. 263-275.
Matyjaszewski, K.; Xia, J. Chem. Rev. 2001, 101, 2921-2990.
Qiu, J.; Matyjaszewski, K; Thouin, L.; Amatore, C. Macromol. Chem. Phys. 2000, 201, 1625-1631.
Queffelec, J.; Gaynor, S.G.; Matyjaszewski, K. Macromolecules 2000, 33, 8629-8639.
Seong Mu Jo et al, "Polyacrylonitrile with Low Polydispersities by Atom Transfer Radical Polymerization", Polymer Preprints, vol. 38(1) Apr. 1997, pp. 697-698.
Seong Mu Jo et al, "Effects of Various Copper Salts and Additives on Polymerization of Acrylonitrile by Atom Transfer Radical Polymerization", Polymer Preprints, vol. 38(1) Apr. 1997, pp. 699-700.
Takeichi et al., "Preparation of Porous Carbon Films by the Pyrolysis of Poly(Urethane-imide) Films and Their Pore Characteristics", Carbon, Feb. 2001, pp. 257-265, vol. 39, No. 2.
U. Schubert et al., "Design of Effective Systems for Controlled Radical Polymerization of Styrene: Application of 4,4'-Dimethyl and 5,5'-Dimethyl 2,2'-Bipyridine Copper(ii) Complexes", Macromol. Rapid Commun., vol. 20, No. 6, pp. 351-355, 1999.
Wang et al., "Living"/Controlled Radical Polymerization, Transition-Metal-Catalyzed Atom Transfer Radical Polymerization in the Presence of a Conventional Radical Initiator, Macromolecules, 1995, vol. 28, pp. 7572-7573.
Wang, J.-S.; Matyjaszewski, K., J. Am. Chem. Soc. 1995, 117, 5614-5615.
Jin-Shan Wang and Krzysztof Matyjaszewski, Controlled/"Living" Radical Polymerization. Halogen Atom Transfer Radical Polymerization Promoted by a Cu(I)/Cu(II) Redox Process, Reprinted from Macromolecules, 1995, 28. Department of Chemistry, Carnegie Mellon University. Received May 2, 1995; Revised Manuscript Received Aug. 14, 1995.
Kyung-Youl Baek, Masami Kamigaito and Mitsuo Sawamoto, *Synthesis of Star-Shaped Polymers with Divinyl Compounds by Metal-Catalyzed Living Radical Polymerization*, Department of Polymer Chemistry, Graduate School of Engineering, Kyoto University, Kyoto 606-8501, Japan, Polymer Preprints 472-473.
Yuzo Kotani, Masami Kamigaito and Mitsuo Sawamoto, *Living Random Copolymerization of Styrene and Methyl Methacrylate with a Ru(II) Complex and Synthesis of ABC-Type "Block-Random" Copolymers*, Macromolecules, 1998. Received Feb. 25, 1998; Revised Manuscript Received Jun. 18, 1998.
Jin-Shan Wang and Krzysztof Matyjaszewski, *Controlled/"Living" Radical Polymerization. Atom Transfer Radical Polymerization in the Presence of Transition-Metal Complexes.* Reprinted form the Journal of the American Chemical Society, vol. 117, No. 20, 1995.
Mitsuru Kato, Masami Kamigaito, Mitsuo Sawamoto and Toshinobu Higashimura, *Polymerization of Methyl Methacrylate with the Carbon Tetrachloride/Dichlorotris-(triphenylphosphine)ruthenium (II) Methylaluminum Bis(2, 6-di-tert-butylphenoxide) Initiating System: Possibility of Living Radical Polymerization*, Macromolecules, 1995. Received Sep. 6, 1994. Revised Manuscript Received Nov. 28, 1994.
Timothy E. Patten and Krzysztof Matyjaszewski, *Atom Transfer Radical Polymerization and the Synthesis of Polymeric Materials*, Advanced Materials 1998 10 No. 12, 901-915.
Tsuyoshi Ando, Masami Kamigaito and Mitsuo Sawamoto, *Iron(II) Chloride Complex for Living Radical Polymerization of Methyl Methacrylate*, Macromolecules, vol. 30, No. 16, Aug. 11, 1997.
C. Granel, Ph. Dubois, R. Jèrôme and Ph. Teyssiè, *Controlled Radical Polymerization of Methacrylic Monomers in the Presence of a Bis(ortho-chelated) Arylnickel(II) Complex and Different Activated Alkyl Halides*, Macromolecules, 1996, 29, 8576-8582.
Hiroko Uegaki, Yuzo Kotani, Masami Kamigaito and Mitsuo Sawamoto, *Nickel-Mediated Living Radical Polymerization of Methyl Methacrylate*, Macromolecules, 1997, 30, 2249-2253.
Virgil Percec, Bogdan Barboiu, Andreas Neumann, Joan C. Ronda and Mingyang Zhao, *Metal-Catalyzed "Living" Radical Polymerization of Styrene Initiated with Arenesulfonyl Chlorides. From Heterogeneous to Homogeneous Catalysis*, Macromolecules, 1996, 29, 3665-3668.
G. Moineau, C. Granel, Ph. Dubois, R. Jèrôme and Ph. Teyssiè, *Controlled Radical Polymerization of Methyl Methacrylate Initiated by an Alkyl Halide in the Presence of the Wilkinson Catalyst*, Macromolecules, 1998, 31, 542-544.
Mingli Wei, Jianhui Xia, Nancy E. McDermott and Krzysztof Matyjaszewski, *Atom Transfer Radical Polymerization of Styrene in the Presence of Iron Complexes*, Polymer Preprints, 38(2), 231 (1997), Department of Chemistry, Carnegie Mellon University.
G. Moineau, Ph. Dubois, R. Jèrôme, T. Senninger and Ph. Teyssiè, *Alternative Atom Transfer Radical Polymerization for MMA Using $FeCl_3$ and AIBN in the Presence of Triphenylphosphine: An Easy Way to Well-Controlled PMMA*, Macromolecules, 1998, 31, 545-547.

Timothy E. Patten, Jianhui Xia, Teresa Abernathy and Krzysztof Matyjaszewski, *Polymers with Very Low Polydispersities from Atom Transfer Radical Polymerization*, Science, Reprint Series, May 10, 1996, vol. 272, pp. 866-868.

Marc Husseman, Eva E. Malmström, Molly McNamara, Mathew Mate, David Mecerreyes, Didier G. Benoit, James L. Hedrick, Paul Mansky, E. Huang, Thomas P. Russell and Craig J. Hawker, *Controlled Synthesis of Polymer Brushes by "Living" Free Radical Polymerization Techniques*, Macromolecules, vol. 32, No. 5, 1424 (1999).

Muhammad Ejaz, Shinpei Yamamoto, Kohji Ohno, Yoshinobu Tsujii and Takeshi Fukuda, *Controlled Graft Polymerization of Methyl Methacrylate on Silicon Substrate by the Combined Use of the Langmuir-Blodgett and Atom Transfer Radical Polymerization Techniques*, Macromolecules, vol. 31, No. 17, 1998.

Jianhui Xia and Krzysztof Matyjaszewski, *Controlled/"Living" Radical Polymerization. Homogeneous Reverse Atom Transfer Radical Polymerization Using AIBN as the Initiator*, Macromolecules, vol. 30, No. 25, 7692-7696, 1997.

Krzysztof Matyjaszewski, Simion Coca, Scott G. Gaynor, Mingli Wei and Brian E. Woodworth, *Zerovalent Metals in Controlled/"Living" Radical Polymerization*, Macromolecules, vol. 30, No. 23, 1997, 7348-7350.

Stefan A. F. Bon, Michiel Bosveld, Bert Klumperman and Anton L. German, *Controlled Radical Polymerization in Emulsion*, Macromolecules, vol. 30, No. 2, 1997, 324-326, Communications to the Editor.

Simion Coca, Christina B. Jasieczek, Kathryn L. Beers and Krzysztof Matyjaszewski, *Polymerization of Acrylates by Atom Transfer Radical Polymerization. Homopolymerization of 2-Hydroxyethyl Acrylate*, Journal of Polymer Science, Part A: Polymer Chemistry, vol. 36, 1417-1424 (1998).

Naida S. Gill, *Complex Halides of the Transition Metals. Part II., Tetrahedral Iron Complexes*, Journal Chem Soc., 3512 (1961).

C. A. Clausen, III and M. L. Good, *Mössbauer and Far-Infrared Studies of Tetrahaloferrate Anions of the Type $FeCl_{1-n}Br_n$*, Inorganic Chemistry, vol. 9, No. 2, p. 220 (1970).

Gordon D. Sproul and G. D. Stucky, *The Structure of Bis(methylammonium) Tetrabromoferrate(III) Bromide, $(H_3CNH_3)_2[FEBr_4]Br$*, Inorganic Chemistry, vol. 11, No. 7, 1647-1650 (1972).

Kim R. Dunbar and Anne Quillevéré, *$[Fe_2Cl_6]^2$: A Discrete Form of Ferrous Chloride*, Angew. Chem, Int. Ed. Engl. vol. 32, No. 2, 293-295 (1993).

Matyjaszewski, et al., U.S. Appl. No. 09/126,768, filed Jul. 31, 1998.

Matyjaszewski, et al., U.S. Appl. No. 09/018,554, filed Feb. 4, 1998.

\* cited by examiner

CATALYTIC PROCESSES FOR THE CONTROLLED POLYMERIZATION OF FREE RADICALLY (CO)POLYMERIZABLE MONOMERS AND FUNCTIONAL POLYMERIC SYSTEMS PREPARED THEREBY

CROSS REFERENCE TO RELATED APPLICATIONS

This application is a nonprovisional application claiming priority from U.S. Application Ser. Nos. 60/125,809 filed Mar. 23, 1999 and 60/142,980 filed Feb. 12, 1999.

STATEMENT REGARDING FEDERALLY SPONSORED RESEARCH

Portions of this application relating to hybrid polymers were funded in part by the National Science Foundation. Portions of this application relating to emulsions were funded in part by the Environmental Protection Agency. The United States Government may have rights in this application.

BACKGROUND OF THE INVENTION

There is a continuing effort in polymer chemistry to develop polymers that exhibit macro functionality or to develop new functional polymers that possess specific chemical reactivity. These developments would extend the level of control available to materials engineers in processing polymers and using polymers as building blocks in, or components for, subsequent material forming reactions, such as copolymerization, chain extension and crosslinking reactions, and interaction with substrates, including dispersed solids. To be commercially useful, these reactions should start from readily available, low cost monomers and produce materials which are reactive during separate operations or during fabrication, for example, by reaction injection molding, compounding or alloying, and other processes to form coatings, fibers, films, composite structures or bulk articles, with modifiable and controllable desirable properties. A significant economic hurdle that has to be overcome in this effort is to provide the benefits of controlled polymerization, resulting in greater control over the preparation of materials from such available low cost monomers, exhibiting both micro- and macro-functionality, in available commercial process equipment. These long term objectives have provided the backdrop, or driving force, for the continuing advances in controlled polymerization of radically (co)polymerizable monomers, disclosed by some of the present inventors in earlier applications, and provide the incentive to extend, simplify and make more robust the process known as atom transfer radical polymerization (ATRP).

The most evolved version of the classic ATRP reaction is described in U.S. patent application Ser. No. 09/018,554, the entire contents of which are hereby incorporated herein by reference. Methods for exercising control over many parameters in a catalytic process for the controlled polymerization of a wide range of free radically (co)polymerizable monomers have been described in publications authored or co-authored by Krzysztof Matyjaszewski and others. See for example, Wang, J. S. and Matyjaszewsk, K., *J. Am. Chem. Soc.*, vol. 117, p. 5614 (1995); Wang, J. S. and Matyjaszewsk, K., *Macromolecules*, vol. 28, p. 7901 (1995); K. Matyjaszewski et al., *Science*, vol. 272, p. 866 (1996); K. Matyjaszewski et al., "Zerovalent Metals in Controlled/"living" Radical Polymerization," *Macromolecules*, vol. 30, pp. 7348-7350 (1997); J. Xia and K. Matyjaszewski, "Controlled/"Living" Radical Polymerization. Homogenous Reverse Atom Transfer Radical Polymerization Using AIBN as the Initiator," *Macromolecules*, vol. 30, pp. 7692-7696 (1997); U.S. Pat. Nos. 5,807,937 and 5,789,487, the contents of each of which are hereby incorporated herein by reference. The subtle interactions between the parameters have been further explored and implementation of the teachings disclosed in these publications has allowed the preparation of many inherently useful novel materials displaying control over functionality and topology, and production of novel tele-functional building blocks for further material forming reactions, resulting from application of the site specific functional and topological control attainable through this robust controlled polymerization process for free radically (co)polymerizable monomers.

The system or process employed to gain control over the polymerization of free radically (co)polymerizable monomers has been described in earlier applications as comprising the use of four components: (i) an initiator molecule, or polymerization originator molecule and (ii) a transition metal compound having (iii) an added or associated counterion and the transition metal compound complexed with (iv) a ligand(s). The initiator molecule, or polymerization originator molecule can be any molecule comprising one or more radically transferable atom(s) or group(s) capable of participating in a reversible redox reaction with the transition metal compound. The transition metal compound includes an added or associated counterion. So that all reactive oxidation states are soluble to some extent in the reaction medium, the transition metal is complexed with ligand(s). The components of the system are chosen to (co)polymerize the added monomers. See U.S. Pat. No. 5,763,548, the entire contents of which are hereby incorporated herein by reference.

In an embodiment known as "reverse" ATRP, the initiator molecule described above can be formed in-situ by reaction of a free radical with the redox conjugate of the transition metal compound. Other components of the polymerization system such as the choice of the radically transferable atom or group, counterion initially present on the transition metal, and optional solvent can influence the process. In addition, the functions of the components of the system can be combined in a single molecule. U.S. Pat. No. 5,807,937 provides as an example of a single molecule containing a combination of functions, a complex in which the counterion and ligand are in one molecule. The role of the deactivator, the "persistent radical," or for ATRP, the transition metal redox conjugate, is also described in U.S. Pat. No. 5,807,937.

It is still often advantageous to think of the process prerequisites individually so that one can conceptually consider the conditions for control over every aspect of the process. For example, if one wishes to introduce site specific functionality into the resulting polymer one can either add an initiator, or originator molecule containing the desired functional group, or a masked functional group if the desired group can interact with the transition metal complex, or one can utilize the radically transferable atom or group which will be present at the active growing polymer chain end(s) to introduce the desired functionality to the product after polymerization is complete.

While not to be limited to the following description, the theory behind ATRP is that polymerization proceeds essentially by cleavage (and preferably essentially homolytic cleavage) of the radically transferable atom or group from the rest of the initiator molecule or, during the polymerization process the dormant polymer chain end, by a reversible redox reaction with a complexed transition metal catalyst, without any strong carbon-transition (C-$M_t$) bond formation between the active growing polymer chain end and the transition metal complex. Within this theory as the transition metal complex, in a lower active oxidation state, or in its activator state, activates the initiator or dormant polymer chain end by homolytically removing the radically transferable atom or group from the initiating molecule, or growing polymer chain end, in a reversible redox reaction, an active species is formed that allows other chemistry, essentially free radical based chemistry to be conducted. This is a reversible reaction. The transition metal complex in the higher oxidation state, the redox conjugate state or deactivator state, transfers a radically transferable atom or group to the active initiator molecule or growing chain end, thereby reforming the lower oxidation state transition metal complex. When free radical based chemistry occurs, a new molecule comprising a radically transferable atom or group is also formed. In prior publications, the catalytically active transition metal compound, which can be formed in situ or added as a preformed complex, has been described as containing a range of counterions. The counterion(s) may be the same as the radically transferable atom or group present on the initiator, for example a halide such as chlorine or bromine, or may be different radically transferable atoms or groups. An example of the latter counterion is a chloride counterion on the transition metal compound when the initiator first contains a bromine. Such a combination allows for efficient initiation of the polymerization followed by a controlled rate of polymerization, and has additionally been shown to be useful in certain crossover reactions, from one set of (co)monomers to a second set of (co)monomers, allowing efficient formation of block copolymers.

Presently, a wide variety of vinyl monomers can be (co)polymerized in a controlled or "living" manner by this ATRP technique with an increasing number of demonstrated transition metals, e.g. copper, iron, nickel, ruthenium and rhodium in conjunction with different ligands. Many ligands are available for each transition metal used in ATRP, but, despite this, ligands that are cheaper and better able to form catalytically active complexes with improved redox potentials are still desired. In addition, there is a continuing desire to identify catalyst complexes that are amenable to recycle or reuse by known chemical manufacturing processes.

BRIEF SUMMARY OF THE INVENTION

Several improvements will be disclosed and discussed herein which simplify the atom transfer radical polymerization process and make it more compatible with commercial practices, which should reduce the overall cost for production of materials prepared by the process. In addition, the improved process provides improved functional materials for a number of useful applications.

The present invention includes a controlled polymerization process comprising generally, polymerizing free radically (co)polymerizable monomers and forming a (co)polymer. The free radically (co)polymerizable monomers are polymerized in the presence of a system which initially includes: an initiator having a radically transferable atom or group and a catalyst which participates in a reversible cycle with at least one of the initiator and a compound having a radically transferable atom or group. The catalyst most preferably comprises a transition metal salt which may in one embodiment, includes a counterion, preferably a complex counterion, such as an onium based counterion, or either a halide or a metal based counterion. The free radically (co)polymerizable monomers are preferably chosen from acrylates, (meth)acrylates and (meth)acrylamides.

The present invention also provides a controlled polymerization process of atom or group transfer polymerization including polymerizing one or more radically (co)polymerizable monomers in the presence of a polymerization system. The system initially contains an initiator which has one or more radically transferable atom(s) or group(s) and a transition metal compound comprising one or more counterion(s) attached to a solid support. The attached metal complex can comprise a transition metal compound coordinated with ionic bonds to a complex counterion or a transition metal compound which interacts with a N—, O—, P—, or S— containing ligand and coordinates in a σ-bond, or interacts with a carbon-containing ligand which can coordinate in a π-bond, to the transition metal. The transition metal compound participates in a reversible redox cycle with the initiator or a compound having a radically transferable atom or group. The transition metal compound is one of physically, physicochemically or chemically attached to the surface of the solid support through ionic bonding, physisorption, chemisorption, Van der Waals forces, coordinate or covalent bonding.

In one embodiment of the invention, the transition metal compound comprises one or more counterion(s) attached to a solid support, wherein one or more additional counterions are complex counterions and the attached transition metal compound participates in a reversible cycle with the initiator or a compound having a radically transferable atom or group.

In another embodiment of the invention, the controlled polymerization process includes polymerizing one or more radically polymerizable monomers in the presence of a system initially comprising an initiator and a transition metal compound. The transition metal compound comprises one or more of the counterion(s) attached to a solid support, a ligand coordinated in a σ-bond to the transition metal, a redox conjugate of the transition metal compound. At least one of the transition metal and redox conjugates participate in a reversible redox cycle with at least on of the initiator or a compound having a radically transferable atom or group. In this embodiment, the ligand may contain a C atom which coordinates in a π-bond to the transition metal. The redox conjugate of the transition metal may be at least partially soluble in the polymerization process. The solid support may be an ion exchange resin. The process may be conducted in a batch reactor or may be conducted in a continuous flow system. The initiator may be formed by transferring a radically polymerizable atom or group from the transition metal compound in a higher oxidation state to a formed free radical.

In an alternative embodiment, the present invention provides a process for atom transfer radical addition for adding functionality to an oligomer or polymer. The process includes reacting a first oligomer or polymer having a radically transferable atom or group with a second compound having a first desired functional group, the second compound reactive with the first oligomer or polymer after removal of the radically transferable atom or group, in the presence of a system initially comprising a catalyst which participates in a reversible cycle with the second compound. The catalyst is preferably a transition metal complex, and may further comprise a ligand, and more preferably a transition metal salt. The second compound is preferably an unsaturated molecule which is not free radically (co)polymerizable, terminating the polymer growth. The unsaturated molecule may comprise a first functional group and may be at least one of an α, α-disubstituted olefin or an allyl. The process may include adding a molecule comprising a second functional group wherein the molecule which reacts with the first functional group is incorporated on the polymer. A third compound may be added comprising a third functional group, wherein the third compound reacts with the first functional group incorporated on the polymer.

The present invention may also include a further embodiment of the controlled polymerization process which includes preparing a second initiator having a radically transferable atom or group by decomposing a first free radical initiator in the presence of a transition metal salt. In this embodiment, the transition metal salt should comprise a complex counterion; and a radically transferable atom or group. The transition metal salt transfers the radically transferable atom or group to a decomposition product of a first initiator to form the second initiator. Free radically (co)polymerizable monomers are polymerized in the presence of a system initially comprising the second initiator and a catalyst which participates in a reversible cycle with at least one of the second initiator and a compound having a radically transferable atom or group. The polymer may preferably be formed having a partial residue of the first initiator at one terminus. A further step may include isolating the polymer. The transition metal salt initially present is preferably in a higher oxidation state and a transition metal in the metal zero state may be added such that the average oxidation state is lower than that required to react with the molar ratio of initiator. The process is performed in one of a bulk system, a system comprising an appropriate solvent, in a suspension, in an emulsion, or over a solid support in a batch, semi-batch or continuous process.

The polymerization process of the present invention may include preparing an initiator having a radically transferable atom or group by rupturing a peroxide in the presence of a transition metal compound where the transition metal compound in a lower oxidation state comprises a radically transferable atom or group, and the transition metal compound transfers the radically transferable atom or group to a residue of the peroxide to form the initiator or originator. The process further includes polymerizing free radically (co)polymerizable monomers in the presence of a system initially comprising the initiator and a catalyst which participates in a reversible cycle with the initiator and a compound having a radically transferable atom or group.

The controlled polymerization process of the present invention may comprise polymerizing free radically (co)polymerizable monomers, such as (meth)acrylamides, in the presence of a system including an initiator having a radically transferable halide, a transition metal compound, and a nitrogen containing ligand, which is preferably at least one of a primary or secondary linear amine. The ligand may be further complexed by a polar solvent to prepare a neutral complex. The ligand may be a charged species.

The invention further comprises a process for the removal of a transition metal catalyst complex from a polymerization reaction. The removal process comprises the steps of contacting a reaction medium to an ion exchange medium wherein the reaction medium which includes a polymer, optionally monomers, and a catalyst complex, preferably comprised of a transition metal in one or more oxidation states, a ligand, and one or more counterions. The catalyst complex is optionally a complex salt, comprising a transition metal and a complex counterion. The ion exchange medium preferably has acidic counterions, and more preferably, cations selected from at least one of $H^+$ and $Na^+$. The catalyst complex is bound to the ion exchange resin through a shared counterion on the exchange resin. The reaction medium may further include a solvent, preferably having a polarity which enhances the rate of removal of the catalyst complex from the medium and more preferably, wherein substantially all of the catalyst complex is removed from the reaction medium. The reaction medium is passed over a bed of the ion exchange resin. The ligand on the catalyst complex is preferably chosen to allow efficient removal of the transition metal complex from solution by the ion exchange resin and the process further includes separating the ion exchange resin from the reaction medium.

The process may also include the further step of regenerating the catalyst complex by exposing the ion exchange resin bound transition metal complex to a regeneration medium containing one of an acid or a salt comprising a radically transferable atom or group as counterion, and separating the regeneration medium from the ion exchange resin. The regeneration medium may contains free radically (co)polymerizable monomers. The equilibrium between the transition metal complex in solution and transition metal complex bound to the ion exchange resin is most preferably controlled by adjusting one or more of the polarity of the regeneration medium, ionic character of the ion exchange resin, pH of the regeneration medium, degree of crosslinking of the ion exchange resin or swellability of the ion exchange resin, swellability permeability of the ion exchange resin, acid strength of the supported counterion and gross size of the ion exchange resins.

The present invention also includes a process for a catalytic atom transfer functionalization of oligo/polymeric materials having one or more radically transferable atom(s) or group(s). This embodiment of the process comprises the steps of providing a polymer having a radically transferable atom or group, adding a compound containing a $\alpha,\alpha$-disubstituted olefin group to the polymer in the presence of a transition metal complex capable of undergoing a redox reaction with the radically transferable atom or group, resulting in the addition of the compound containing the $\alpha,\alpha$-disubstituted olefin group at the site of the radically transferable atom or group and an elimination reaction involving the radically transferable atom or group to form a reactive unsaturated group. The polymeric material is optionally an oligomer. In a preferred format, one substituant on the $\alpha,\alpha$-disubstituted olefin is a methyl group and the formed double bond is predominately a exo-double bond. A macromonomer with a reactive exo-double bond may be prepared. The elimination reaction may be enhanced by the addition of an acid acceptor preferably selected from the group consisting of basic organic molecules, linear and heterocyclic N containing compounds, ion exchange resins or inorganic acid acceptors.

In another embodiment of the invention, a process is provided for a catalytic atom transfer coupling of polymers. The coupling process includes providing a first polymer having a first radically transferable atom or group, adding a coupling compound containing one or more $\alpha,\alpha$-disubstituted olefin group to the first polymer in the presence of a transition metal complex capable of undergoing a redox reaction with the first radically transferable atom or group, resulting in the addition of the coupling compound containing the $\alpha,\alpha$-disubstituted olefin group at the site of the first radically transferable atom or group and an elimination reaction comprising the radically transferable atom or group to form a reactive double bond, and allowing a second polymer having a second radically transferable atom or group in the presence of the transition metal complex to add to the reactive double bond. The molar ratio of the total of the first polymer and the second polymer to the coupling compound may be optionally controlled to form a third polymer of a configuration of at least one of linear, star, graft, and chain extended materials containing a residue of the first polymer and the second polymer. The coupling compound may contain one $\alpha,\alpha$-disubstituted olefin group, and the first polymer and second polymer may have one radically transferable atom or group. The molar ratio of the total moles of the first polymer and the second polymer to the moles of the coupling compound in that case is essentially 1:0.5. The coupling compound may contain two α,α-disubstituted olefin groups and the first polymer and second polymer may each have one radically transferable atom or group and the third polymer is a star polymer with fur arms or the first and second polymer may have two radically transferable atoms or groups resulting in one of an extended chain or coupled polymer with the α,α-disubstituted olefin group within the chain. The coupling compound may be a compact molecule that contains three α,α-disubstituted olefin groups wherein the molar ratio can be controlled to form a star copolymer with up to six arms.

The present invention also includes an α-substituted olefin, possessing an exo-double bond, suitable for use as a macromonomer, in which the α-substituent is a free radically (co)polymerized oligo/polymer with a molecular weight greater than 250 possessing a known group at the other terminus of the polymer. Alternatively, the present invention includes an α,β-disubstituted olefin in which each substituant is a free radically (co)polymerized oligo/polymer with a molecular weight greater than 250.

The present invention can provide a graft copolymer when the coupling compound comprises a backbone polymer with α, α-disubstituted olefin groups as substituents and forms a grafted polymer wherein the grafts are attached to the backbone polymer within the graft copolymer chain. The backbone polymer is preferably produced by an addition or condensation polymerization process. The backbone polymer is preferably a polyolefin, and most preferably one of polystyrene, polyethylene, polypropylene, polyisobutylene, polybutadiene or polyisoprene and copolymers thereof.

The present invention further includes a macromonomer comprising a functional group containing a terminal exo-olefin double bond derived from free radically (co)polymerizable monomers, a stereochemistry and tacticity of a material formed by a free radical polymerization process, and a symmetrical single peak molecular weight distribution less than 1.5. The macromonomer preferably has a functionality greater than 90 mole %.

The present invention may also be extended to a controlled suspension or emulsion polymerization process comprising polymerizing free radically (co)polymerizable monomers in the presence of a system initially comprising a suspending medium, a surfactant, an initiator having a radically transferable atom or group, and a transition metal complex which may be a picolyl amine and participates in a reversible redox cycle with at least one of the initiator and a compound having a radically transferable atom or group, wherein the redox conjugate of the catalyst transition metal is added to the suspending medium. The hydrophobicity and hydrophylicity of the transition metal complex may be controlled by the choice of the attached ligands. The polymerization may be initiated by the decomposition of a standard radical initiator.

An emulsion controlled radical polymerization process is provided by the present invention. This process comprises a free radical initiator, wherein a polymerization is initiated by the decomposition of the free radical initiator; and a transition metal compound in a higher oxidation state comprising a radically transferable atom or group, wherein the radically transferable group transfers to the residue of the free radical initiator to form a second initiator, and a third initiator having a radically transferable atom or group. The process may further comprise adding a second free radically (co)polymerizable monomer and adding at least one of the transition metal complex, the transition metal, the transition metal redox conjugate, a second radically transferable atom or group, and the counterion.

A controlled radical polymerization process provided by the present invention comprises using an initiator attached to a solid surface, and may further comprise using a free radically (co)polymerizable monomer and a deactivator, a redox conjugate of a transition metal complex or a stable free radical. The initiator is preferably attached to a solid surface. The process catalyst may comprise a transition metal salt and the system may further comprise at least one of a persistent free radical, the redox conjugate of the transition metal catalyst, a stable free radical or another deactivator. The process persistent free radical is preferably greater than 1% of the controlled polymerization system and the monomer. The persistent free radical is more preferably greater than 3% of the controlled polymerization system and the monomer.

The invention provides another embodiment wherein the controlled polymerization process comprises using an unsaturated monomer having an attached polyhedral oligomeric silsesquioxane group t form a polymer. The unsaturated monomer is preferably a vinyl aromatic or a (meth)acrylate. The polymer formed may be a homopolymer, a copolymer, a block copolymer, or a star block polymer.

The invention further provides a homo-telechelic copolymer comprising a polymer synthesized from free radically copolymerizable monomers having a first terminal end and a second terminal end, a first functional group attached to said first terminal end, a second functional group attached to said second terminal end, wherein selection of the other substituents on the first and second group affords the said second functional group has a different reactivity than said first functional group.

The invention further provides a controlled polymerization process for the production of telefunctional multi-arm star copolymers. This process comprises polymerizing a free radically (co)polymerizable monomer in the presence of a system comprising a telefunctional multi-armed star initiator synthesized from free radically copolymerizable monomers, a first initiator with one radically transferable atom or group, and a divinyl compound. The first initiator may further comprise a second functional group.

The invention also provides a block copolymer comprising a block synthesized from vinyl acetate monomers, and a block of free radically copolymerizable monomers, preferably having functional end groups. A process for the preparation of block copolymers comprises polymerizing a first monomer block by a first reaction mechanism catalyzed by a transition metal, and polymerizing a second monomer block by a second reaction mechanism catalyzed by the transition metal, wherein the first reaction mechanism is different than the second reaction mechanism. The process of preparing the block copolymer preferably further comprises the steps of providing a A block synthesized from vinyl acetate monomers, and a block of free radically copolymerizable monomers having functional end groups. The functional end group or groups may be converted into a different group or groups.

An ABA block copolymer may be formed. It is comprised of two A blocks synthesized from vinyl acetate monomers, and a B block synthesized from free radically copolymerizable monomers having functional end groups. The process of preparing the ABA block copolymer comprises the steps of providing an ABA block copolymer having two A blocks synthesized from vinyl acetate monomers and a B block synthesized from free radically copolymerizable monomers having functional end groups, and converting the functional end group into different groups.

The understanding that the transition metal can contain a non-radically transferable atom(s) or group(s) as the initial counterion and that the polymerization proceeds solely through transfer of the atom or group initially present on the initiator is the foundation for one of the improvements of the present invention. Two important improvements in the ATRP process involving the choice of counterion in the transition metal complex will be described.

BRIEF DESCRIPTION OF THE FIGURES

The present invention will be better understood by reference to the figures.

DETAILED DESCRIPTION OF THE INVENTION

Figure 1:
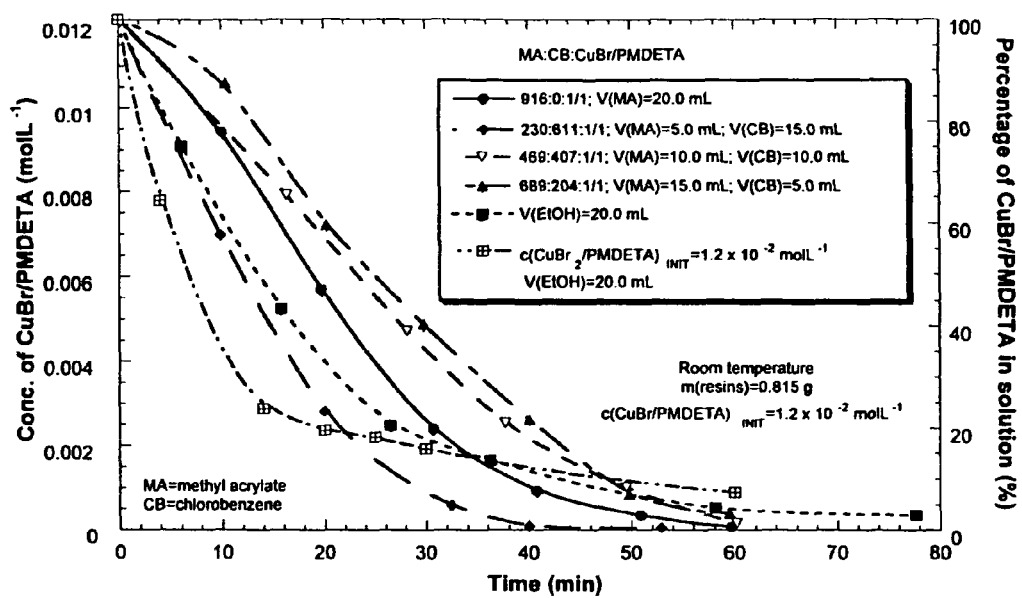
FIG. 1. is a graph showing the solvent effect on the removal of CuBr/PMDETA using DOWEX MSC-1 ion exchange resins.

Without limiting the applicability of the use of transition metal salts as catalysts for controlled polymerization of free radically (co)polymerizable monomers in any way, the utility will be explained by initially discussing iron based systems. Up to now, the ligands used for iron-based ATRP catalysts have preferably been selected from the classes of phosphines (for example, tributylphosphine and triphenylphosphine), aliphatic amines (for example, tributylamine and trioctylamine), substituted bipyridines (for example, 4,4'-dinonyl-2,2'-bipyridine, dNbpy), tetradentate Schiff bases, or carbon monoxide and cyclopentadienyl. The iron complexes with the aforementioned ligands preferably display either tetrahedral (for example, triphenylphosphine and tributylamine) or square-planar (tetradentate Schiff base) configurations. See Matyjaszewski, K.; Wei, M.; Xia, J.; McDermott, N. E., *Macromolecules*, vol. 30, p. 8161 (1997); Moineau, G.; Dubois, P.; Jerome, R.; Senninger, T.; Teyssie, P., *Macromolecules*, vol. 31, p. 545 (1998). Wolfe, P. S.; Nguyen, S. T., *Am. Chem. Soc., Polym. Prepr.*, vol. 39(2), p. 552 (1998). Kamigaito, M.; Sawamoto, M., *Am. Chem. Soc., Polym. Prepr.*, vol. 40(2), p. 325 (1999). Kotani, Y.; Kamigaito, M.; Sawamoto, M., *Am. Chem. Soc., Polym. Prepr.*, vol. 40(2), p. 468 (1999).

Based on the understanding of the structure of the iron based catalyst, the structure and/or composition of the catalyst suitable for the process has now been developed further. The present invention provides a new class of transition metal complexes and transition metal mediated controlled polymerization with less than four added components. Catalysts can be formed when a transition metal is in the presence of a salt where the anion of the salt interacts with the transition metal to form a new transition metal compound. Not to be limited by the following description, an example is a catalyst that is formed by mixing $FeCl_2$ with a salt comprising halide anions, with bulky organic counterions, such as tetrabutyl ammonium chloride, forming $FeCl_3^-$ $NBu_4^+$. Additionally the complex $FeCl_3^-$ $NEt_4^+$, formed from $FeCl_3$ and $NEt_4Cl$ can be used in reverse ATRP. ATRP also can be conducted using iron catalysts supported on anion exchange resins.

In this embodiment, particularly suitable for controlled polymerization of certain monomers with a novel expanded range of transition metal complexes, the functions of both the initial counterion on the transition metal and the ligand are superseded by the use of a transition metal salt containing a soluble charged counterion. This invention has also been extended to a "reverse" ATRP reaction. The utility of this novel class of catalysts is exemplified by a description of conditions for conducting the reaction with an iron based salt as catalyst for the polymerization of styrenes, acrylates and methacrylates. While not being limited to a single class of transition metal salts or a single mechanism, it is believed that the salts interact with the transition metal in such a manner that the anionic component of the salt contacts the transition metal to form a negatively charged transition metal and a positively charged salt fragment. When the salt is a halide anion, the halide anions are clearly present as counterions in the isolated salts but could act as "bifunctional" molecules in solution with the halide anion fulfilling the role of ligand in the "classic" ATRP catalyst. Such species have now been demonstrated to be active catalysts for ATRP.

The use of complex organic counterions such as tributyl ammonium or trialkylphosphonium anions permits the use of iron as the transition metal catalyst to be extended to the controlled (co)polymerization of acrylates. The present invention achieves a controlled polymerization process with only three identifiable added components, (i) an initiator, or polymer chain originator added or prepared in situ; with one or more radically transferable atom(s) or group(s); (ii) a transition metal and (iii) associated counterions comprising a salt capable of copolymerizing added free radically (co)polymerizable monomers.

Tetrahedral complexes of iron can be used as catalysts for ATRP. Such iron complexes with halide anions as ligands have been known for many years. (See, Gill, N. S., *J. Chem. Soc.*, 3512 (1961); Clausen, C. A.; Good, M. L., *Inorg. Chem.*, vol. 9, 220 (1970); Sproul, G. D.; Stucky, G. D., *Inorg. Chem.*, vol. 11, 1647 (1972). Dunbar, K. R.; Quillevere, A., *Angew. Chem. Int. Ed. Engl.*, vol. 32, 293 (1993)). They are negatively charged and are usually accompanied by bulky organic or arsenic based onium counterions. The structures of such complexes described in the literature are shown below and in most cases they are formed by the direct reaction of onium halides with iron halides in solution. These complexes have been studied and the present inventors have found that halide anions with bulky organic counterions (for example, tetrabutylammonium, tetrabutylphosphonium, tetraalkylarsonium etc.) are especially preferable as ATRP catalysts. Inorganic counterions, such as K, Na, Mg etc., may also be employed.

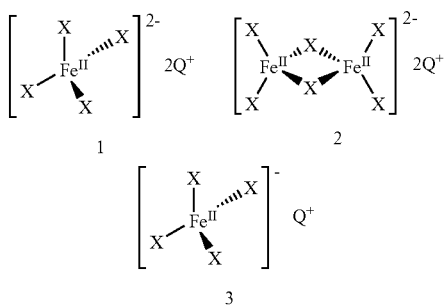

Q = $NR_4$, $PR_4$, $AsR_4$

Scheme 1. Iron Complexes Active for ATRP

Complexes 1 and 3, (Scheme 1) have been isolated for both chlorine and bromine, while 2 is known only for X=Cl. It is also worth mentioning that, unlike chlorine-based complexes, mononuclear iron(III) complexes with more than four bromine atoms have not been isolated, presumably due to their lower stability. Complex 1 is very likely the active species involved in the direct ATRP process described below. Complex 2 may be present at onium salt/$FeBr_2$ ratios lower than 2. By abstracting the halogen atom from the initiator or the polymeric "dormant" species, $[FeBr_4]^{2-}$ complex is converted to a $[FeBr_5]^{2-}$ species. Although $[FeBr_5]^{2-}$ has not been isolated, it could be present in solution. The formation of the $[FeBr_5]^{2-}$ complex anion is supported by the "reverse" ATRP experiments, which are discussed in Examples 4a-4c, the first stage of which is shown diagrammatically in Scheme 2.

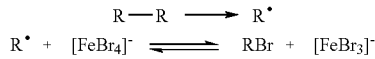

In the "reverse" ATRP with transition metal salts different complexes may be involved depending on the counterion/$FeBr_3$ ratio, as suggested by the variable polydispersities obtained for different salt/$FeBr_3$ ratios. The lower polydispersities obtained for salt/iron ratios higher than 2 suggest the involvement of $[FeBr_5]^{2-}$ complex, which may allow for an easier abstraction of a bromine atom due to its lower stability, and therefore a faster deactivation. In this case, the resulting $[FeBr_4]^{2-}$ complex could be responsible for the activation step.

The ionic nature of transition metal salt complexes when used as catalysts in the polymerization allows for an easy removal of the catalyst by simply washing with water the final reaction mixture. This procedure was tested for the case of styrene polymerization through direct ATRP and with methylmethacrylate (MMA) polymerization by the "reverse" approach.

In the above discussion the halide anion has been depicted as a bromine atom, but other halides and mixed halide systems can be used. Different halide counterions can initially be present on the transition metal and onium salt to form a mixed halide complex. In addition as taught in other applications mixed halide systems can be used to control the rate of initiation and rate of propagation by choosing appropriate initial halide atoms on the transition metal and initiator molecule.

The examples detailed later clearly show that ionic iron complexes with halide anions as ligands associated with cations can be now be used to control the polymerization of styrene and (meth)acrylates by both direct and "reverse" ATRP. In the direct approach, iron (II) bromide complexed with either chloride, bromide or iodide onium salts allowed for the preparation of polymers with predetermined molecular weights and low polydispersities. However, styrene and acrylate polymerizations were initially slow, while for MMA it was quite fast.

The "reverse" ATRP process was successfully applied to MMA. The molecular weights increased with conversion, and they were close to the values calculated based on the initial monomer/AIBN ratio. Methyl acrylate displayed the same slow polymerization rate as in the case of the initial direct approach, while for styrene the mechanism for the polymerization process changed and the occurrence of a cationic process led to uncontrolled molecular weights and high polydispersities. Depending on the onium salt/$FeBr_3$ ratio, different iron complexes may be involved in the polymerization.

The formation of some polyiron complexes with a lower reactivity during the polymerization can be an explanation for the slower reaction rate. If this premise were true then they could be destroyed by the addition of a complexing agent. The rate of polymerization for styrene systems was increased by the addition of $Bu_3P$.

The transition metal complex salts disclosed above have also been shown to be more tolerant of functional groups on the initiator and (co)monomer(s) than the catalyst systems discussed in earlier applications. These transition metal complex salts catalyst systems can initiate polymerization from initiators containing free carboxylic acid groups and further can incorporate materials containing a "free" carboxylic acid into the controlled polymerization process. This is a significant extension of the capabilities of ATRP since many applications for acrylate based coating materials or adhesives utilize monomers bearing "free" carboxylic acids as functional groups to modify the interaction of the film forming polymer with organic or inorganic substrates.

The transition metal salts used in ATRP are preferably iron based salts. Other metals, including copper, nickel, manganese and chromium were screened and found to be also active for the initiation of polymerization. However, they appear to offer less control over the deactivation step leading to polymers with broad molecular weight distribution.

In another embodiment related to counterion selection for process control, the transition metal is held in close conjunction with, or attached to a solid support. "Attached" as used herein means physically, physicochemically or chemically bound to the surface of a solid support through ionic bonding, physisorption, chemisorption, Van der Waals' forces, coordinate or covalent bonding and in essence, held separate from the polymerizing phase. In one particular embodiment, the catalyst is attached to a solid support through interaction with a counterion that is directly attached to the support. This embodiment allows the polymerization to be carried out in an essentially transition metal free environment which greatly simplifies the production of a catalyst free product. Preferably, the transition metal itself is supported directly on either the solid support or the solid ion exchange resin; and more preferably, the transition metal catalyst is supported directly on the solid ion exchange resin; and most preferably, the transition metal catalyst and counterion are supported on the solid ion exchange resin. In an even more preferred embodiment, the transition metal is closely associated with the solid ion exchange resin through one or more shared counterions that are in turn supported on the solid ion exchange resin. In this embodiment, the solid ion exchange resin is believed to function as one of the counterions for the transition metal compound.

The concentration of the transition metal, transition metal catalyst, or counterion is not particularly limited, as long as it is active in the polymerization according to the invention.

The ratio of catalyst or supported catalyst is not particularly limited as long as it is active in the polymerization according to the invention. This may require that the catalyst be active in the polymerization medium while interacting with the support solid. The activity and interaction are balanced by consideration of all process parameters.

The ion exchange resin may be any resin or solid support known to those of ordinary skill in the art and may include without limitation, organic solids (including organic resins, functionalized organic resins, acrylic resins, styrenic resins and phenolic resins), inorganic solids, functionalized inorganic solids, synthetic and natural zeolites, silicates, clays, aerogels, xerogels, aluminosilicates, micro- meso- and macroporous materials, metal oxides, carbonaceous, kieselguhr, aluminas, pumice, activates carbon, and silica carbides. The ion exchange resin or support may be in the form of a bead, particle, foam, membrane, paper or fiber. Preferably, the ion exchange resin may be any of the organic resins, functionalized organic resins, acrylic resins, styrenic resins, and phenolic resins. Likewise the method of loading, use and regeneration of ion exchange resins and solid supports are not particularly limiting. Various suitable ion exchange resins and solid catalytic supports and methods of loading and use and regeneration are described in, e.g. *Kirk-Othmer Encyclopedia of Chemical Technology* 4th ed., (1993), and particularly pages 321-460 in volume 5, and pages 737-783 in volume 14, the entire contents of which are hereby incorporated by reference.

The concentration of redox conjugate in solution is not particularly limited as long as it is active in the polymerization according to the invention. In a batch polymerization system, it is preferred that the redox conjugate be present at the start of the polymerization process.

The present methods are applicable to the full expanded range of radically (co)polymerizable monomers that may be produced by both ATRP and "reverse" ATRP.

The present invention permits the catalyst to be used in a fixed or fluid bed reactor when immobilized by or attached (as previously defined) through interaction of the catalyst complex with the counterion attached to an ion exchange resin or another solid support.

In U.S. Pat. No. 5,807,937, the removal of the catalyst from the polymerized system by exposure of the catalyst to an absorbing solid including alumina, silica and/or clay was described. The significant role of additional control over each of the specific components of the ATRP process was explored in U.S. patent application Ser. No. 09/018,554. Heretofore, improvements in catalyst removal through selective precipitation of the catalyst, or the polymer while the catalyst was retained in solution, was described by consideration of the role of the ligand present on the catalyst. The additional control over the specific components of the process, such as ligand interaction with solvent, further specified in U.S. patent application Ser. No. 09/018,554 also affected the efficiency with which the transition metal complex can be removed from the system. The importance of the other process parameters in determining the best conditions for polymerization of a specific selection of (co)monomers is provided in this application. The process parameters are also valuable for optimizing catalyst support, catalyst removal, recycle or reuse. The range of materials that have been demonstrated to absorb, adsorb or interact with the complete catalyst complex has now been expanded to include ion exchange resins and it has been determined that the rate of removal of the catalyst is dependent on the polarity of the solvent, the temperature, type of ion exchange resin, the ionic character and size of the metal complex. By attention to these variables, as discussed herein, it is possible to run a controlled polymerization using a catalyst attached (as previously defined) to, or interacting with a support. The same considerations regarding the process parameters may be used to remove the transition metal complex and its redox conjugate from the polymerization system relatively quickly. In the case of ion exchange resins, it is believed that this occurs by replacing one of the counterion(s) initially present on the transition metal complex by the ion exchange resin. This also offers an expedient method for catalyst recycle by replacing the first counterion by a bound or attached counterion and subsequent release of the transition metal complex from the ion exchange resin by further treatment with "unbound or free" counterion replacement.

The removal of active ATRP catalysts by exposure to an ion exchange media with acidic counterions was studied by examining the role that different ligands, considering both activator and deactivator redox conjugate oxidation states, had on the ability of ion exchange resins to remove the transition metal complex, as active complexes, from solution. For example, the removal of cupric and/or cuprous halide complexed by bidentate, tridentate or tetradentate nitrogen based ligands was demonstrated by contacting the solution with acidic ion exchange resins. The efficiency of the removal of the copper was followed by measuring the rate of decolorization of the system and/or by the release of the counterion into the system.

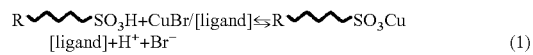
$$R\mathord{\sim\!\!\sim\!\!\sim} SO_3H + CuBr/[ligand] \leftrightarrows R\mathord{\sim\!\!\sim\!\!\sim} SO_3Cu[ligand] + H^+ + Br^- \qquad (1)$$

ligand=bpy, PMDETA, Me$_6$TREN
R=crosslinked polystyrene bpy is used herein to mean 2,2-bipyridine PMDETA is used herein to mean N,N,N',N",N"'-pentamethyldiethylene-triamine Me$_6$TREN is used herein to mean tris[(dimethylamino)ethyl]amine Scheme 3. Counterion Exchange with Supported Counterion Additionally, for Cu(II) complexes, the amount of Br⁻ released is dependent on the ligand used. Indeed, the position of the equilibrium set up between the transition metal catalyst (copper) in solution and strongly interacting with the solid support media was shown to be dependent on the polarity of the medium, ionic character of the exchanging complex, pH of the solution, the degree of crosslinking present in the exchange media or swellability/permeability of the exchange media, acid strength of the supported counterion and gross size of the ion exchange resins in addition to the size of the transition metal complex. Attention to these variables is important for optimum results both for conducting an ATRP reaction with an ion exchange resin as counterion and for successful removal of the catalyst for recycle by an ion exchange system.

At pH values lower than 3, protonation of the ligand can occur causing decomposition of the transition metal complex.

Suitable ion exchange resins include most commercially available cationic exchange resins containing a sulphonyl anionic counterion.

Exchange is faster with a H+ cation.

Exchange is not strongly dependent on solvent when a large excess of cation sites are available.

The rate increased with solvent polarity at lower relative ratios of total transition metal to available sites.

FIGS. 1 through 5, discussed in detail in the Experimental Section herein, show the rate of removal of the catalyst as solvent polarity, temperature, oxidation state of the transition metal, different ion exchange resins and different ligands are considered.

The experiments detailed in the Experimental Section demonstrate an efficient method for the removal of the transition metal complex, exemplified by Cu(I) and Cu(II) complexes, from an ATRP reaction using ion exchange resins with acidic groups. These resins can be employed to remove catalysts from bulk polymerization, organic and inorganic solutions, in addition to suspension and emulsion systems.

The resins have removed catalyst from ATRP biphasic water-borne polymerizations without coagulation of the polymer latex. It was found that the rate of removal of the catalyst complexes is dependent on the solvent polarity, temperature, type of ion exchange resins used and ionic character and size of the copper complex. In the limiting case of using large excess of $H^+$ sites on the resins, both redox conjugate states of the transition metal complexes can be removed from reaction mixtures relatively fast.

The catalyst can be released from the resin by washing the resin with an acid solution containing a strong acid counterion such as a hydrogen halide.

With these tools available to the process engineer, it will be possible to design a catalyst package that both conducts the polymerization and is amenable to removal, recycle and reuse through use of solids discussed in U.S. Pat. No. 5,807,937 with which the catalyst interacts, and now in particular, ion exchange resins.

Another approach to catalyst recycle would be precipitation polymerization. The polymerization is conducted in a solvent, which dissolves the polymer at the polymerization temperature, but the polymer precipitates out at room temperature (or below). The polymer is recovered by filtration, and the filtrate with the catalyst dissolved therein is recycled.

Methanol and absolute ethanol were used as solvents for the ATRP of MMA, as expected, the reaction mixture was homogeneous at 90° C., but after cooling the non-agitated solution to room temperature the polymer precipitated as lump, which made it difficult to recover as a pure material although the bulk of the catalyst remained in solution. Also, ethanol had swelled the polymer to some degree. The polydispersity was larger than desired, indicating some question on the absolute level of control during polymerization. The less polar solvent, ethanol, afforded a lower polydispersity.

A non-polar solvent, heptane was also examined, and while the polymer again precipitated out of the non-agitated polymerization during the polymerization as a lump the molecular weight distribution was 1.21 indicating a certain degree of control.

Earlier work disclosed in U.S. patent application Ser. No. 09/018,554, described and demonstrated the concept of designing functionality into polymers by conducting additional chemistry on a polymeric material containing one or more radically transferable atoms or groups. Two extensions of atom transfer processes were specifically introduced. The extensions could be conveniently applied at the end of an active atom transfer polymerization reaction or to any materials containing a radically transferable atom or group. All materials produced through the ATRP process contain such a group unless steps have been taken to transform it into another desired functional group. One concept introduced and described in U.S. patent application Ser. No. 09/018,554, was coupling of a polymer containing a radically transferable atom or group through reaction with a stoichiometric amount of a transition metal compound, optionally, partially in the zero oxidation state. Another was utilization of a catalytic atom transfer radical addition reaction at the end of a catalytic atom transfer polymerization process to introduce another functional group to the termini of the polymer.

Practice of the first polymer coupling process would produce homo-telechelic materials with the same functional group present at each polymer terminus while the second terminal functional group addition process could produce either homo-, "homo"-, or hetero-telechelic materials. The term "homo"-telechelic will be employed in this application to describe molecules in which the same functional group can be attached to atoms containing different substituents and hence each polymer chain end could react at different rates in subsequent condensation or crosslinking reactions. Such behavior would be desirable for example in adhesive applications where partial reaction, under one set of stimuli could yield a tacky product for contact adhesion and full reaction, under a second stimuli would yield a structural adhesive joint. Another instance would be the controlled build up of molecular weight in compounding operations whereby the build up of viscosity and hence intensity of mixing would be predictable.

The present invention provides further examples of and defines improvements in these processes. The utility of the improvements is exemplified by preparation of novel building blocks for subsequent material forming reactions. A novel catalytic atom transfer coupling process is described based on a greater understanding and a combination of the chemistry involved in both the polymer coupling and terminal functional group addition processes.

One aspect of the present invention describes the addition of a non-polymerizable monomer, such as an $\alpha,\alpha$-disubstituted olefin, to the later stages of an ATRP reaction and how an understanding, and extension, of the chemistry that can occur after the addition of this monomer to the polymer chain can lead to a novel catalytic coupling process. This specific improvement can be viewed as an extension of the teaching of introducing functionality through an atom transfer radical addition reaction and can be exemplified by a discussion of the chemistry that can occur after the addition of an $\alpha$-methyl styrene unit at the end of a controlled polymerization process utilizing a bromine as the radically transferable atom or group. It should be stressed however that the following specific descriptions of the theory behind the individual steps of this novel catalytic atom transfer coupling process using various appropriately isopropenyl substituted benzene molecules are purely illustrative of the chemistry and are not meant to put any limitation on the structure of the $\alpha,\alpha$-disubstituted olefin or on the topology or compositional variations attainable from such coupled polymeric materials.

The inventors have determined that the functionality that is ultimately present on a telechelic polymer and the topology of the material formed by addition of an $\alpha,\alpha$-disubstituted olefin to an active ATRP process initiated by an initiator containing one radically transferable atom or group is dependent on the following factors: (i) the molar ratio of the α,α-disubstituted olefin that is added to the reaction and the radically transferable atom or group present on the active growing chain end of the functionally-terminated polymer, (ii) whether there is one or more chain ends bearing a radically transferable atom or group, and (iii) whether the molecule containing the α,α-disubstituted olefin comprises one or more α,α-disubstituted olefin units.

Figure 6:
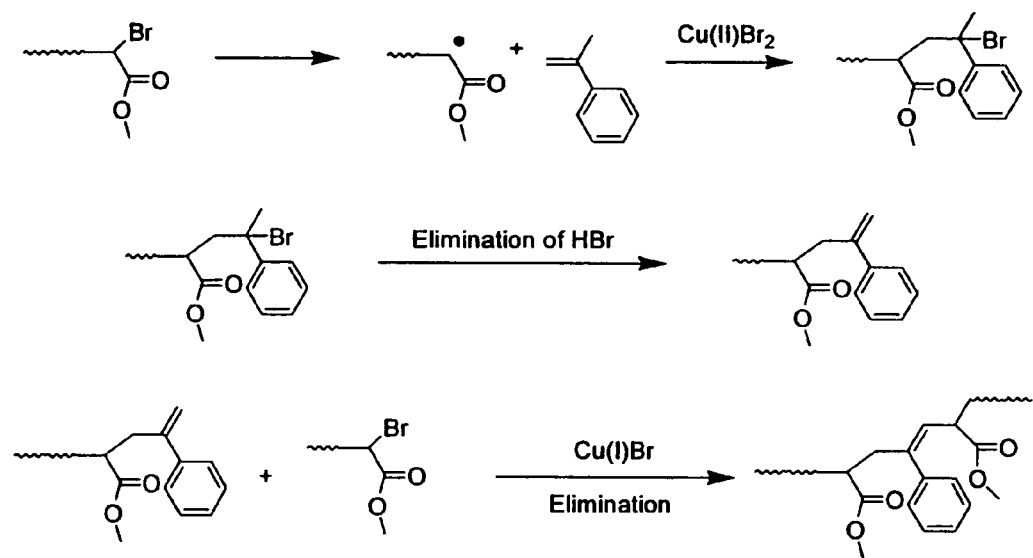
FIG. 6. is a reaction schematic showing coupling through α-methylstyrene.

FIG. 6 schematically illustrates the chemistry that takes place at each active functional radically transferable atom or group after the addition of an α,α-disubstituted olefin. The α,α-disubstituted olefin is represented by an α-methyl styrene unit.

In FIG. 6, starting with a bromo-terminated polymer the first step of the coupling process is shown as a transition metal complex mediated redox atom transfer addition reaction. In this addition reaction, one α-methyl styrene unit is incorporated onto the end of a polymer chain. The new α-methylstyryl radical end group is formed by addition of the α-methyl styrene monomer to an oligomer or polymer radical chain end. When the α-methylstyryl radical end group receives the initially transferred radically transferable atom or group back from the transition metal complex in the "reverse" redox reaction, a new polymer end group, containing an α-methyl-, an α-phenyl and an α-bromo-group, is formed. This type of end group, containing an α-substituant, an α-bromo-group and a β-hydrogen, can lose hydrogen bromide, preferentially forming, the kinetically favored new functional exo-olefinic bond. A similar kinetically favored exo-olefinic bond is formed when hydrogenhalides are "lost" from methacrylate end groups. Note that publication WO 99/54365 indicates that the thermodynamically favored, unreactive endo-double bond is formed in such a reaction. We have found however that if a molar excess of α-methyl styrene has been added to the process, this first stage of the coupling process exemplifies an atom transfer addition reaction, and the material can be isolated, affording a functional hetero-telechelic polymer that can be considered as a macromonomer suitable for the preparation of graft copolymers by (co)polymerization through the reactive terminal exo-olefinic bond.

However, if less than, or a stoichiometric amount of α-methylstyrene is added to the reaction and this newly formed, kinetically favored, terminally unsaturated functional polymer is further exposed in situ to the action of the redox active transition metal compound on a second polymer chain also containing a terminal radically transferable atom or group, the formation of a second free radically active chain end can result in addition of the first formed polymer possessing a reactive unsaturated exo-bond this first formed polymer adds to the second active chain end; resulting in a catalytic atom transfer chain coupling reaction, or an atom transfer linking reaction (ATLR), with the formation of a new homo-telechelic polymer possessing an α-bromo-phenyl group within the polymer chain. If this coupled polymer loses a second hydrogen bromide group it forms a halogen free homo-telechelic polymer with an endo-olefinic bond within the polymer chain. Polymers possessing such endo-olefinic bonds are less active as macromonomers in ATRP reactions and such materials are stable under reaction conditions and easily isolated without gelation of the product.

The result of this specific exemplary series of controlled catalytic radical transfer addition reactions and hydrogenhalide elimination reactions, is a catalytic coupling reaction forming an α,β-disubstituted styrene wherein each substituant is the first formed polymer.

While this ATLR process has been described and exemplified by consideration of a mono-functional halo-telechelic polymer with α-methylstyrene it can be applied to any oligo/polymer with a radically transferable atom or group and any linking molecule that will form a reactive exo-olefinic bond after an ATRA reaction and loss of hydrogen halide.

In the above example, if the first formed polymer had been designed using an initiator with two radically transferable atoms of groups then the catalytic coupling reaction would take place at each termini of the polymer and the reaction would be a catalytic atom transfer chain extension reaction.

Figure 7:
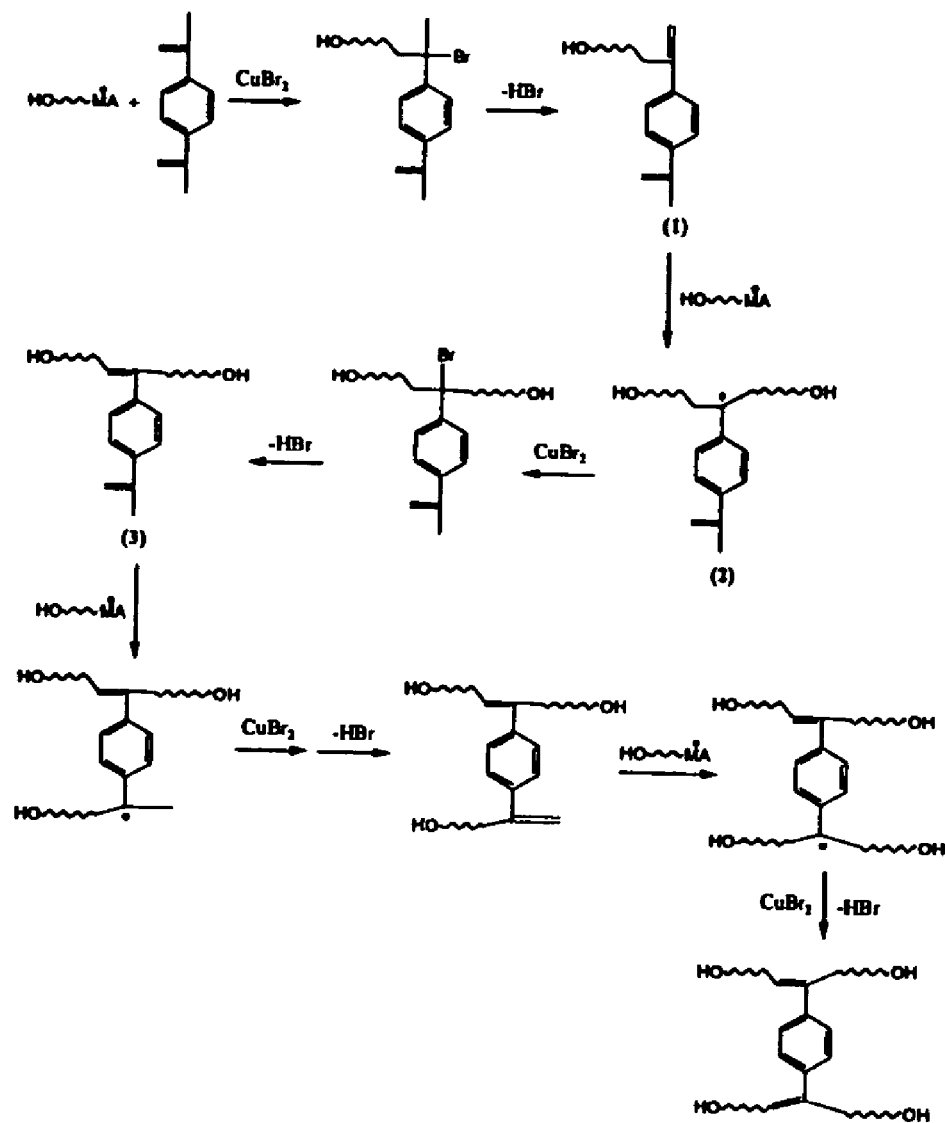
FIG. 7. is a reaction schematic showing preparation of four armed star by coupling.

In FIG. 7, the potential of this reaction and its applicability to the preparation of novel polymers is illustrated by the example of a di-isopropenyl benzene as the coupling agent. In the appropriate mole ratio, the use of di-isopropenyl benzene which results in a sequence of atom transfer addition reactions and dehydrohalogenation reactions, can culminate in the preparation of a four armed star polymer, with arms of controlled molecular weight, composition and functionality, with a residual disubstituted benzene core.

Use of triisopropenyl benzene, under appropriate conditions, would result in a halogen free six, armed star polymer with functional end groups.

Further defining the capabilities of this reaction to prepare novel materials, if one employs, for example, a (co)polymer with α-methylstyryl, or isopropenyl benzene substituents along the chain as the linking molecule for this catalytic coupling reaction then one would prepare graft copolymers with the possibility of two similar graft (co)polymers emanating from one specific site on a polymer backbone. This would be a new type of graft copolymer for copolymers with grafts composed of free radically (co)polymerizable monomers. The new graft copolymer is one in which the polymers are grafted to each other within both polymer chains rather than grafting to the backbone polymer at the terminus of the other polymer chain. Indeed there would be a further degree of symmetry in these "grafted within" copolymers since the grafting site would essentially be situated at the midpoint of the grafted chain. "Grafting within" two polymer chains results in differences in the development of bulk properties in materials, particularly elastomeric materials, and in differences in various interfacial and diffusion properties. The differences in the interfacial and diffusion properties occurs for the bulk graft copolymer, for property development in composites, and blends or alloys containing such a graft copolymer as a component or as a polymeric surfactant, and for surface property modification or interfacial property control, particularly when compared to graft copolymers where grafting occurs at one polymer terminus as is the case for current commercial graft copolymers. The two polymer chains particularly suited to "grafting within" include polymer chains with differing, readily modifiable, composition, differing phylicities or different macrofunctionalities, and known functional groups on the grafted polymer chains.

(Co)polymers with isopropenyl benzene substituents along the chain need not be considered exotic starting materials since copolymers of ethylene, propylene and isobutylene are presently commercially available with benzene substituents present on the backbone. These units introduced through copolymerization of ethylene, propylene or isobutylene with (substituted) styrene could be readily prepared with precursors for isopropenyl substituents, yielding the potential for novel "grafted within" copolymers from the largest volume addition polymers in the market. Indeed any copolymer containing a styrene residue in a monomer unit could be converted into a backbone polymer suitable for grafting to, or grafting through, by this purely exemplary disclosed coupling process resulting in polymers "grafted within" both polymer chains and such backbone polymers can be prepared by controlled polymerization processes yielding materials in which all polymer segments have been assembled utilizing controlled processes.

Indeed, the system described above can be utilized with any polymer containing an appropriate α,α-disubstituted olefin functional group attached to the polymer chain. Such α,α-disubstituted olefins would include isopropenyl (meth) acrylate, vinyl ethers, or isopropenyl ethers which can be derived from allyl ethers. In this later case it would be possible to copolymerize a vinyl allyl ether with other free radically copolymerizable monomers by an ATRP process, isomerize the allyl substituent to an isopropenyl substituent, and use this material as the linking molecule for a second polymer prepared by an ATRP process yielding a grafted within polymer in which each segment of the graft copolymer has been prepared by a fully controlled radical polymerization process. Since the comonomers for the copolymer segments can be chosen from any free radically copolymerizable monomers there is an almost unlimited choice of property differentiation attainable between the blocks of the graft copolymer in a simple sequential process.

If one employed di-isopropenyl benzene as coupling agent at a concentration of 0.5 molar equivalents to the growing polymer chain, or radically transferable atoms or groups, then the first coupled polymer formed would be a statistical mixture of coupled products retaining a statistical mixture of residual available α,α-substituted unsaturation within the first coupled polymer chain(s). Further use of this polymer to couple a second (co)polymer formed from different (co) monomer(s) would result in a statistical mixture of four armed star polymers.

However if one desired further control one could employ a molecule comprising two different α,α-disubstituted olefins, with slightly different reactivities, then the more reactive α,α-disubstituted olefin would react with the first copolymer forming a coupled copolymer with a second α,α-disubstituted olefin within the coupled polymer chain. Use of this first coupled (co)polymer to couple a second (co)polymer would result in a (co)polymer with two arms of one (co)polymer composition and two arms of another (co)polymer composition; essentially two polymers mutually grafted at the middle of each (co)polymer chain. Again such a novel four armed star material, each arm of which is prepared by a controlled polymerization from a wide range of radically (co)polymerizable monomers, and optionally possessing functionality at the end of each polymer chain, would bring a new set of properties to surfactants, adhesives, alloying and blending surfactants, dispersants, personal care products and composite matrix components as polymer properties such as solubility, phylicity, Tg, and other properties are tailored for subsequent use or reaction in the preparation of blends, alloys or composite materials.

One does not have to prepare two different copolymers in order to obtain useful properties from such hetero-arm star (co)polymers. When one initiates the polymerization of one or more radically (co)polymerizable monomers with one concentration of initiator and adds a second aliquot of initiator prior to completion of the first (co)polymerization then a material with a bimodal molecular weight is obtained. If indeed one was conducting a copolymerization and the (co) monomers had different reactivity ratios then the copolymers, initiated at different times in a batch process, would have different compositions or gradients along the copolymer chain. Another route to compositional variation would be to add a second monomer some time after the initiation of polymerization or at the time of the second addition of initiator to form in-situ a block/gradient copolymer. Coupling by use of molar equivalents of α,α-disubstituted olefin units lower than 0.5 forms a multiarmed star with a statistical mixture of arms of different molecular weight/composition, the star polymers are a statistical mixture of the compositions and molecular weights initially present, and the hetero-armed star (co)polymers are formed in a single coupling step.

Materials with similar topology have been formed by living anionic polymerization of styrene and butadiene, where a second addition of catalyst is made prior to the complete conversion of the first added styrene monomer, forming block copolymers with polystyrene segments with different molecular weights. Such materials are known commercially as Styroflex® resins when supplied by BASF. (See, *Macromol. Symp.*, vol. 132, pp. 231-43 (1998); and U.S. Pat. No. 5,910,546 issued to Phillips Petroleum Company). However, in contrast to the limited choice of monomers that can be polymerized by an anionic mechanism, with the ATRP processes described in this application the composition and linear topology of the arms can be chosen from a wide range of radically (co)polymerizable monomers and the resulting materials can develop a much wider range of properties than the commercially available useful pure styrene or styrene/butadiene copolymers known to date.

Since many useful materials can be prepared with "less than perfect," or statistic coupling of the components of the system, then desirable products would also be obtained by coupling between a dispersed particle or surface and a reactive polymer chain end. If the particle or the surface of the material possessed an attached functional group additionally comprising a radically transferable atom or group then the above described coupling reaction could be conducted to form polymer grafted to the particle or surface. Such a reaction would modify the particle or surface of a material and would produce more readily dispersible particles or blends of materials with stronger interfacial properties.

An exo-double bond is itself a reactive group and much known chemistry is available to capitalize on this functional group or to convert this group into alternate active functionality for further reactions or interactions including polymerization and copolymerization. A further degree of functionality would be introduced to the first head group by conducting an atom transfer addition reaction with an appropriately substituted α-substituted-α-hydroxymethyl olefin yielding an aldehyde/enol after dehydrohalogenation has occurred. Examples of such an olefin include α-hydroxymethyl styrene, 1-hydroxy-α-ethyl styrene or ethyl-α-hydroxy methylacrylate.

In the above examples describing the fully controlled coupling reaction the chemistry has been exemplified using an α-methyl substituent on a styrene. Other substituents would also work equally well, or even better if faster reactions are desired.

Use of an aromatic substituent such as that present in 1,1-diphenylethylene or 1,3-bis(1-phenylethenyl)benzene would also appear to be appropriate for "living" radical coupling. Both molecules have been demonstrated as suitable coupling agents for living anionic and "living" cationic coupling. However in the case of these specific agents, the first formed polymer product of addition of the appropriate α,α-di-aryl substituted olefin is a molecule with an endo double bond. I.e. 1,1-diphenylethylene essentially caps the polymer chain forming a polymer with a terminal endo-double bond. This is precisely the chemistry described in WO 99/54365. However 1,3-bis(1-phenylethenyl)benzene acts to couple two chains by sequentially capping two different chains. One further available molecule that would act to link two polymer chains by such sequential atom transfer capping reactions described above is 2,2-bis[4-(1-phenylethenyl)phenyl]propane.

In the above examples a single benzene unit has been used as one substituent on the olefin or as the foundation for the linking group for multifunctional molecules but other substituents and other linking groups can be employed.

Throughout this discussion the focus has been on the preparation of polymers possessing functional groups of the termini of the polymer chains. However, for some applications, such as viscosity index modifiers, star copolymers with no functional groups would find utility and indeed would be preferred.

The complete reaction of a non-polymerizable (co)monomer such as allyl alcohol or 1,2-epoxy-5-hexene with the active polymer chain end, optionally with a hydroxy group present on the initiator chain end, is generally a slower reaction than the polymerization of the monomer. The inventors have found it convenient to utilize some of the tools demonstrated in earlier applications to increase the rate of reaction, including the use of (i) an excess of the allyl alcohol, (ii) the addition of more catalyst and, (iii) a reduction in the concentration of the redox conjugate present in the system. These actions arise from a consideration of the dynamics of the equilibrium between each of the components of the ATRP process. A high level of functionality can be introduced into a polymer by following these steps, see the later Experimental section.

The "homo" telechelic materials formed in this type of reaction can be very useful in the formation of adhesives and sealants through reaction with isocyanate curing agents. The differences in reactivity between the hydroxy groups on each end of the polymer allows one to control the curing rate of each polymer terminus and the resulting properties of the partially cured and completely cured material.

True homo-telechelic polymers can also be prepared by use of this combination of an ATRP process followed by reaction with a non-polymerizable monomer containing the desired functionality as a second substituent. One employs an initiator with more than one radically transferable atom or group. A difunctional initiator leads to a linear homo-telechelic polymer while use of initiators with greater numbers of transferable atoms or groups leads to telechelic star (co)polymers. In a non-limiting example, use of an initiator such as dimethyl-2,6-dibromoheptadionate for the polymerization of methyl acrylate followed by addition of a hydroxy-containing non-polymerizable monomer leads to a true homotelechelic α-ω-dihydroxy-poly(methylacrylate.) As above, the other components in the process affect the rate of reaction but under appropriate conditions a dihydroxy polymer suitable for subsequent material forming reactions such as conversion into a polyurethane is produced.

With these teachings available three general techniques can now be applied for the synthesis of telechelic polymers and will be exemplified by consideration of the preparation polydiols by atom transfer radical polymerization and they are shown below in Scheme 4. The first method (A) involves a one-pot technique where the polymerization of methyl acrylate (MA) was initiated by a difunctional initiator (Br—I—Br), such as dimethyl 2,6-dibromoheptadionate. An excess of allyl alcohol was added to the polymerization mixture at high conversion. Allyl alcohol is able to add to the growing polymer chain. However, the formed radical is not able to propagate. Instead, it undergoes an essentially irreversible reaction with cupric bromide yielding a bromine terminated polymer. The polymer was analyzed before and after the addition of allyl alcohol.

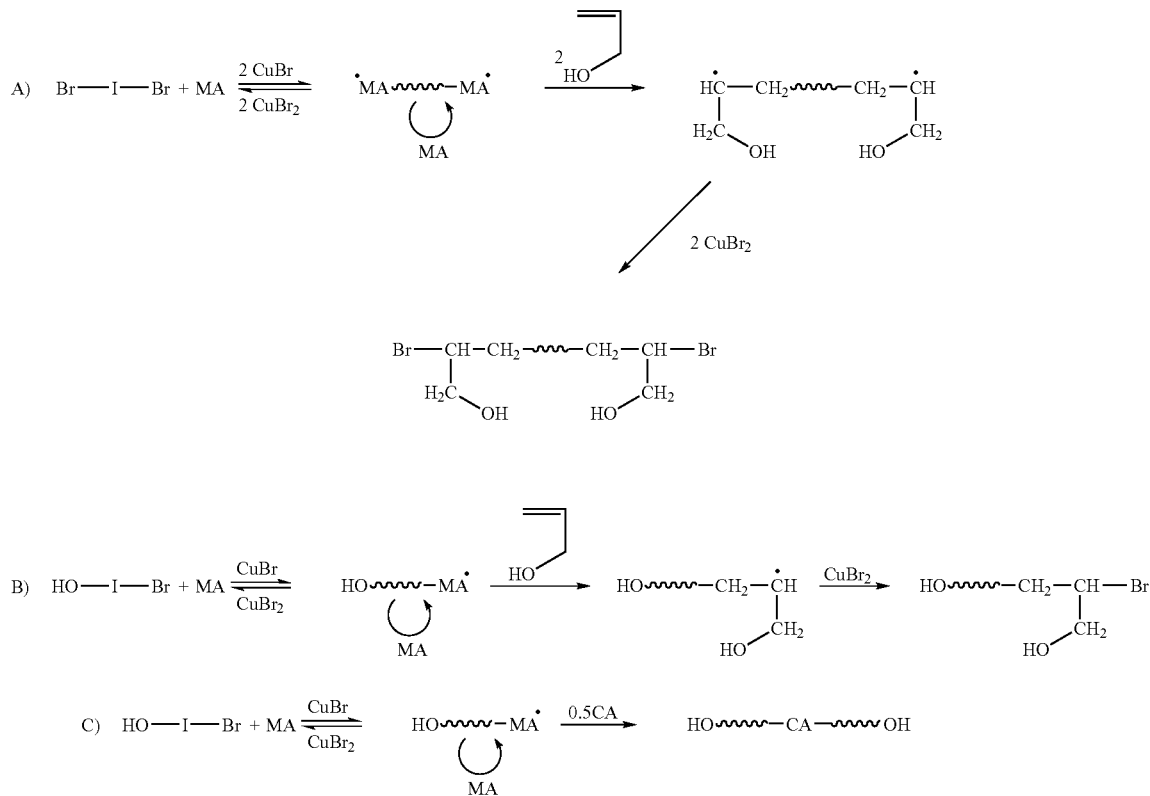

Scheme 4. Formation of telechelic diols

The degree of functionalization was determined. In the example given, the degree of functionalization was f=1.9 three hours after the addition of allyl alcohol.

The second technique employed involved initiation of methyl acrylate by a hydroxyl-functionalized initiator, i.e. ethylene glycol mono(2-bromoisobutyrate), as is shown as route B in Scheme 4. At high conversion, allyl alcohol, copper (0), cuprous bromide and PMDETA were added. The degree of functionalization was calculated before the addition of allyl alcohol and 3 hours after the addition of allyl alcohol. The degree of functionalization just before the addition of allyl alcohol was f=1.0 corresponding to one chain per hydroxyl group. This is expected because the only chain initiating event occurs when the hydroxyl-functionalized initiator reacts with CuBr yielding a hydroxyl-functionalized radical and cupric bromide. Three hours after the addition of allyl alcohol the degree of functionalization was f=1.8.

The third technique shown in Scheme 4, as route C, involves coupling of α-hydroxy-ω-bromo-poly(methyl acrylate) by a coupling agent. This polymer was prepared by initiating methyl acrylate with ethylene glycol mono(2-bromoisobutyrate). The polymerization was terminated at 80% conversion, and the polymer was isolated by precipitation in hexanes. The coupling reaction was performed by measuring the polymer and cuprous bromide in a round-bottomed flask. The flask was sealed and purged with nitrogen. PMDETA, the coupling agent, and benzene were added and the reaction mixture was placed at 60° C. In the case where the coupling agent was α-methylstyrene and the ratio of chains to α-methylstyrene was two, the molecular weight increased from 1330 g/mol to 2960 and the molecular weight distribution increased from 1.10 to 1.32. The degree of functionalization as determined by $^1$H NMR was f=1.8.

The functionality of the polymers formed by coupling was demonstrated by formation of a polyurethane by reaction of the linear α-ω-dihydroxy-polymers with methylenediisocyanate [MDI].

When m-diisopropenylbenzene was used as the coupling agent and the ratio of chains to m-diisopropenylbenzene was four, the molecular weight increased from 1060 to 3860 and the molecular weight distribution increased from 1.10 to 1.69. The degree of functionalization was f=2.8. This result indicates that stars are formed if the coupling is performed with m-diisopropenylbenzene. If a 1:1 ratio of chains to m-diisopropenylbenzene was used, analysis clearly showed that addition of m-diisopropenylbenzene was followed by elimination of HBr. This led to the suggested mechanism shown in FIG. 7 where addition of poly(methyl acrylate) to m-diisopropenylbenzene is followed by reaction with cupric bromide and subsequent elimination, yielding HBr and a terminal olefin (1). The newly formed olefin is able to add to poly (methyl acrylate), to yield (2), which then reacts with cupric bromide and eliminates HBr to yield the coupled product (3). A similar addition can occur at the second double bond of the coupling agent and the final product is a star with up to four arms.

In example B) of Scheme 4, describing the use of a bifunctional initiator molecule containing first a radically transferable atom or group and a second different functional group then a hetero-telechelic polymer is initially formed. When the second functional group on the initiator molecule is a hydroxy group then the initial (co)polymer product contains a hydroxy group at one chain end and a radically transferable atom or group at the other chain end(s). The atom transfer catalytic coupling process described above, C) of Scheme 4, can lead to a homo-telechelic α-ω-dihydroxy-polymer, i.e. when 0.5 mole equivalents of a molecule exemplified by α-methyl styrene is added, or a tetra-ω-hydroxy star polymer after addition of 0.25 mole equivalents of a molecule exemplified by a di-isopropenyl benzene at the desired stage of the atom transfer polymerization step.

In the above discussion a first hetero-telechelic polymer; α-bromo-ω-hydroxy poly(methyl acrylate) was used as an exemplary model polymer for this atom transfer coupling reaction. This model polymer was prepared by polymerization of methyl acrylate using ethylene glycol mono(2-bromoisobutyrate) as initiator and cuprous bromide/N,N,N',N'',N''-pentamethyldiethylenetriamine (PMDETA) as the transition metal catalyst. Use of 0.5 mole of α-methylstyrene per mole of α-bromo-ω-hydroxy poly(methyl acrylate) essentially doubled the number average molecular weight (Mn). When 0.25 mole of di-isopropenyl benzene was used in the coupling reaction, the Mn of the polymer, after removal of bromine, was quadrupled indicating the formation of a four armed star polymer with four terminal hydroxy groups.

The dehydrohalogenation reaction to form either the endo- or exo-double bond can be base enhanced, or assisted by the addition of an acid acceptor. Any acid acceptor can be used including compounds such as a basic organic molecule including linear and heterocyclic N containing compounds, ion exchange resins and/or inorganic acid acceptors. In the particular exemplary examples provided above to demonstrate how this novel coupling reaction can give increased control over topology and functionality by application of these reactions it was also determined that the dehydrohalogenation reaction can be assisted by the addition of base including an organic base such as triethylamine or 2,6-di(t-butyl)-pyridine.

While not limiting the application of the coupling reaction to the use of an α-substituted styrene as the linking molecule, it is clear that any hetero-telechelic molecule containing a radically transferable atom or group can be transformed though this catalytic atom transfer coupling reaction and that the overall level of functionality of the resulting material can be controlled by selective use of compact molecules containing mono-, di-, or tri-substituted isopropenyl groups to form linear, four armed or hexa-armed polymers. When di-, or tri-, substituted isopropenyl benzene are used and the reaction is run with higher, but still less than one to one, molar ratio's of the unsaturated isopropenyl benzene to radically transferable atom or group, then controlled levels of functionality between 2 and 4 or 2 and 6 can be obtained. Another route to functional linear polymers with controlled levels of functionality greater than two is to use mixtures of mono and di-, or tri-, substituted isopropenyl benzene. Materials with levels of functionality greater than two are a desired choice when the resulting application for these polymers is use of these materials in polymeric condensation reactions to form fully crosslinked systems. The level of crosslink density being controlled by the degree of functionality first present in the components of the system.

One should also consider that the intermediate products, the exo-olefinic terminated polymers formed when an excess of the α,α-substituted olefin is added, are themselves multi-functional materials. The α-methyl styrene discussed above is one example of an α-substituted olefin.

If one desired non-linear thermoplastic polymers with a multiplicity of polymer chain interactions an extension of the use of an isopropenyl benzene as a substituant in a (co) polymer to form graft copolymers wherein the graft copolymer is grafted within the polymer chain can be employed. A convenient building block is a copolymer with a m-di-isopropenyl benzene as a substituant in a (co)polymer. This would lead to a four armed graft copolymer emanating from each unit initially containing the m-di-isopropenyl group.

The above example for the preparation of a linear polymer used an initiator in which the second functional group present on the initiator molecule was a hydroxy group and produced polymers with terminal hydroxy functionality. However, it is known from the literature that the second functional group can be chosen from many functional groups and is introduced to an ATRP polymerization by choosing an appropriate initiator. All normal small organic functional groups including epoxy, carboxy, amine, silyl, perfluoro-alkyl, and cyano, can now be introduced into homo-telechelic polymers by this catalytic coupling process using appropriate (masked) functional initiators. However, as described in other applications the initiator can be any molecule containing a radically transferable atom or group including low molecular weight inorganic materials and organic/inorganic or hybrid polymers. Application of this catalytic coupling process can therefor lead to telechelic symmetrical hybrid polymers, block copolymers and functional hybrid star copolymers.

The use of di-isopropenyl benzene to prepare a range of useful well defined star polymers as described above is a more controlled process than the use of divinylbenzene as a (co) monomer to prepare "star polymers" by the "arm first" method, described in earlier in U.S. patent application Ser. No. 09/018,554. However use of functional initiators for an ATRP process followed by addition of divinylbenzene, or other radically (co)polymerizable diolefinic molecules, to the reaction can lead to end functional star polymers with a greater numbers of arms than the fully controlled process described above. End functional star polymers with various functional groups such as hydroxy, epoxy, amino, cyano, alkyl, perfluoroalkyl, silyl, siloxane, phosphazene and halogen on the outer layer chain termini can be successfully prepared by addressing the pertinent factors, such as choice of counterion, optional solvent, appropriate concentration of redox conjugate, and where appropriate added metal zero and if required added ligand, the structure and molar ratio of added diolefinic molecule to co-functional linear growing polymer initially terminated with a radically transferable atom or group.

Divinylbenzene is shown to be particularly suited for preparation of "arm first" star polymers containing styrene as a (co)monomer. The utility of other commercially available diolefinic coupling agents is also demonstrated for acrylate and methacrylate containing copolymers. 1,4-Butanediol diacrylate and ethyleneglycol dimethacrylate have been used to form star polymers with substituted acrylate and methacrylate (co)monomers. Within the descriptions of these diolefinic coupling agents as models it is clear that any difunctional free radically (co)polymerizable monomer can be chosen as the active (co)monomer for the core of this type of tele-functional multi-armed star (co)polymer.

The different coupling agents displayed differences in reactivity similar to that displayed by the monovinyl model monomers. Under one set of reaction conditions for evaluation of the coupling reactions based on coupling of telechelic t-butylacrylate oligo/polymers with ethyleneglycol dimethacrylate gave complete gelation of the reaction mixture while use 1,4-butanediol diacrylate and divinylbenzene did not lead to gelation. Use of 1,4-butanediol diacrylate did lead to formation of a viscous fluid very quickly. Size exclusion chromatography (SEC) traces showed that 1,4-butanediol diacrylate coupled core polymers had undergone significant star-star coupling affording high molecular weight polymers with broader molecular weight distributions. In contrast, divinyl benzene led to formation of single core coupled star polymers with narrow molecular weight distributions. Continued exposure of these divinyl benzene star polymers to reaction conditions led to a more tightly coupled single core polymer rather than core to core coupling. As before, several factors are pertinent to the reaction including the choice of exchange halogen, the addition of the appropriate level of redox conjugate deactivator, the ratio of coupling agent to telechelic oligo/polymer and the optional use of solvent.

The coupling chemistries discussed above are shown diagrammatically in Scheme 5.

Scheme 5 Arm First Star Coupling and Star-Star Coupling.

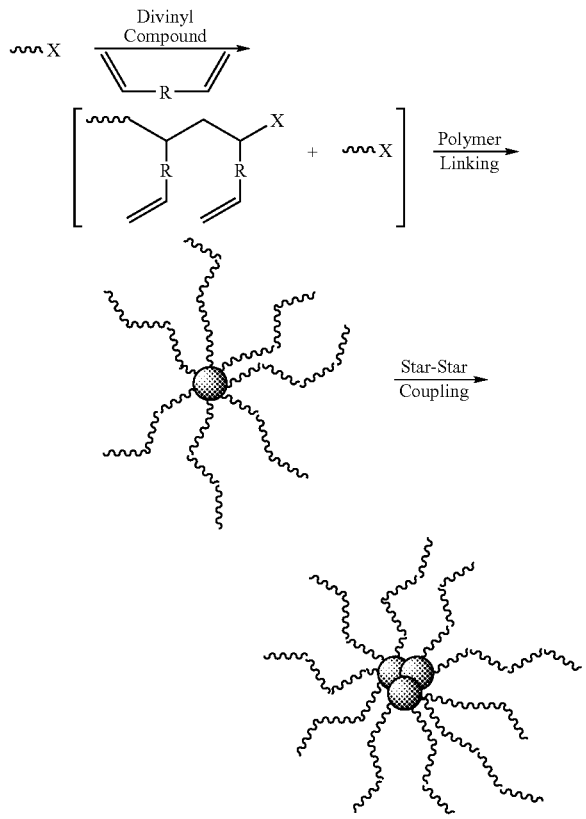

The structure of the R linking group in the divinyl compound can be chosen to reflect the solubility parameters of the first polymer and/or the desired structure of the star (co) polymer. In addition it is possible to further modify the structure of the core by (co)polymerization of the chosen divinyl compound with a monomer that will further tailor the properties of the core to the application of the product.

The properties of the materials prepared by the topological control described above can also be enhanced by use of functional initiator for the prior preparation of telechelic functional arms. Discussing, once again as a non-limiting example, use of an initiator with a radically transferable atom or group and a hydroxy group, as a substituent on the polymer originator, allows one to form multiarm core polymers with hydroxy functionality at the terminus of each arm. In addition to possessing inherently useful bulk properties these telefunctional multiarm (co)polymers can find use as material modifiers since they possess low viscosity, for ease of dispersion, and high functionality for reactivity with other materials or for surface modification in blends and alloys. As an example they would modify the surface properties of fibers, films or the interfacial properties of blends containing dispersed solid phase materials and in interfacial property modification during the preparation of composites.

Another specific non-limiting example would be initiation of the (co)polymerization of the linear arms with an initiator possessing a functional silicone containing group. The resulting multifunctional multi armed star (co)polymer would be a hybrid (co)polymer possessing functional inorganic groups at each accessible polymer terminus. An example of the utility of this type of hybrid material would be to act as both a material dispersant and to modify the surface properties of a high performance magnetic recording media polyester film, another would be in the preparation of glass or mineral filled materials where the multiple functionality would find utility in tailoring the interfacial properties between the matrix and dispersant/reinforcement.

In addition to tailored telechelicity use of the disclosed controlled polymerization process combined with the capabilities of modifying the properties along a polymer chain, the multifunctional gradient or block star copolymers can possess tailored bulk properties such as compressibility, allow for efficient dispersion in any matrix, and hence modification of both compressive and tensile properties of composite materials.

As we have demonstrated for well controlled catalytic coupling of active polymer chains in ATRP there are significant changes in the polymer topology when one moves from one functional coupling group to multiple groups. In this "less controlled" system using simple di-substituted vinyl compounds for coupling, or core forming reactions, there are also topological changes when one moves to multi-functional compounds as the matrix material. Use of such multi-functional reactants produce products that resemble well defined functional networks rather than stars. Use of this technique will allow the formation of elastomeric networks in which the elastic response and hysteresis of the material can be tuned by consideration of the molecular weights of the low Tg segments and branching density of the core or linking molecule.

Miktoarm star (μ-star) polymers can be prepared by the formation of star polymer first through the "arm first" approach, followed by growing polymers from the crosslinked macroinitiator core. This has been demonstrated for controlled radically (co)polymerizable monomers by first using a preformed poly(tBA) arm as the first macroinitiator for the core forming coupling reaction. A star poly(tBA) core macroinitiator was produced which was followed by the formation of μ-star when nBA was added and polymerization was continued. Hydrolysis of the tBA produced a (μ-star) polymers with arms of differing phylicities.

In the integrated ATRP/ATRA process, the first alkyl halide end-groups are activated by a transition metal catalyst, to generate radicals which then react with or add to functional alkenes that are not capable of homopolymerization under these conditions. As an example of this approach, stars and hyperbranched polymers prepared by ATRP are functionalized by the incorporation of reactive moieties on the activated terminal sites of arms, or branches, of the polymer. Additionally as described earlier, the use of a functional initiator allows for the synthesis of polymers with functionality at the initiator site, along with an alkyl halide group at the chain end. The synthesis of functional multi-armed stars can be achieved by two schemes using the ATRP of free radically (co)polymerizable monomers to produce polymers with alkyl halide groups at one chain end. With an initiator possessing a radically transferable atom or group and a second functional group stars are formed by in the presence of divinylbenzene (DVB) at the end of the polymerization process. The other approach is to use an initiator with multiple radically transferable atoms or groups and conduct an atom transfer radical addition reaction with a molecule possessing a second functionality at the end of the polymerization step.

Schemes 6 and 7 present the synthesis of functional stars and hyperbranched polymers by ATRA and ATRP reactions.

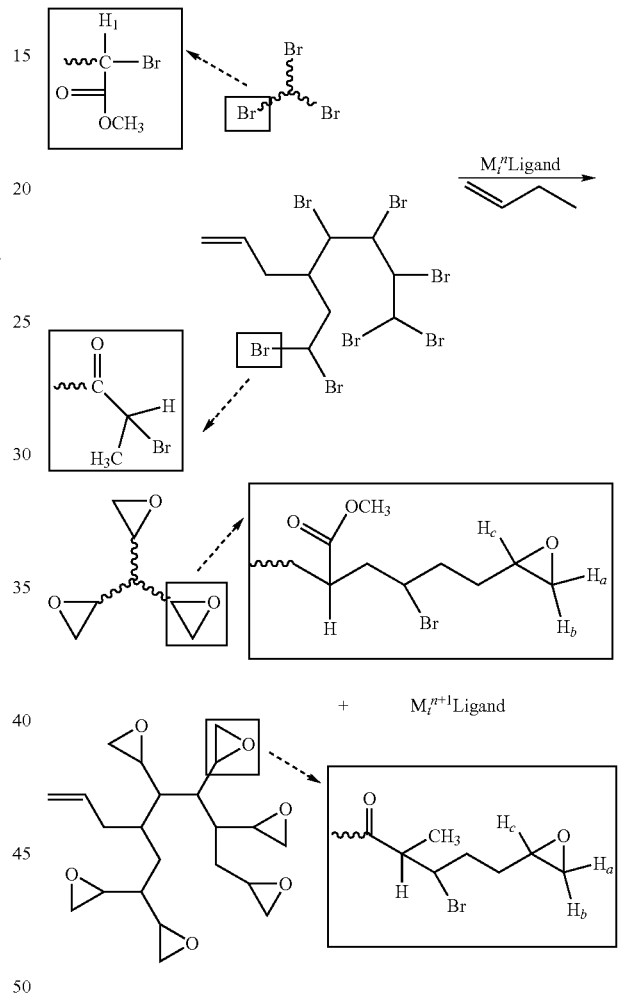

Scheme 6: Functionalization of Stars and Hyperbranched Polymers by ATRA

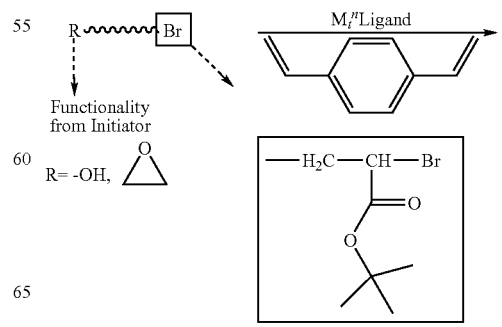

Scheme 7: Functional Stars from ATRP

Functionality from Initiator

R= -OH,

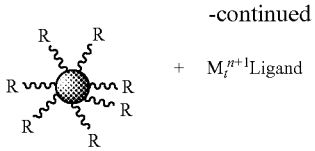
+ $M_t^{n+1}$Ligand

If one wished to form functional star copolymers by the arm first approach in which the core was essentially free from radically transferable atoms, then one would carry out the coupling reactions with isopropenyl substituents rather than vinyl-substituents as described above for the catalytic atom transfer coupling reaction.

One specific tool for control over the ATRP process that was introduced in U.S. Pat. No. 5,807,937 was the use of the redox conjugate of the transition metal complex to control the rate of polymerization and the molecular weight distribution of the polymer formed. This concept can now be extended, particularly in emulsion systems to incorporate addition of the transition metal redox conjugate alone, i.e. without additional complexing ligands, to further modify the various equilibria associated with use of a transition metal complex in an active biphasic polymerization media. This is demonstrated by the addition of cupric bromide to the aqueous phase of a copper based emulsion ATRP. The presence of the cupric bromide in the aqueous phase prevents, significantly reduces, or sufficiently reduces, the migration of the ligand complexed cupric bromide redox conjugate from the organic phase into the aqueous phase and hence one retains control over the polymerization. The critical role of the redox conjugate plays in determining the controllability of the polymerization is further detailed by a consideration of the manner in which the transition metal complex is partitioned within the system by a continuation of the careful consideration of the effect of substitution in various ligands Conditions for the controlled polymerization of free radically (co)polymerizable monomers have also been developed for miniemulsions using a small molecule cosurfactant, U.S. patent application Ser. No. 09/126,768. Oil soluble standard free radical initiators, exemplified by AIBN, can be now be utilized in such systems. A further advance in emulsion systems allows the polymerization of water soluble monomers by the "standard" ATRP process. "Free radical initiator" and "standard free radical initiator" as used herein shall refer to the initiators used in conventional noncontrolled free radical polymerization to generate a radical and begin the radical polymerization. Examples include azo compounds, such as AIBN, peroxide compounds, such as bibenzoyl peroxide, and other commercially available initiators, such as V-50. Removal of the catalyst by exposure to ion exchange resins is particularly expedient in emulsion systems. The increased level of control that arises from advances in understanding the role of the ligand in modifying catalyst activity is also demonstrated for emulsion systems where the rate of polymerization of acrylates is increased by use of ligands such as a substituted picolyl amine such as N,N,-bis-(2-pyridylmethyl) octylamine (BPMODA).

U.S. patent application Ser. No. 09/126,768 disclosed extension of controlled ATRP to biphasic water-borne systems and discussed the new challenges to finding an appropriate catalytic system. To achieve the controlled/"living" feature of the polymerization, as well as maintain a stable dispersed system, there were many issues to be considered. For the ligand, at least two extra requirements had to be considered, the ligand should have sufficient binding affinity towards the metal in order to compete with water as a potential ligand; it should also solubilize sufficient active metal complex, namely both Cu(I) and Cu(II), in the organic phase where the polymerization takes place, so that the essential equilibrium for ATRP can be established. Not every ligand that works in bulk or solution ATRP continues to be successful in water-borne systems. To find appropriate ligands, several potential candidates were investigated. The investigation indicated that greater solubility of the Cu(II) species was critical, and by increasing the solubility of the bipyridine ligand through increasing the length of the alkyl substituent greater control was obtained.

The results are presented in Table 13 for the polymerization of butyl methacrylate with various substituted bipyridene derivatives as ligands. The ligands are shown in Scheme 8.

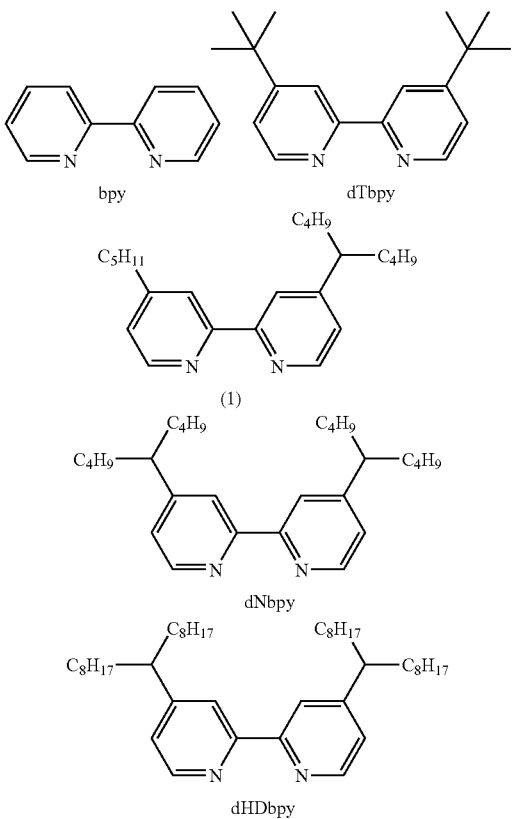

The use of 4,4',4"-Tris(5-nonyl)-2,2':6',2"-terpyridine (tNtpy), shown below, a substituted terpyridine also led to controlled polymerization of BMA.

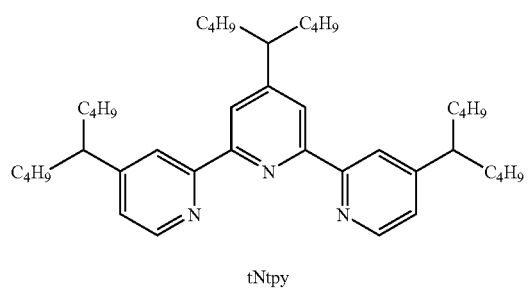

Similar to the experience with unsubstituted bipyridine, the use of the aliphatic amines, PMDETA and Me$_6$TREN, shown below; failed to give controlled character to the polymerization of BMA in water-borne system, due to the high solubility of the Cu(II) complex in water.

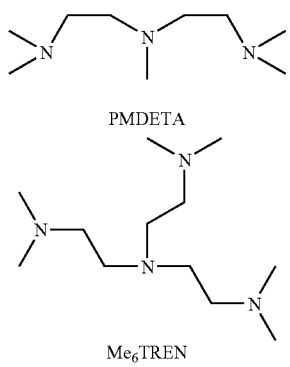

Two hybrids of aliphatic and aromatic amines, picolyl amines, N,N,-bis(2-pyridylmethyl)octylamine (BPMOA) and BPMODA, were also tested as the ligands for the ATRP water-borne systems.

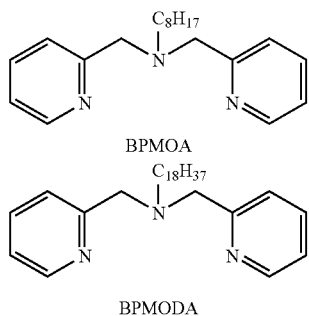

Again using butyl methacrylate, purely as an exemplary monomer which in no manner should limit the utility of the conclusions, the polymerizations using both ligands initially were not very well controlled. Since these ligands work very well in bulk and solution polymerization this result in an emulsion system could be attributed to non-optimal partitioning of the transition metal system in the multiphase system. With this interpretation of the "failure" it is expected that adjusting the reaction conditions, the control of the polymerization of BMA may be largely improved, especially in the case of BPMODA.

Indeed, when the two ligands were applied to butyl acrylate, the control was improved because of the larger partitioning constants of Cu(II) complexes in butyl acrylate than in butyl methacrylate. BPMOA, although excellent in bulk polymerization of butyl acrylate still resulted in the formation of polymers with polydispersities higher than 1.5 in water-borne system. This indicates a poor solubility of the deactivator in the organic phase. Having a longer hydrophobic chain, BPMODA greatly enhances the organic solubility of Cu(II) species. As a consequence, the polymerization of butyl acrylate using BPMODA as the ligand was well controlled, as evidenced by a linear increase of molecular weight with monomer conversion, as well as polydispersities less than 1.3 throughout the polymerization. This would indicate that the phylicity of the catalyst complex is of importance in determining the level of control attainable from a given system and that the partition coefficient of the catalyst complex can be adjusted by consideration of the substituents on the ligand in addition to consideration of the type of ligand employed.

Among the several non-limiting ligands investigated, bipyridene derivatives with long alkyl substituents (dNbpy, dAbpy and dHDbpy), and BPMODA are good ligands for ATRP water-borne systems. The partitioning of the corresponding Cu(II) complexes between organic and aqueous phases, as well as the values of the atom transfer equilibrium constants, play crucial roles in controlling the polymerization outcome.

In U.S. patent application Ser. No. 09/126,768 describing emulsion ATRP the use of reactive substrates was discussed. In addition the use macromonomers as surfactants and comonomers has led to novel compositions for polymeric emulsions. In the area of surfactants the relative hydrophylicity of the molecule must be considered. In the polymerization of butyl methacrylate use of a hydrophylic surfactant leads to polymer coagulation as the polymerization proceeds. With a surfactant that leads to a stable emulsion it is possible to produce a stable system at low surfactant concentrations and the level of surfactant employed does not affect the polymerization rate or the molecular weight of the polymer produced. This is an unexpected result since one could expect a proportional relationship. The effect can be explained if one assumes that the amount of surfactant affects the partitioning of the different oxidation states of the metal complex. A higher level of surfactant could bring more cupric complex into the organic phase decreasing the polymerization rate hence offsetting the effect of reducing the particle size or increasing the number of particles. This indicates that the surfactant can be selected to produce the desired particle size at an appropriate polymerization rate.

The particle size is also affected by the concentration of Cu(II) added to the system.

In reverse ATRP emulsion systems, the efficiency of the added standard free radical initiator is only 30% for AIBN, although this efficiency can be improved by selection of more polar initiator molecules. If a conventional ATRP initiator RX is also added to the system the apparent efficiency of the initiation is increased to 75%. This is a result of the standard ATRP initiator participating in the initiation of the polymerization after "reverse" ATRP has formed the active catalyst complex.

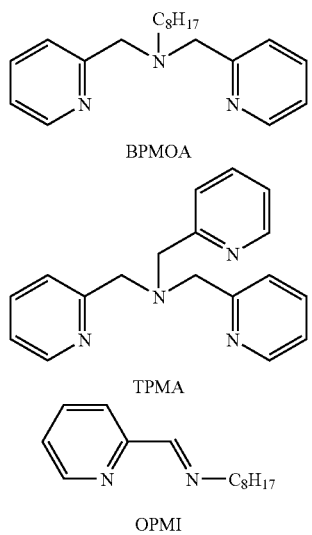

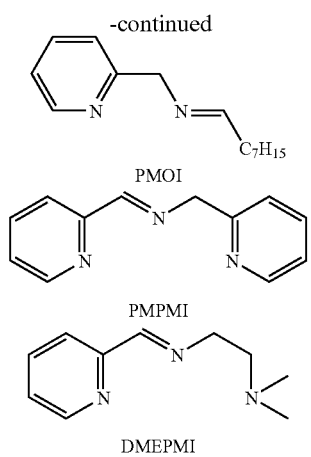

PMOI

PMPMI

DMEPMI

With this increased level of choice in ligands suitable for controlled polymerizations, described above, it is now possible to consider additional aspects of the process. The desire for catalyst recyclability leads to the understanding that substituents on the ligand can be also be chosen, or designed, to allow for isolation of the catalyst complex from the reaction medium by reversibly changing one or more process parameters such as precipitating the catalyst. One such suitable parameters can be temperature, as taught by W. J. Brittian et al., *Polymer Preprints*, vol. 40 (2), p. 380 (1999) for polyethylene substituted ligands. However, a more energy efficient process can be developed around chemical modification of the ligand or catalyst complex to cause precipitation at the reaction temperature or at lower temperatures. One specific example of such a mechanism can involve a ligand or catalyst complex responsive to pH changes or further complexation with an added solid or salt resulting in the formation of a solid easily removed from the polymer solution. Another approach would be the addition of a material that can co-crystallize with the ligand, in the example described above by Brittian the polyethylene substituent on the ligand, while having a sufficiently high molecular weight to precipitate from solution as the temperature is changed, also has a sufficiently high molecular weight to interfere with the dynamics of the polymerization due to the bulk of the substituent in solution. The polymer prepared using this ligand had a higher molecular weight, lower conversion, and broader MWD than a material prepared with a normal ATRP catalyst system. A ligand with a lower molecular weight polyalkane substituant such as BPMODA has been shown to provide the control expected for ATRP and this polyalkane group can co-crystallize or interact with a non-attached added material to allow separation from the reaction medium. Such a system is suitable for recycle or reuse of the catalyst complex since the separation from the system can be dependent on a readily adjustable process parameter. Monomers are added, the catalyst is made available, the polymerization occurs, the catalyst is separated by adjustment of one process parameter, filtered and made available for the next batch as the first parameter is changed back to allow the catalyst to return to the active state.

The use of macroinitiators for the preparation of block and graft copolymers using ATRP as the polymerization process has been described earlier along with the use of macroinitiators in the (co)polymerization of macromonomers. It has been determined that use of an appropriate macroinitiator in a (co)polymerization of a macromonomer leads to early compatabilization of the polymerization system and more efficient incorporation of the macromonomer into the copolymer. This concept will work for other controlled polymerization systems and also in non-controlled (conventional) polymerization systems. Indeed, in non-controlled polymerizations the use of the macroinitiator may even be more critical to allow both incorporation of the macromonomer into the instantaneously higher molecular weight copolymer, and to act as a surfactant to keep the polymerization system in one phase.

The synthesis of block copolymers in bulk or solution ATRP can be done either through sequential addition of the required monomers, or through the isolation of the various macroinitiators in a more step-wise fashion. The sequential addition of monomers is by far the less time consuming, practical and easiest method and potentially lower cost process. Such an approach can assist in the cross propagation in all controlled polymerization systems when switching from one monomer to another where a tapered structure at the end of one block improves the initiation for the next block. However, this may involve compromising the polydispersities, homogeneity functionality or interfacial properties of the block copolymer. A challenging synthetic task has been the synthesis of block copolymers containing acrylates and methacrylates, since they are difficult to obtain through other polymerization mechanisms. Furthermore, even using ATRP it is necessary to ensure full functionality of the polymer chain ends and to have relatively fast initiation of the second (or third) block (i.e. fast cross-propagation). In the case of PBA initiating MMA, it was necessary to ensure the end group on the PBA was Br, and CuCl was used as the catalyst, otherwise cross propagation initiation was slow. Within a sequential addition experiment, this requires that the PBA be initiated with a bromine containing initiator and CuBr should be used as the catalyst. On addition of the second monomer (MMA in this case), CuCl must also be introduced into the reaction to facilitate halide exchange and thus increase the rate of cross-propagation relative to the homopropagation of MMA.

An examination of the molecular weight distributions from two different experiments, one the synthesis of a diblock copolymer of PBA-b-PMMA, and the other of a tri-block copolymer PMMA-b-PBA-b-PMMA is informative. In each case, the PBA was grown first (with monofunctional and difunctional initiators respectively), then the MMA, with CuCl/HMTETA dissolved in it, was added to the PBA. The molecular weight increased, and there is no sign of terminated polymer that would correspond to 'dead' macroinitiator. The number average molecular weights, polydispersities and monomer conversions are given in the examples section. In each case the conversion first of BA and then of MMA reached approximately 90%, and the polydispersities remained low (~1.20-1.25). These experiments show that ATRP can be applied to the synthesis of block copolymers without the need to isolate macroinitiators, even when there are several factors, such as cross-propagation rates, that may effect the success of the block copolymerization.

These experiments demonstrate that ATRP is a very versatile method for synthesizing block copolymers, specifically being able to produce block copolymers with free radically copolymerizable monomers. This applies to both within water-borne polymerizations and through sequential monomer additions in bulk polymerizations.

The above examples demonstrate an extremely economical way to make novel block copolymers without isolation and purification of the intermediate macroinitiator when a second (co)monomer is added to the polymerization before the first (co)monomers have been converted to polymer. In "living" radical polymerization systems three different types of gradient copolymer can be formed in the second (co)polymerizing block in such continuous block copolymerizations. When the (co)monomers of the first block are preferentially incorporated into the (co)polymerizing second block then an interfacial tapered block can be formed as all the first (co)monomer is consumed prior to a "pure" second block being formed. For polymers that undergo phase separation this will provide a polymer with broader modifiable interfacial boundary. The length and composition of this tapered block depends of the percent conversion for the first (co)monomers prior to the addition of the second (co)monomers. In an elastomeric material this will significantly modify the properties of the bulk polymer, changing tensile yield strength, ultimate tensile strength, % elongation and hysteresis.

However if the first (co)monomer is more slowly incorporated into the second block then the second block can be a statistical or random copolymer of the first and second monomers.

In the third case, if the first (co)monomer is not readily incorporated into the polymer then a "reverse" gradient copolymer would be formed only if the polymerization of the second monomer is driven to high conversion.

Thus it is possible to prepare three different types of AB block copolymers in such continuous block (co)polymerizations depending on the reactivity ratios of the monomers in the A block and B block. In a non-limiting discussion of the third case in the above polemic, consider an A-block with a hydrophylic monomer or a masked hydrophylic monomer, such as t-butyl acrylate, and then (co)polymerize the first monomer with a more hydrophobic monomer that only incorporates the first monomer at low levels, such as methyl methacrylate. If the second monomer is added while say there is 20% of the first monomer in solution and the copolymerization runs to high overall conversion then a gradient copolymer is formed with a short (co)polymer block comprising a higher concentration of hydrophylic monomer at the growing polymer tail. This will lead to surfactant molecules with tunable micellular properties.

As previously mentioned in this application in emulsion systems it is often advantageous to add non-complexed redox conjugate transition metal salt to the aqueous phase to control the concentration of the complexed redox conjugate in the polymerization phase. In block copolymers where higher levels of redox conjugate are required for the preparation of the first block than the second block and one does not wish longer reaction times for the preparation of the second block, various methods are available to control the concentration of each oxidation state of the catalyst in the reaction. One can either add additional lower oxidation state transition metal catalyst with the second monomer, or the concentration of the redox conjugate can be reduced by adding metal zero, or even a combination of adding both Cu(I)/ligand to the organic phase and Cu(II) to the aqueous phase for a copper based catalyst in an emulsion system.

In a "reverse" emulsion ATRP, the initial ratio of $CuBr_2$/2dNbpy to the standard free radical initiator has a great effect. The polymerization is much faster when less amount of the catalyst is employed. This is due to the fact that $CuBr_2$/2dNbpy acts as the radical deactivator in the atom transfer reaction and if all $CuBr_2$ is reduced to CuBr by reaction with generated free radicals then the rate is increased. On the other hand, the molecular weight control of the polymerization, or more precisely the initiation efficiency, was little affected by the amount of the deactivator. The comparison of the molar mass evolution with different ratio of $CuBr_2$/2dNbpy vs. the standard free radical initiator is also shown in to be more or less independent of the initiation efficiency or the amount of the catalyst which indicates that the $CuBr_2$ dissolved in water is not the major cause for the irreversible termination in the aqueous phase, rather, the termination between first formed free radicals is mainly responsible for the low initiation efficiency. With more $CuBr_2$/2dNbpy, the polydispersity of the obtained polymer is slightly smaller. This is due to the higher partitioning of the deactivator in the organic phase, thus afford more efficient deactivation.

In emulsions, the particle size is quite sensitive to the amount of the catalyst. This probably results from the different ionic strength of the aqueous phase. With more $CuBr_2$ dissolved in the aqueous phase, the increased ionic strength weakens the ability of the surfactant to stabilize the particles. This can explain why the variation of the particle sizes with the amount of the catalyst is more pronounced at lower level of the surfactant.

Reverse ATRP is the preferred approach in emulsion polymerization if the target product is a stable small particle sized latex. In such systems there is a linear increase of molecular weight with monomer conversion. This indicates that the number of chains is constant, in other words, chain transfer reactions are negligible. The products display low polydispersities (1.2~1.5), meaning that nearly all the chains start to grow simultaneously with the same speed. Both features suggest that the polymerization can be regarded as controlled. However there is relatively low initiation efficiency (25-45%, versus 80% for the homogeneous system). This is calculated based on the theoretical molecular weight values, assuming that one molecule of standard free radical initiator generates two radicals. The main reason for this low efficiency is attributed to the irreversible radical termination in the aqueous phase, which might include the reaction between two radicals, or between a radical and $CuBr_2$ dissolved in water. The final latex is usually stable, lasting from days to even more than a year without any sedimentation. The final particle size is reproducible, in the range of 200 nm. In all the experiments, it is observed that the measured particle diameter progressively decreases until 20% to 40% conversion, then keeps constant after 40% conversion.

In order to improve the initiation efficiency and control the level of both redox conjugate states of the transition metal complex in reverse ATRP, a conventional ATRP initiator (RX) was added to the "reverse" ATRP emulsion system, with V-50 (a commercially available free radical initiator) added as the radical source, in addition to the standard free radical initiator/$CuBr_2$ system. Under such conditions, the final forward ATRP initiator would be a mixture of RX together with initiator molecules formed from V-50 after reaction of the formed free radicals with $CuBr_2$. If RX is dominating, the effect of termination of the radicals generated by V-50 in the aqueous phase could be negligible. The concentration of catalyst employed in the polymerization would also be separated from the amount of standard free radical initiator added. The advantage of this approach is that the final particle size may be much smaller than those obtained from direct ATRP. Under appropriate conditions, the overall initiation efficiency was improved from 0.2-0.3 for pure reverse ATRP to ~0.6 in the presence of ethyl 2-bromoisobutyrate (EBiB), from Aldrich. In addition the level of catalyst complex and the concentration of different redox conjugate states can be independently controlled from the amount of added standard free radical initiator. Within the examples provided in this application most experiments are run on small scale. However, when a larger scale "reverse" ATRP emulsion polymerization was carried out in a 250 ml reactor with mechanic stirring (~400 rpm), the results were identical to the small scale experiment. The experimental conditions were identical and within experimental error, the experiments have similar kinetics, molecular weight evolution and particle size indicating further scale up should be controlled and predictable.

The use of conventional radical initiators in ATRP in the presence of complexes of transition metals in their higher oxidation state, has been disclosed in prior applications and referred to as "reverse" or "alternative" ATRP. The range of "standard free radical initiators" that can be used in such "reverse" ATRP reactions can now be expanded to include peroxides. This expansion is demonstrated by the results of the homogeneous "reverse" copper-mediated ATRP using as the initiator benzoyl peroxide (BPO) which are presented, and compared with those using azobisisobutyronitrile (AIBN).

Homogeneous "reverse" ATRP can now be successfully carried out, or initiated by, decomposition of either diazo-compounds or peroxides. For AIBN initiated polymerization, addition of CuBr has little effect while "reverse" ATRP occurs efficiently in the presence of $CuBr_2$ which can scavenge initiating/growing radicals and form CuBr and RBr species. In contrast, $CuBr_2$ is an inefficient component of "reverse" ATRP initiated by BPO due to fast electron transfer from the resulting Cu(I) to BPO and coordination of benzoate anions to copper. However, the polymerization initiated by BPO can be controlled in the presence of a sufficient amount of CuBr. After the induced decomposition of BPO, growing radicals are deactivated by Cu(II) species to produce bromine terminated oligomers and Cu(I) species. Both $Cu(O_2CPh)$ and CuBr can then successfully catalyze ATRP.

Charged ligand-metal complexes 1 and 2 were synthesized and tested as their Cu(II) complexes in the reverse ATRP of styrene, MA and MMA. The influence of the charged coordination site should be seen in two effects:
1. the stabilization of the Cu(II) species and therefore the formation of a highly active catalyst for ATRP.
2. due to the ionic nature of the bond between copper and the charged coordination side of the ligand a more stable complex should result.

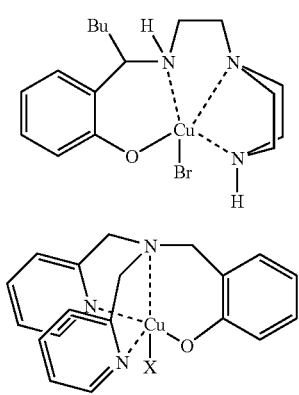

Cu-Complexes of Charged Ligands

Different polymerization reactions using Complex 1 as catalyst were run and in bulk polymerization lead to higher molecular weight products when compared with non-charged polyamines as ligands. However the catalyst also showed decreased activity.

The motivation to use the tripodal charged ligand, Complex 2, was twofold. First, because $Me_6TREN$, which has a similar structure, forms highly active complexes for ATRP, it was determined that a charged ligand with the same geometry of its related Cu-complex should also show an enhanced activity. As a second aspect, it was desired to evaluate the influence of the charged coordination site by comparing the activities of complex 2 with $Me_6TREN$-CuBr. The complex 2 showed a good activity in the polymerization of styrene and MMA but polymerized MA more slowly.

Earlier in this application the preparation of novel graft copolymers wherein the graft (co)polymer was attached to the backbone (co)polymer within the grafted (co)polymer chain was described. Previous applications disclosed several other approaches to prepare normal topology graft copolymers through utilization of controlled polymerization processes including copolymerization of the primary monomer with a known (often low) concentration of another monomer which contains a second functional group capable of initiating ATRP directly, or a copolymer comprising a monomer containing a second functional group comprising a masked ATRP initiator, or functionalization techniques on a pre-formed backbone to form initiation sites, all of which can be employed as functional macroinitiators for the growth of pendant graft (co)polymer chains from the backbone. The latter process, of (co)polymer functionalization, has already been confirmed for the controlled polymerization of vinyl monomers from poly(vinyl chloride) and poly(dimethylsiloxane) macroinitiators. The graft copolymerization from chlorosulfonated polyethylene has also been disclosed in earlier applications. This present application describes the modification of, and subsequent polymerization from, a commercially available poly(ethylene-co-glycidyl methacrylate) copolymer. Examples describing the ring-opening of the epoxide groups with chloroacetic acid are given along with subsequent graft (co)polymerization with styrene, benzyl acrylate and methyl methacrylate as exemplary vinyl monomers. Hydrolysis of the benzyl groups in the benzyl acrylate graft copolymer are also taught which leads to the synthesis of amphiphillic graft copolymers with a polyethylene backbone.

The use of an organic polymer-supported ligand has been disclosed in an earlier application. The specific improvement now disclosed is based on the use of a linear tetramine immobilized on crosslinked polystyrene as the ligand forming the transition metal complex and critical application of the recognition of the importance of the redox conjugate in obtaining a fully controlled system. Based on the polymeric nature of the support, the systems should exhibit high compatibility between the support and the growing chains. Supports with a high loading of ligands on the surface (1.5 mmol/g) were formed. Several polymerizations with various monomers were carried out and the results are reported in the examples section. The polymer supported tris(2-aminoethyl)amine (s-TREN) showed the best results for methyl acrylate (MA) polymerizations. In the case of styrene (St) and methyl methacrylate (MMA), the polydispersities were high, and the polymerizations were slower compared to methyl acrylate.

In order to obtain better control over the reaction N,N-Bis (2-pyridylmethyl)-2-hydroxyethylamine (HO-BPMEA) was immobilized on a commercially available Merrifield resin containing benzyl chloride functional group, which is used widely for peptide synthesis and combinatorial synthesis of small organic molecules. Methyl acrylate (MA) was chosen for study since HO-BPMEA provided one of the best-controlled solution polymerizations of MA. In the first experiment, a bimodal molecular weight distribution was observed by SEC. The reason for the bimodal molecular weight distribution was not immediately clear, but it was surmised that the initial growing radicals cannot easily access the deactivator and thus continue to polymerize in uncontrolled manner with normal free radical termination reactions occurring. This gives rise to the polymer seen in the high molecular weight peak. After generation of enough amounts of deactivator by termination reactions a fully controlled ATRP polymerization then proceeds forming the material seen in the low molecular weight peak.

In order to obtain control of the ATRP process from the instant of initiation of the polymerization process, it is preferred that one enhance the deactivation process. Deactivator, Cu(II)Br$_2$ together with activator Cu(I)Br, was added at the beginning of the reaction, and therefore both copper species should be complexed by the solid-supported ligand in proximity to each other. In a series of examples in which the total amount of copper species was kept the same, the effect of differing ratios of redox conjugates were determined. Results from use of three different ratios of Cu(II)Br$_2$ to Cu(I)Br are reported. With higher percentage of Cu(II)Br$_2$ in the initial catalyst complex, the molecular weights were closer to the expected values with lower polydispersity (See Entry 2-5 in Table 26). These observations suggest that the higher available concentrations of Cu(II)Br$_2$ lead to an increase in the rate of deactivation, thus improving control.

In a stirred reaction vessel, both the mobility of the particles carrying the immobilized catalyst and the diffusion of the polymer coils in the reaction mixture can affect the level of control in an ATRP polymerization process. If the catalyst is closely attached to a bulky support this hinders the diffusion of the growing chain end to the catalytic site. In homogeneous ATRP, the rate constant of activation in ATRP is typically in the range of $k_{act} \approx 10^0$ L mol$^{-1}$ s$^{-1}$ and that of deactivation $k_{deact} \approx 10^7$ L mol$^{-1}$ s$^1$. Diffusion of the active and dormant chain ends to the activator and deactivator immobilized on the surface may be in the range of microseconds or milliseconds. Therefore, the overall rate of activation should not be affected significantly ($k_1 \gg k_{act}$). However, with a ligand supported catalyst complex the overall rate of deactivation may be significantly slower than with a homogeneous catalyst and diffusion may become rate-determining ($k_2 \ll k_{deact}$). This would result in poor control due to slow deactivation and requires a higher concentration of the deactivator than under homogeneous conditions. This can explain why an apparent large excess of the deactivator, the redox conjugate in ATRP, or "persistent radical" in other controlled radical polymerization processes, is needed to gain control in heterogeneous systems; and also why polymerization occurs in spite of the enormous excess of Cu(II), when compared to homogeneous systems. Deactivation rate is enhanced by the addition of deactivator at the beginning of the polymerization. Increasing the initial concentration of deactivator enhances the probability that growing radicals will react with it and be transformed to the dormant species. Also, an increase in the number of particles increased the number of catalyst sites in the mixture, and caused a higher probability of deactivation in the polymerization.

This understanding of the critical role of the "deactivator" or "persistent free radical" is operable in most controlled radical polymerization systems and will lead to narrower molecular weight distributions, or more precisely tailored broader molecular weight distributions if so desired, and higher functionality, due to control being imposed on the system at the first instance of initiation of polymerization.

Such continued increase in the understanding or the role of the components of the catalyst complex, particularly the role of the redox conjugate in ATRP or "persistent radical" in other controlled radical polymerizations, have allowed further advances to be made on the range of initiators that can be employed for controlled radical polymerization. One of the most potentially useful applications is the use of modified surfaces for the direct initiation of controlled polymerization. Unlike prior art processes described by Ejaz, M.; Yamamoto, S.; Ohno, K.; Tsuji, Y.; Fukuda, T., *Macromolecules*, vol. 31, p. 5934 (1998); Husseman, M.; Malmstrom, E. E.; McNamara, M.; Mate, M.; Mecerreyes, D.; Benoit, D. G.; Hedrick, J. L.; Mansky, P.; Huang, E.; Russell, T. P.; Hawker, C. J., *Macromolecules*, vol. 32, p. 1424 (1999), which do not prepare 100% tethered polymer we have now developed and defined conditions for controlled polymerization from surfaces that can accomplish this task without the use of any sacrificial initiator, i.e. without the production of any non-tethered polymer. In this way all (co)polymer produced in the polymerization process is "controlled" and is attached to the surface at the desired site, and leads to a brush, or carpet pile, growth of active chains from each known activated initiator site. Each polymer chain remains active and can continue to (co)polymerize radically active monomers forming block copolymers and functional chain end materials, or in this case functional or tailored surfaces.

The practical advantage, or economic incentive for such a system, exemplified by a discussion of ATRP but as indicated earlier applicable to all controlled polymerization systems operating through or in conjunction with a "persistent radical" effect, is that the solution of the transition metal complex in monomers, and optional solvent, can be used many times over in continuous processes for polymerization from surfaces with attached or tethered initiators by sequential immersion of new materials in the medium. The molecular weight of the attached polymer being dependent on time of immersion in the solution. In addition block copolymers are prepared by moving the surface from the first polymerization bath to a second solution containing transition metal complexes and monomers most appropriate for the second block copolymerization. Since the polymer retains an active initiation group at the 'dormant' chain end intermediate process steps can be carried out between sequential polymerizations. An example is forming a mask and depositing fresh initiator on the conductive masked material to allow polymerization from both the original polymer and new initiator site to produce a uniform insulating layer. This process can be reproduced easily by repeating the steps. There is no waste polymer produced and the monomer/catalyst solutions can be continuously employed by addition of monomer.

This advance was also attained by consideration and application of the fundamental dynamics of controlled polymerization reactions. For controlled growth from a surface one requirement is that the "persistent radical," or deactivator, be present in the liquid phase. Rather than build up the required concentration of deactivator by conducting a normal polymerization in the contacting solution in addition to polymerization from the surface tethered initiator, one can add of an excess of the redox conjugate of the transition metal complex in ATRP, or an excess of the stable free radical in thermally labile stable free radical mediated polymerization, to control the polymerization from the first moment of initiation of polymerization from the tethered initiator.

The extension of ATRP to polymerize styrene and acrylates from surfaces was accomplished through the use of 2-bromoisobutyryl groups bound to surface functional silicon wafers as initiator, enabling the synthesis of surface bound polymer brushes. From this approach, homopolymers of styrene and methyl acrylate, as well as block copolymers from styrene and acrylates were grown from a surface. By self-assembly of a 2-bromoisobutyryl functional trichlorosilane on silicon wafers, monolayers of ATRP initiating groups were deposited. Polymerization was then conducted, in the presence of a homogeneous catalyst system of Cu(I)Br/4,4'-di-n-nonyl-2,2'-bipyridine (dNbpy), as well as Cu(II)Br$_2$/dNbpy deactivator (3-5-mole % relative to Cu(I)Br). Addition of Cu(II)Br$_2$ at the beginning of the polymerization suppressed termination reactions, allowing for higher retention of alkyl halide end-groups. Thus, the addition of deactivator, or "persistent free radical" at the beginning reaction surprisingly avoids and significantly improves upon the need to add free, untethered initiator, as previously reported by other workers for controlled polymerization from surfaces.

The growth of polymer chains from the surface of silicon wafers, without attendant polymerization in the contacting solution, was confirmed by ellipsometry measurements of film thickness. Thus, in the homopolymerization of styrene and methyl acrylate, a linear increase in film thickness with time was observed, indicative of successful ATRP from the wafer. Due to the extremely low loading of the polymer onto the silicon substrate, direct analysis of surface grafted polymers could not be performed. However, chain extension reactions from surface bound polymers were done, verifying the presence of ATRP active alkyl halide end-groups. From this approach, surface-tethered block copolymers from styrene and various acrylate monomers were synthesized, indicating that deactivation by Cu(II) had occurred. This method also enables the tuning of surface properties by polymerizing acrylate monomers of varying composition. In particular, hydrophobic and hydrophilic surfaces were prepared by chain extending wafer-bound p(Sty) with 3,3,4,4,5,5,6,6,7,7,8,8,9,9,10,10,10-heptadecafluorodecyl acrylate or t-butylacrylate, respectively. Hydrophilic surfaces were then obtained by acidic hydrolysis of the tethered p(Sty-b-tBA) to yield the amphiphillic block copolymer.

Understanding the kinetics of initiation and deactivation is also important in the preparation of low molecular weight polymers, particularly low molecular weight block copolymers suitable for use as surfactants or reactants, where molecular weight control and high functionality is required both for efficient crossover from the A (co)monomer(s) to the B (co)monomers and for the application, the presence of the correct level of deactivator prior to initiation is required. This is exemplified by the preparation of hermaphrophylic oligomeric block copolymers for surfactant applications. In the preparation of polystyrene/t-butylacrylate block copolymers with polystyrene blocks exhibiting a MW$_n$ of 1050 not only is it advantageous to add 5% of CuBr$_2$ but also a polar solvent such as acetone at levels that will ensure solubility of the deactivator. Under such conditions the initial polystyrene block was formed with narrow MW distribution and cleanly moved to higher molecular weight when the second monomer was added.

The importance of functional control attainable through ATRP is further demonstrated through the capacity to prepare block copolymers from disparate types of monomers by sequential modification of end groups, expediently preparing a macroinitiator, with the appropriate end group for further chain extension. Two approaches to a new type of organic/inorganic polymer hybrid, well-defined organic polymer-polyphosphazene block copolymers are feasible. One method initially described in U.S. patent application Ser. No. 09/018,554 is the preparation of a polyphosphazine macroinitiator for an ATRP polymerization. Another approach herein disclosed is to prepare an organic macroinitiator by ATRP and conversion of the radically transferable atom into an initiator site for the polymerization of the phosphorimine. This is accomplished by converting the end group first into an azide and then reacting the tele-azidopolymer with 2,2,2-tris(trifluoroethyl)phosphite to convert the functional end group into a new initiator molecule, a macroinitiator with a phosphoranimine end group. Such a macroinitiator can be used for the preparation of block copolymers by initiating the polymerization of monomers such as P-tris(2,2,2-trifluoroethoxy)-N-trimethylsilyl phosphoranimine.

A vast number of methodologies have been reported for the preparation of organic/inorganic hybrid materials: Traditional approaches include the use of sol-gel chemistry to synthesize ceramic materials with polymeric components either covalently bound or interpenetrated with the inorganic phase. Alternatively, inorganic/organometallic monomers and polymer systems can be combined with their organic counterparts to prepare hybrid polymers with inorganic blocks, or pendant groups. Through the utilization of inorganic (macro)initiators or monomers, atom transfer radical polymerization (ATRP) has been demonstrated to be a versatile method for the preparation of hybrid materials. ATRP has been successfully used to synthesize a variety of well-defined (co)polymers from an exemplary range of acrylates, methacrylates and styrenes. Due to the radical nature of ATRP, a wide range of monomers and polymers can be employed, provided that interaction with both active species of the catalyst is avoided. Inorganic (macro)initiators for ATRP only require the incorporation of an activated alkyl halide group (e.g., α-haloesters, benzyl halides) into the targeted inorganic polymer, or substrate.

Through this approach, poly(dimethylsiloxane) (PDMS) and silicon wafers, functionalized with initiator groups, have been used as macroinitiators for ATRP for the preparation of hybrid materials. Similarly, inorganic monomers have been (co)polymerized by ATRP from organic (macro)initiators. Specifically, polyhedral oligomeric silsesquioxane (POSS) monomers have been utilized for the synthesis of hybrid polymers.

The synthesis of block and graft copolymers of PDMS and poly(styrene, acrylates and methacrylates) was conducted using ATRP, as outlined earlier, through the use of alkyl halide functional PDMS as a macroinitiator in the ATRP of vinyl monomers. The incorporation of ATRP initiating groups into PDMS was achieved through hydrosilation of silane-terminated PDMS with either 4-vinylbenzyl chloride, or 3-butenyl 2-bromoisobutyrate. Previously, only p(-DMS-b-Sty) di-, triblock and p(DMS-g-Sty) graft copolymers could be prepared due to the limited efficiency of benzyl chloride groups to initiate ATRP of acrylates and methacrylates. Now PDMS has been successfully functionalized with 2-bromoisobutyryl groups, allowing for the synthesis of AB block copolymers of PDMS and poly(acrylates) or poly(methacrylates). Additionally, the synthesis of p(Sty-b-DMS-b-nBA) and p(Sty-b-DMS-b-MMA) triblock copolymers has also been performed. The synthetic route for triblock copolymers of styrene, hexamethylcyclotrisiloxane and (meth)acrylate monomers is accomplished through a cross mechanism block copolymerization starting with the living anionic polymerization of styrene to produce a polystyrene chain (Mn=4,600; Mw/Mn=1.09) which was used to initiate the ring-opening polymerization of hexamethylcyclotrisiloxane (D3). Subsequent quenching of the lithium silanoate chain end of the p(Sty-b-DMS) block copolymer with chlorodimethylsilane yielded a silane terminated chain end (Mn=7,760; Mw/Mn=1.15). A macroinitiator for ATRP was then prepared by hydrosilation of the silane-functional p(Sty-b-DMS) copolymer with 3-butenyl 2-bromoisobutyrate. ATRP with the p(Sty-b-DMS) macroinitiator with either n-butyl acrylate (nBA) or methyl methacrylate (MMA) enabled the synthesis of ABC triblock copolymers. The synthesis of these triblock copolymers was confirmed by SEC analysis. The SEC chromatogram showed that the synthesis of well-defined polymers at each step of the block copolymerization, going from p(Sty) to p(Sty-b-DMS) anionically, followed by addition of n-butyl acrylate (Mn=10,200; Mw/Mn=1.18), or methyl methacrylate (Mn=10,100; Mw/Mn=1.21) using ATRP.

One approach towards the synthesis of organic/inorganic hybrids disclosed above and in earlier applications has been the incorporation of both well-defined inorganic and organic components into a material. Previously, inorganic initiators comprising benzyl-chloride functionalized cyclic siloxanes and polyhedral oligomeric silsesquioxanes (POSS) were applied to the ATRP of styrene. This work has now been extended to include the use of monofunctional methacryloyl/styryl POSS monomers (Scheme 10).

Scheme 10: POSS Monomers for ATRP

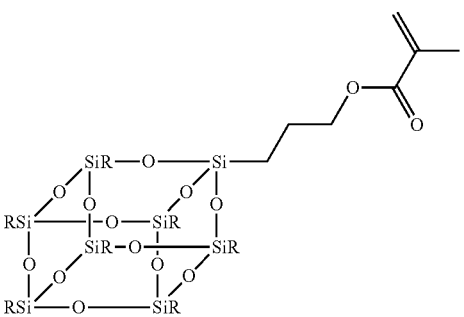

Methacryloyl-POSS
(MMA-POSS)
R = cyclopentyl ($C_5H_9$)

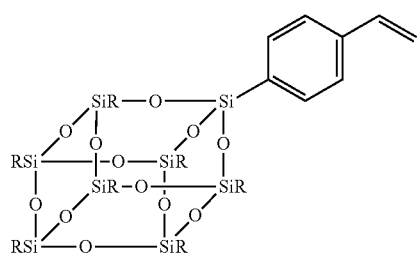

Styryl-POSS
(Sty-POSS)

Polysiloxane monomers comprised of methacryloyl and styryl groups with bulky, POSS moieties, were applied to ATRP systems. Previous work in the literature reported the conventional radical polymerization of Sty-POSS and MMA-POSS. The introduction of a POSS cube into a polymer chain has been demonstrated to effect chain mobility, thermal behavior and the overall mechanical strength of the hybrid material. However, the synthesis of POSS-based (co)polymers has not yet been reported using controlled radical processes. POSS-polymers prepared using controlled radical polymerization methods offer the advantage of possessing end-group functionalities capable of reinitiating polymerization. This allows for the synthesis of block copolymers of POSS, such as thermoplastic elastomers, with a soft middle segment and POSS-polymers at the periphery. Additionally, more complicated topologies can be achieved through controlled radical polymerizations, allowing for the synthesis of star polymers and star block copolymers. Thus, the application of POSS-based monomers to ATRP can yield a wide range of hybrid materials possessing both well-defined inorganic and organic polymer segments.

POSS polymers represent a novel class of hybrids that has been demonstrated to impart greater thermal stability and mechanical strength to a material. Structurally, POSS is a cubic siloxane octamer, possessing an outer diameter of 1.5 nm. POSS groups can be, incorporated into polymer chains by polymerization of a monofunctional POSS monomer, bearing some polymerizable group. It is the inclusion of these bulky, inorganic pendant groups that gives POSS polymers their unusual structure and properties. While POSS polymers and materials have been prepared from a variety of methods, the application of POSS monomers to ATRP allows for greater control of polymer molecular weight, topology and composition. By using ATRP, well-defined homo-, block and random copolymers can be synthesized. Homopolymers of a methacryloyl-functional POSS monomer (MA-POSS) have been synthesized by solution ATRP in toluene. Random copolymers can also be prepared by copolymerization of either styryl-functional POSS (Sty-POSS) or MA-POSS with conventional vinyl monomers (e.g., styrenics, (meth)acrylics). Additionally, by the use of poly(acrylate) macroinitiators, both AB and ABA block copolymers has been prepared, with soft middle segments from the macroinitiator, and hard POSS segments obtained from chain extension reactions. In particular, the synthesis of a p(MA-POSS)-b-p(nBA)-b-p(MA-POSS) triblock copolymer has been conducted. As determined from SEC, efficient chain extension of MA-POSS from the p(nBA) macroinitiator was observed.

These experiments discussed above and reported later demonstrate that the preparation of hybrid materials from POSS monomers, using ATRP, has been conducted. The synthesis of well-defined homopolymers, random and block copolymers from controlled radical polymerization resulting in the preparation of controlled hybrid (co)polymers containing functional inorganic groups. The synthesis of POSS-PMMA homopolymers and copolymers incorporating either POSS-Sty or POSS-MMA monomers has been successfully demonstrated, using ATRP. The types of POSS-based polymers that have been prepared by ATRP are presented in scheme 11.

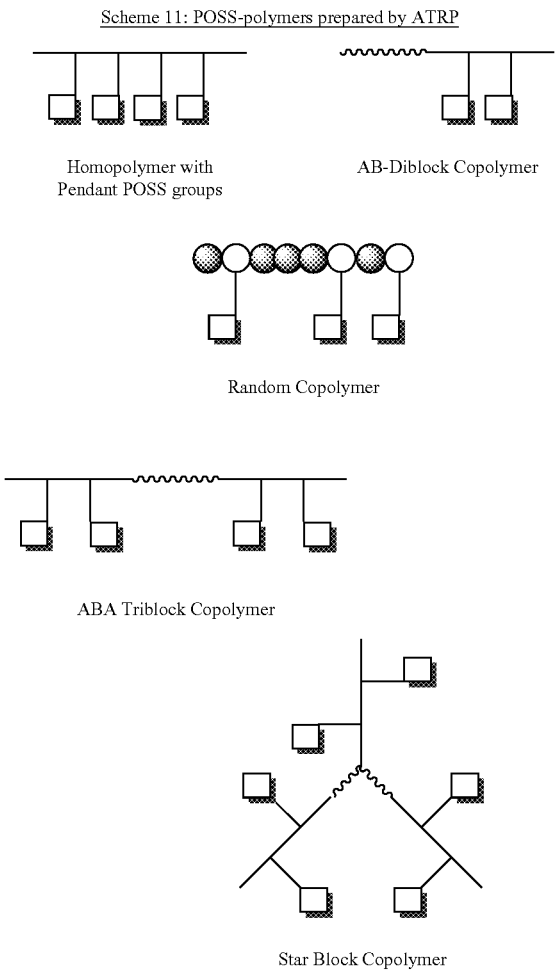

Scheme 11: POSS-polymers prepared by ATRP

Homopolymer with Pendant POSS groups

AB-Diblock Copolymer

Random Copolymer

ABA Triblock Copolymer

Star Block Copolymer

The synthesis of hybrid organic/inorganic silicate nanoparticles is hereby demonstrated via polymerization of vinyl monomers from initiator-functionalized particles. The first approach was use of a benzyl chloride functional silicate particles as initiator, T. E. Patten, *Polymer Preprints*, vol. 40(2), p. 354. Difficulties in optimizing the conditions for the ATRP of styrene from the benzyl chloride initiator particles were encountered, presumable due to inefficient initiation from the benzyl chloride groups. To overcome this difficulty, the synthesis of nanoparticles possessing 2-bromoisobutyryl functional group was pursued.

The synthesis of 2-bromoisobutyryl functional silicate particles was attempted using both a modified Stober process (Philipse et al., *Journal of Colloid and Interface Science*, vol. 128, p. 121 (1989)) and a surfactant template approach (Schmidt et al, *Adv. Mater.*, vol. 9, p. 995 (1997)). Using the Stober process, silica particles with methacrylate and 2-bromoisobutyryl surfaces were prepared.

A surfactant template approach was also conducted in the synthesis of functional particles. Using the surfactant system, conditions were ascertained for the synthesis of soluble silicate particles bearing trimethylsilyl methacrylate and 2-bromoisobutyryl as surface modifying initiator groups. Elemental analysis of the particles indicated that bromine was successfully incorporated to the particles.

Procedures for functional silica particles from a modified Stober process have been reported (Philipse et al., *Journal of Colloid and Interface Science*, vol. 128, p. 121 (1989). In this process, monodisperse particles are prepared from hydrolysis and condensation of tetraorthosilicate (TEOS) and surface silanol groups of the particle co-condensed with a functional trialkoxysilane. For the preparation of a particle suitable as an initiator for ATRP the functional trialkoxysilane bears a functional group containing a radically transferable atom, in the first case, 3-(methacryloxy)propyl-trimethoxysilane (MPS). In another approach to the preparation of functional particles, this approach was repeated, using 3-(methacryloxy)propyl-trimethoxysilane as the surface treating agent. This was also extended to 3-(2-bromoisobutyryloxy)propyltrimethoxysilane (BIB-TMS). The general scheme for the synthetic reactions using the Stober process are presented in FIG. 8.

Figure 9:
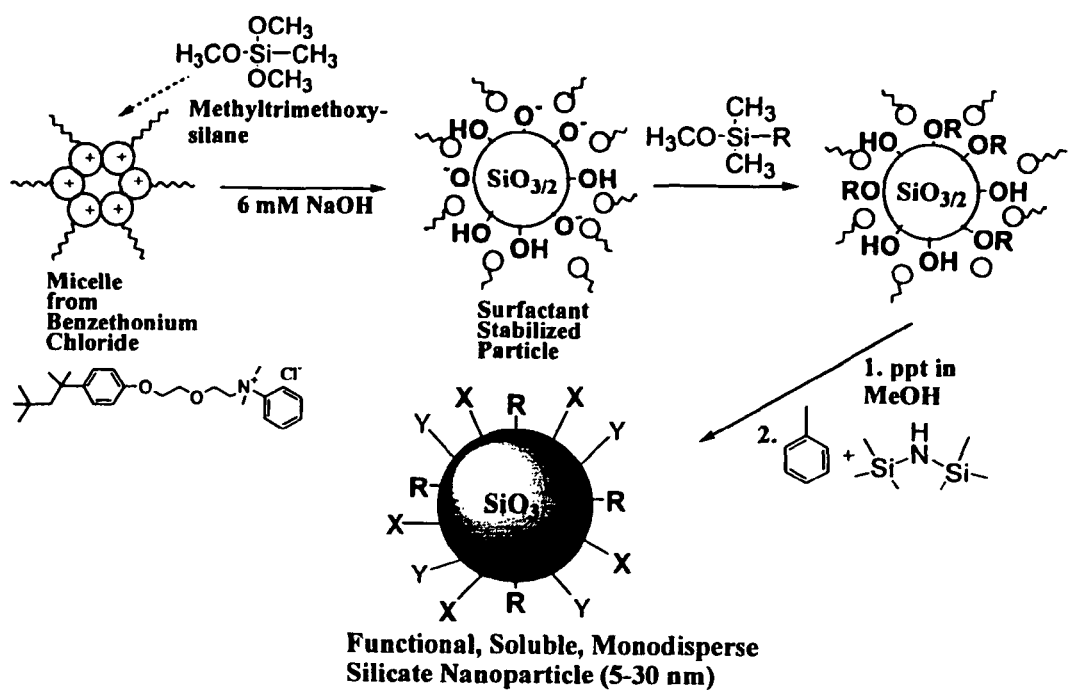
FIG. 9. is a reaction schematic of surfactant assisted particle synthesis.

The synthesis of monodisperse, soluble, functional particles was also conducted in the presence of a surfactant. In such systems, surfactants form micelles, which serve as nano-size templates and reactors for the preparation of particles. The surfactant then stabilizes the surface of the particle, allowing for consecutive condensation reaction of the particle with other silanes. In this way, various functionalities can be introduced to the surface of the particle. A key feature of this system is that soluble particles can be prepared by deactivation of surface silanol groups with monoalkoxysilane and disilazanes. Monochlorosilanes can also be used to both deactivate surface silanol groups and introduce functionality to the particle. The general synthetic scheme for the synthesis of particles from this approach is presented in FIG. 9.

Functional particles were prepared from a variety of methods using this approach. In all cases, methyltrimethoxysilane should be used as the core forming component, but functional trialkoxysilanes can be co-condensed with methyltrimethoxysilane, followed by surface deactivation, to prepare functional particles. Additionally, particles can be prepared comprising solely of a methyltrimethoxysilane, followed by surface deactivation with functional mono-alkoxy/chlorosilanes and disilazanes. Soluble spherical particles suitable as ATRP initiators were formed.

The synthesis of methacryloyl functional particles was conducted by co-condensation of 3-(methacryloxy)propyltrimethoxysilane (MPS) and methyltrimethoxysilane in 50%-wt mixture of the silanes followed by surface deactivation with methoxytrimethylsilane and hexamethyldisilazane.

Functional single walled carbon nanotubes, i.e., elongated fullerenes, are also promising materials for the preparation of similar hybrid materials, in this case rigid rod, carbon based, reinforced nanocomposites. Currently, there are two technical problems associated with the development of carbon nanotubes as reinforcing fibers for composite materials. The first is that the nanotubes tend to aggregate and form bundles; whereas ideally the fibers should be dispersed within the polymer matrix. The second problem is that the nanotubes should be sufficiently well bonded to the polymer matrix so as to transfer any mechanical load to the fiber from the polymer, as opposed to the two slipping past each other. Normally, carbon nanotubes are insoluble suspensions of aggregated nanotubes. It has however been reported that nanotubes can be dispersed in organic media by functionalization at the ends of the tubes with carboxylic acid end groups subsequently esterified with long alkyl chain alcohols. (J. Chen et. al.; *Science*, vol. 282, p. 5 (1998).) Such materials however would not exhibit interaction/adhesion to the matrix.

By using a similar methodology to that disclosed above for monodisperse silica particles, tubes functionalized with carboxylic acid groups can be converted into groups suitable to initiate the polymerization of vinyl monomers by known controlled polymerization processes. For initiation of ATRP they may just be alkyl halides, which would provide for the formation of a majority of polymeric groups at each tube end; additionally, the polymer segments would be of controlled (pre-defined) molecular weight and of low molecular weight distribution. The (co)polymer can be selected to dissolve in the matrix material providing good adhesion or indeed be the desired matrix material and a true nanocomposite. Such well-defined polymer segments would also contain the starting functional group at each chain end which could be further modified using organic chemistry techniques to yield other functional groups, i.e., amines, carboxylic acids, alcohols, allyl, phosphonium, thiol, azide, etc.

In the description of the preparation of hybrid materials the polymerization of a single monomer has been described, but more complex structures can be formed as well. For example, the polymer composition can be adjusted to prepare block copolymers (to induce a variety of morphologies), or gradient/statistical copolymers (mixtures of two or more monomers polymerized simultaneously). Such materials would be expected to display novel morphologies and consequently, unique physical and structural properties based on control over the nanophase separation and resulting large scale order.

The reinforced materials would be unique in that the reinforcing agent, the organic/inorganic composite or the nanotubes, would reinforce the material on the molecular scale. Such benefits would allow for easier processing of an essentially homogeneous thermoplastic composite material by extrusion or injection molding, or the end group functionality could be employed in cross-linking reactions in a reaction injection molding type process to form a nano-thermoset composite. Both of these types of composites would be useful in the development of high strength fibers films and parts.

Although a variety of monomers have been successfully polymerized in a well-controlled manner through implementation of the teachings of the inventors and others, the "living"/controlled radical polymerization of vinyl acetate has not yet been successful. The importance of controlling vinyl acetate polymerization arises not only from its industrial importance, but also from the fact that vinyl acetate has so far been polymerized only via a radical mechanism.

We can now report that a robust process for incorporation of vinyl acetate into controlled polymerization has been developed.

Polymerization of vinyl acetate was carried out using $CCl_4$ as the initiator in the presence of an $Fe(OAc)_2$/PMDETA (PMDETA=N,N,N',N'',N''-pentamethyldiethylenetriamine) complex. Polyvinyl acetate with a wide range of molecular weights were synthesized in a predictable fashion in high yields by varying the ratio of the initial concentrations of monomer to initiator. The resulting polyvinyl acetate was used as an efficient macroinitiator for the synthesis of block copolymers using typical ATRP catalytic systems.

However, more detailed kinetic studies revealed that the first stage polymerization was not obeying atom transfer radical polymerization behavior but was an improved redox-initiated radical telomerization with $CCl_4$ acting as both the initiator and the chain transfer reagent. Use of this polymer as a macroinitiator for block copolymerization was due to the chain extension with the radically transferable atom being provided by the tail trichloromethyl end groups rather than head —CH(OAc)-Cl groups. This is a therefor a novel combination of a novel iron mediated redox telomerization of vinyl acetate and a controlled polymerization of radically (co)polymerizable monomers utilizing one catalyst rather than extension of ATRP to vinyl acetate. The materials prepared by this sequential combination of two controlled polymerization processes are novel and useful.

The redox-initiated radical telomerization was studied. Typically, $CCl_4$ or $RCCl_3$ is used as the telogen and salts of transition-metals, such as iron or copper, are used as the catalysts. Results suggested that polymerization of VOAc with $CCl_4$ as the initiator in the presence of the $Fe(OAc)_2$/PMDETA complex was a redox-initiated radical telomerization (Scheme 12).

Scheme 12. Telomerization of VOAc Using $CCl_4$/$Fe(OAc)_2$/PMDETA

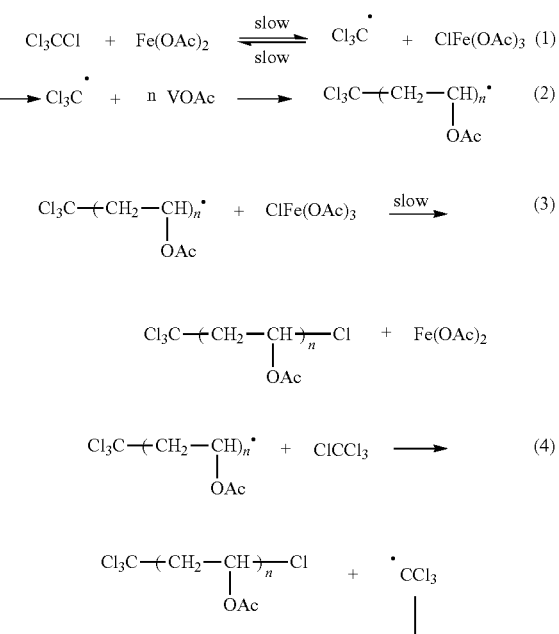

Thus, the telomerization was initiated by halogen abstraction from $CCl_4$ by $Fe(OAc)_2$/PMDETA. However, different from typical ATRP where the chain transfer constant to the transition-metal salt (e.g., $CuCl_2$, $FeCl_3$) is much greater than that to the telogen/initiator, the major chain transfer pathway in the $CCl_4$/$Fe(OAc)_2$/PMDETA system was likely transfer to initiator. In other words, $CCl_4$ acted as both the initiator and the main transfer reagent an INIFER (Scheme 12, Steps 1 & 4). Since the chain transfer constant to $CCl_4$ in the polymerization of vinyl acetate is about 1 under the reaction conditions, the ratio of consumed monomer to $CCl_4$ remained approximately constant throughout the polymerization. As a result, polymers with fairly constant molecular weights were obtained.

The preparation of similar block copolymers have been reported previously, also using ATRP in conjunction with trichloromethyl terminated polyvinyl acetate. In that preparation, the macroinitiator was synthesized using $CHCl_3$ as a transfer agent in polymerization of vinyl acetate initiated by AIBN. Since the transfer coefficient for $CHCl_3$ is very low ($C_{tr}$=0.01) and it is more difficult to prepare polymers in high yield with good functionality and without contamination with the end groups originating from the AIBN initiator and molecular weight control is poor. By contrast the novel application of $CCl_4$ as an initiator and transfer agent for the preparation of a polyvinyl acetate macroinitiator gives better control of end groups and a transfer coefficient closer to $C_{tr}$=1, provides polymers with lower polydispersity and predictable molecular weights even in the presence of small amounts of the transfer agent.

The same catalyst system can be used for both block copolymerization steps even though two different polymerization mechanisms are operating simplifying the process and reducing the cost for preparation of these useful materials.

In summary, the polymerization of vinyl acetate using $CCl_4$ as the initiator in the presence of $Fe(OAc)_2$/PMDETA provided polymers with degrees of polymerization predetermined by the ratio of the reacted monomer to the introduced initiator. The high level of functionality in the polyvinyl acetate has been successfully used for subsequent block copolymer formation by ATRP.

This system should also be applicable to other monomers that are currently difficult to polymerize under fully controlled conditions, including vinylidene fluoride which would lead to a PVDF/ATRP (co)polymer block copolymer.

If one wishes to prepare ABA block copolymers with a vinyl acetate mid block then one can use a difunctional INIFER such as an α,ω-dichlorobromo-alkane.

This sequence of synthetic steps can also be reversed, where a well-defined macroinitiator is synthesized by ATRP and then used for polymerization of a second block by redox type polymerization. This combination can exploit the advantages of both methods, i.e., the wider range of (co)polymerizable monomers and the well-controlled processes. This approach to prepare block copolymers containing vinyl acetate is demonstrated by the use of a bromo-terminated poly(n-butyl acrylate) as a macroinitiator in the redox initiation of vinyl acetate. The ATRP produced macroinitiator initiated the polymerization of vinyl acetate in the presence of CuBr/1,4,8,11-tetramethyl-1,4,8,11-tetraazacyclotetradecane ($Me_4$-Cyclam) in 50 vol.-% ethanol.

It has been determined that for polymerization of n-butyl acrylate using CuBr/$Me_4$-Cyclam with methyl 2-bromopropionate was a relatively poor initiating system for controlled polymerization. Presumably, the metal complex can abstract the halogen atom from the initiator to form a radical but the deactivation rate (abstraction of the halogen from metal by the growing radical) is much slower than for other catalyst systems. Slow deactivation results in poor control and resembles a redox-type initiation. Based on this observation, it was expected that this catalyst could activate the bromo-terminated poly(n-butyl acrylate) chain to form macroradicals which would then initiate the polymerization of vinyl acetate.

This ligand/catalyst system also allowed successful incorporation of (meth)acrylamides including N,N-dimethylacrylamide, N-t-butylacrylamide, and N-(2-hydroxypropyl)methacrylamide into controlled polymerization systems, allowing the preparation of homopolymers with functional termini capable of acting as macroinitiators for the preparation of block copolymers. These (meth)acrylamide monomers required a slowly deactivating system to build up significant molecular weight at each activation cycle. The optimum approach for the preparation of block copolymers is the preparation of the non-acrylamide block, by atom transfer polymerization of free radically (co)polymerizable monomers and use of this macroinitiator for a second atom transfer initiated polymerization of N,N-dimethylacrylamide, N-t-butylacrylamide, and N-(2-hydroxypropyl)methacrylamide in a similar manner to vinyl acetate employing the same CuBr/1,4,8,11-tetramethyl-1,4,8,11-tetraazacyclotetradecane ($Me_4$-Cyclam) catalyst complex moderated by presence of the redox conjugate.

In this manner (meth)acrylates-b-(meth)acrylamide block copolymers were prepared.

A poly(n-butyl acrylate) macroinitiator was prepared using methyl 2-bromopropionate and CuBr/PMDETA in the presence of 20 mol-% of $Cu(II)Br_2$ with respect to CuBr. This combination of initiator and catalyst/catalyst redox conjugate afforded well-defined polybutyl acrylate with a terminal bromine end group as determined by ESI MS analysis. A chain extension experiment with methyl acrylate supported the high degree of end group functionality. These two results indicate the presence of the bromo-end groups in polybutyl acrylate. The polybutyl acrylate macroinitiator was copolymerized with vinyl acetate using CuBr/$Me_4$-Cyclam in the presence of 20 mol-% of $Cu(II)Br_2$ relative to CuBr in 50 vol.-% ethanol at room temperature.

A polymerization without addition of $Cu(II)Br_2$ yielded a product with a higher molecular weight shoulder. The added $Cu(II)Br_2$ can deactivate the growing pVAc chain and thus prevent transfer or termination by coupling. However, the rate of deactivation is still much lower than the propagating rate, leading to the polymer with relatively high polydispersity. The $^1H$ NMR spectrum showed that the product contains poly(vinyl acetate) units.

There is a continuing effort to increase the range of monomers that are polymerized by ATRP and while (meth)acrylamides have been polymerized earlier the polymerizations were not fully controlled. (Meth)acrylamide polymers are biocompatible, non-toxic, water soluble materials that find application in medicine, the food industry and agriculture. There have been recent attempts to develop controlled polymerization processes for these monomers including efforts at anionic polymerization and other controlled radical processes. A series of experiments are reported in the Experimental Section which demonstrate that the ligand to be used for the polymerization of (meth)acrylamides should be pure and that final conversion of monomer to polymer is dependant on the amount of catalyst added to the system. These results show that with the catalyst systems described the limiting conversion first depends on the catalyst to initiator ratio. This is tentatively attributed to the displacement of the ligand by the polymer deactivating the catalyst.

We have determined that controlled radical polymerization of (meth)acrylamides can be conducted using a transition metal complex with $Me_6TREN$ as ligand. With this system it is possible to obtain a PDI below 1.1 but for any given catalyst level there is a limitation on the conversion attained. However, conversions above 80% can be obtained. The level of conversion attainable in a given system is sensitive to solvent employed, where more polar solvents decrease the limiting conversion. The molecular weights increase linearly with conversion and block copolymers are prepared from macroinitiators.

EXPERIMENTAL SECTION

Having generally described this invention, a further understanding can be gained through reference to certain specific examples which are provided herein for purposes of illustration and are not intended to be limiting unless otherwise specified.

Materials

Styrene, methyl methacrylate (MMA) and methyl acrylate (MA) were vacuum distilled from $CaH_2$ and stored at −15° C. The onium, salts, all from Aldrich, were dried under vacuum at 90° C. for at least 8 h and kept in a dessicator over anhydrous $CaCl_2$. Iron(II) bromide and iron(III) bromide, from Aldrich, were used as received. 1-Phenylethylbromide (PEBr), methyl 2-bromopropionate (MBP) and ethyl 2-bromoisobutyrate (EBiB), from Aldrich, were used as received. AIBN was recrystallized from methanol at 50° C. and stored in the freezer. All the solvents were used without further purification. In many cases, monomers and solvents were bubbled with argon for at least 15 min. immediately before polymerization.

Polymerizations

Single point experiments. A glass tube was loaded with the solid compounds (FeBr$_2$/onium salt or FeBr$_3$/onium salt/AIBN), capped with a rubber septum and cycled 3 times between vacuum and argon in order to remove oxygen. Then, all liquid components (monomer, solvent, GC standard, initiator), previously degassed, were added via syringe. The tube was sealed under argon and placed in an oil bath and the thermostat was set at the desired temperature. After a certain time interval, the tube was cooled, opened and the contents dissolved in THF or toluene.

Kinetic experiments. A Schlenk flask was charged with FeBr$_2$ and the onium salts. The flask was sealed with a rubber septum and was cycled 3 times between vacuum and argon. The degassed liquid components, except for the initiator, were added through degassed syringes, and the mixture was stirred at room temperature until the catalytic complex formed. In the case of MA, the initiator was added and the reaction mixture was quickly transferred into tubes, which were immediately sealed and placed in the oil bath. In the case of styrene and MMA, the flask was placed in the oil bath and the initiator added. After certain time intervals, tubes were removed from the oil bath and processed as described above, or samples were withdrawn from the reaction mixture using de-gassed syringes and dissolved in THF or toluene. In the case of "reverse" ATRP, AIBN was loaded into the Schlenk flask together with FeBr$_3$ and the onium salt.

Measurements

Monomer conversion was determined by GC in THF (styrene, MMA) or toluene (MA) solution using chlorobenzene or o-xylene as internal standards. A Shimadzu GC-14 gas chromatograph equipped with a J&W Scientific DB-WAX column with a Shimadzu CR501 Chromatapac was used. Molecular weights and polydispersities ($M_w/M_n$) were measured by GPC in THF using a Waters 717 Plus autosampler, PSS guard, 10 $_5$ Å, 1000 Å and 100 Å columns and a Waters 410 differential refractometer.

Example 1

Styrene

Polymerizations were carried out according to the invention using different molar ratios of FeBr$_2$/onium salt (Table 1) and showed that the reaction is slow and the rate decreasing with increasing amounts of salt. The molecular weights agreed well with the theoretical values, and the polydispersities were below 1.2 in all cases. In the case of the salt/FeBr$_2$ having a molar ratio of 0.5, a cationic polymerization seemed to occur, leading to much lower molecular weights and a bimodal molecular weight distribution. Tetrabutylammonium bromide (TBABr) and tetrabutylphosphonium bromide (TBPBr) were employed as salts. In both cases, the optimum molar ratio of FeBr$_2$/salt was in the range of 1-1.5. The reaction mixture was heterogeneous at both room temperature and 110° C.

TABLE 1

Styrene polymerization catalyzed by FeBr$_2$/onium salts

| Salt | FeBr$_2$/salt | Conv. % | $M_{n,th}$ | $M_{n,SEC}$ | $M_w/M_n$ |
|---|---|---|---|---|---|
| TBABr | 1/0.5 | 27.5 | 5500 | 2570 | 1.53 |
| TBABr | 1/1 | 23.3 | 4660 | 4670 | 1.18 |
| TBABr | 1/1.5 | 18.7 | 3740 | 4000 | 1.11 |
| TBABr | ½ | 11.9 | 2380 | 2460 | 1.18 |
| TBPBr | 1/0.5 | 70.0 | 14000 | 3030 | 2.18 |
| TBPBr | 1/1 | 29.3 | 5860 | 5450 | 1.18 |
| TBPBr | 1/1.5 | 16.3 | 3260 | 3240 | 1.10 |
| TBPBr | ½ | 5.5 | 1100 | 1050 | 1.15 |

Exp. cond.: bulk polymerization; styrene:1-phenylethyl bromide:Br:FeBr$_2$ = 192:1:1; 110 C.; 7 hr.

Figure 10:
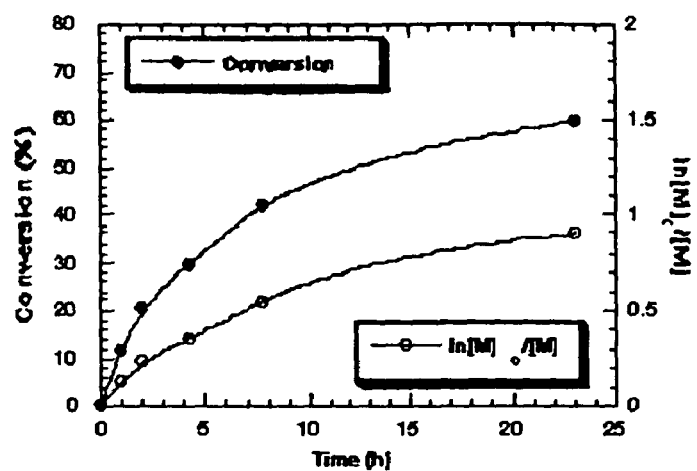
FIG. 10. is a graph showing kinetic plot for the bulk polymerization of styrene in Example 1.
Figure 11:
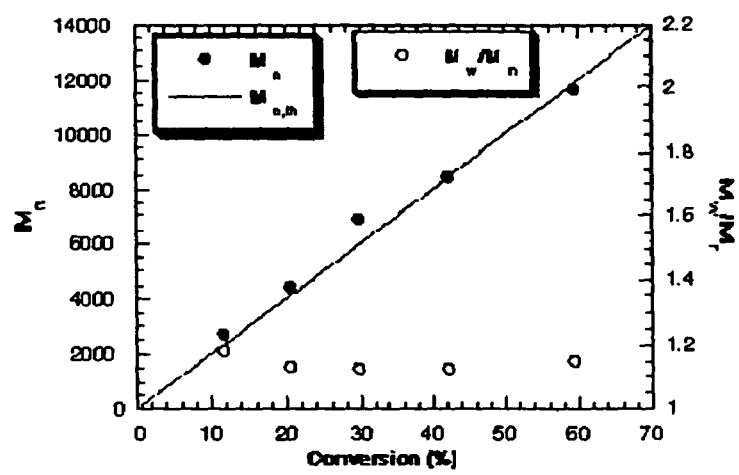
FIG. 11. is a graph showing dependence of molecular weights and polydispersities on monomer conversion for the bulk polymerization of styrene in Example 1.

A kinetic experiment carried out at a ratio FeBr$_2$/TBABr=1/1.5 showed a nonlinear first order kinetic plot, but good agreement between the theoretical and experimental $M_n$s and polydispersities falling between 1.1 and 1.2 (FIGS. 10 and 11).

Example 1A

Styrene Polymerization with the Catalytic System FeBr$_2$/TBAB/Bu$_3$P

The formation of some polyiron complexes with a lower reactivity during the polymerization, detailed above, can be an explanation for the slow reaction rate. The following experiment was conducted to determine if such complexes would be destroyed by adding Bu$_3$P and the polymerization would become faster (Table 1A).

TABLE 1A

Styrene polymerization with the system FeBr$_2$/TBAB/Bu$_3$P

| Exp. | FeBr$_2$/Bu$_3$P | Conv (%) | $M_{n,th}$ | $M_n$ | $M_w/M_n$ |
|---|---|---|---|---|---|
| F29-1 | 1/0.25 | 48.2 | 9640 | 8800 | 1.28 |
| 2 | 1/0.5 | 47.2 | 9440 | 9640 | 1.17 |
| 3 | 1/0.75 | 56.6 | 11320 | 11040 | 1.24 |
| 4 | 1/1 | 58.5 | 11700 | 11830 | 1.2.1 |
| 5 | 1/1.5 | 68.6 | 13720 | 15410 | 1.27 |

Exp. cond.: bulk, target $M_n$ = 20K; 110° C.; time 20 hrs; PEBr/FeBr$_2$/TBAB = 1/1/1.5.

The results showed that the reaction rate did increase, by adding Bu$_3$P. The increase noticed may be due to the formation of the complex between FeBr$_2$ and Bu$_3$P, which is known to promote a much faster polymerization reaction.

Example 2

Methyl Methacrylate

Figure 12:
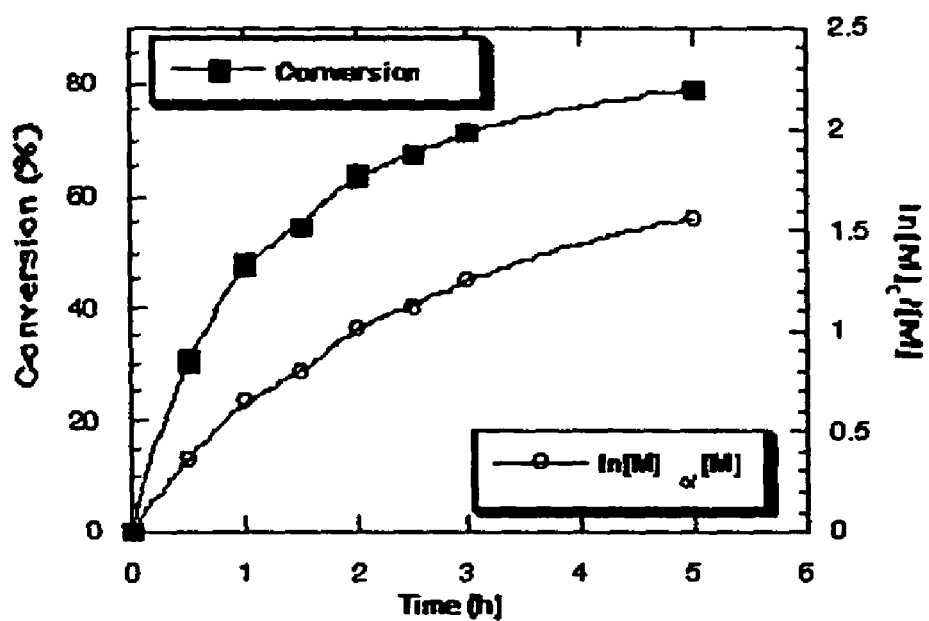
FIG. 12. is a graph showing kinetic plot for the solution polymerization of MMA (50% o-xylene, v/v) in Example 2.
Figure 13:
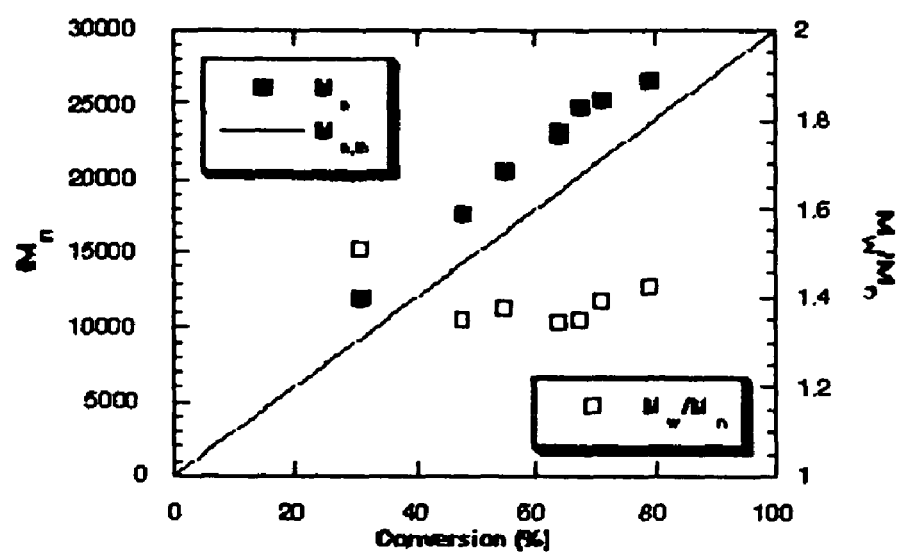
FIG. 13. is a graph showing dependence of molecular weights and polydispersities on monomer conversion for the solution polymerization of MMA in Example 2.

Polymerizations were carried out according to the invention at different molar ratios of TBPBr/FeBr$_2$ in xylene at 80 C and showed an optimum ratio of around 0.5-1. The results of the kinetic experiment performed under these conditions are shown in FIGS. 12 and 13. The reaction was fast (80% conversion after 5 hr.), but the first-order kinetic plot was not linear, possibly indicating the presence of termination reactions. The molecular weights increased linearly with conversion, but they were higher than the theoretical values. Polydispersity decreased at the beginning of the reaction until a minimum value of 1.34 was reached, and increased again after 60% conversion.

Example 3

Methyl Acrylate

Single-point polymerizations were carried out according to the invention and showed that $FeBr_2$ complexes with chlorine, bromine or iodine anions are active in methyl acrylate ATRP (Table 2). The experimental molecular weights agreed well with the theoretical values, and the polydispersities were low, indicating a controlled process. The polydispersity indices varied with the nature of the complexing halide anion in the order $Cl^->Br^->I^-$. In addition, the polydispersity was lower for the tetrabutylphosphonium salt than for its tetrabutylammonium counterpart, which is possibly due to a better solubility of the former. Similar results were obtained in the case of butyl acrylate.

TABLE 2

Methyl acrylate polymerization catalyzed by $FeBr_2$/onium salts

| Salt | $FeBr_2$/salt | Time (hr) | Conv. % | $M_{n,th}$ | $M_{n,SEC}$ | $M_w/M_n$ |
|---|---|---|---|---|---|---|
| TBACl | 1/0.5 | 8.5 | 5 | 1000 | 1150 | 1.53 |
| TBACl | 1/1 | 8.5 | 16.2 | 3240 | 3960 | 1.39 |
| TBACl | 1/1.5 | 8.5 | 34.1 | 6820 | 8060 | 1.90 |
| TBACl | ½ | 8.5 | 29.2 | 5840 | 12400 | 1.92 |
| TBABr | 1/0.5 | 22.17 | 5.3 | 1060 | 1230 | 1.35 |
| TBABr | 1/1 | 22.17 | 22 | 4400 | 4620 | 1.34 |
| TBABr | 1/1.5 | 22.17 | 32.4 | 6480 | 6830 | 1.22 |
| TBABr | ½ | 22.17 | 34.5 | 6900 | 6800 | 1.69 |
| TBAI | 1/0.5 | 22 | 3.6 | 720 | 750 | 1.17 |
| TBAI | 1/1 | 22 | 13 | 2600 | 2700 | 1.17 |
| TBAI | 1/1.5 | 22 | 24.6 | 4920 | 5120 | 1.15 |
| TBAI | ½ | 22 | 16 | 3200 | 3510 | 1.12 |
| TBAI | 1/2.5 | 22 | 19.3 | 3860 | 3720 | 1.13 |
| TBPBr | 1/0.5 | 23.17 | 4 | 800 | 1200 | 1.30 |
| TBPBr | 1/1 | 23.17 | 23.8 | 4760 | 4820 | 1.21 |
| TBPBr | 1/1.5 | 23.17 | 27.4 | 5480 | 5980 | 1.20 |
| TBPBr | ½ | 23.17 | 32.3 | 6460 | 6680 | 1.23 |
| TBPBr | 1/2.5 | 23.17 | 14.4 | 2880 | 2590 | 1.52 |

Exp. cond.: bulk polymerization; $MA:MBP:FeBr_2 = 232.5:1:1$; 90 C..

Figure 14:
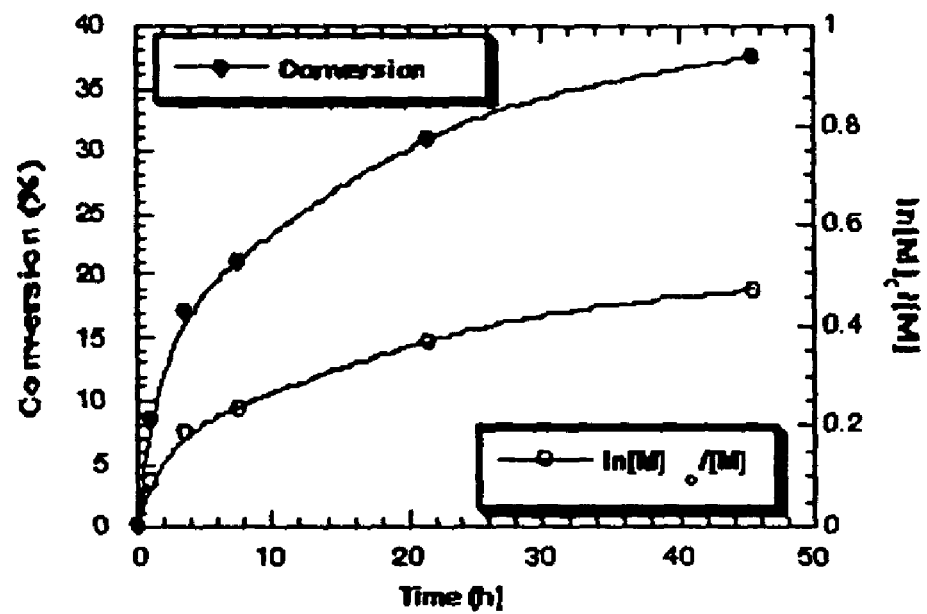
FIG. 14. is a graph showing kinetic plot for the bulk polymerization of methyl acrylate in Example 3.
Figure 15:
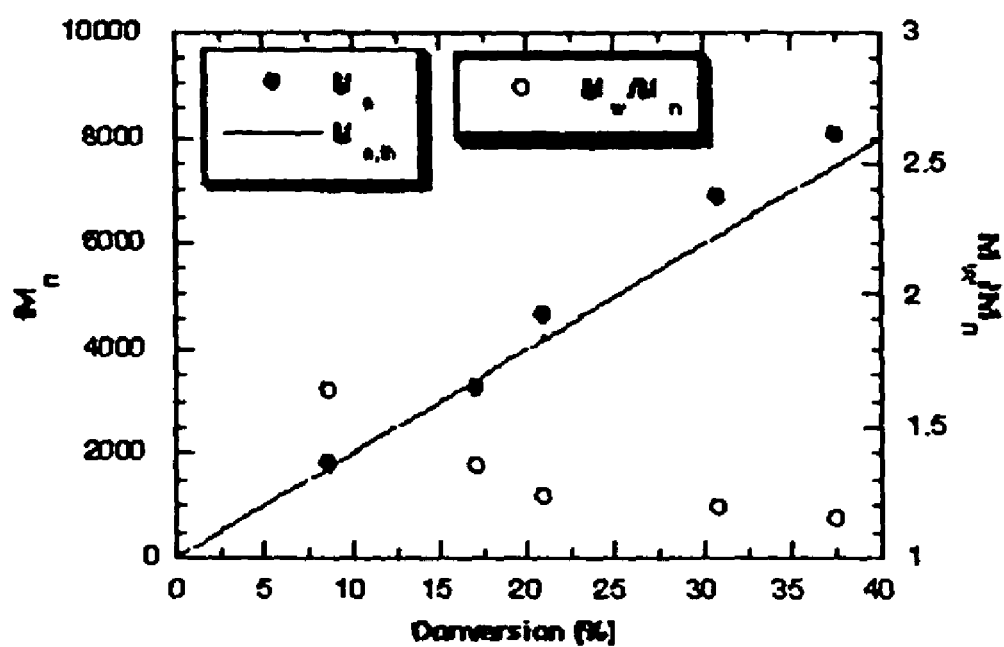
FIG. 15. is a graph showing dependence of molecular weights and polydispersities on monomer conversion for the bulk polymerization of methyl acrylate in Example 3.

A kinetic experiment carried out at a ratio $FeBr_2$/TBPBr=1/1.5 showed that the methyl acrylate reaction is very slow, and the first-order kinetic plot is nonlinear (FIG. 14). The molecular weights agreed very well with the theoretical values, and the polydispersities decreased with conversion to values as low as 1.15 (FIG. 15).

The results from Examples 1-3 show that halide anions can be used as complexing ligands in iron-mediated ATRP. Iron (II) bromide complexed with either chlorine, bromine or iodine anion can polymerize both styrene and (meth)acrylates in a controlled way and achieve predetermined molecular weights and low polydispersities. However, the first-order kinetic plot was nonlinear, possibly indicating either the presence of termination reactions or the modification of the catalyst structure to a complex with a lower activity. Also, in the case of styrene and acrylates, the polymerization was slow, whereas for MMA it was quite fast.

Example 4

"Reverse" ATRP with Transition Metal Salts

To demonstrate the general nature of the use of transition metal salts in "reverse" ATRP reactions the reaction was run using ferric salts and three different monomers to exemplify the nature of the reaction.

4a) Methyl Methacrylate

The experimental conditions initially employed and results obtained are shown in Table 3.

TABLE 3

"Reverse" ATRP of MMA at 85° C.

| Exp. | $FeBr_3$/TBPB | Conv. % | $M_{n,th}$ | $M_{n,SEC}$ | $M_w/M_n$ | Remarks |
|---|---|---|---|---|---|---|
| FM14-1 | 1/0.5 | 11 | 3300 | 4800 | 1.87 | heterogeneous |
| 14-2 | 1/1 | 58.6 | 17580 | 30600 | 1.63 | homogeneous |
| 14-3 | 1/1.5 | 51.5 | 15450 | 28200 | 1.61 | " |
| 14-4 | ½ | 13.3 | 3990 | 8700 | 1.31 | " |
| 14-5 | 1/2.5 | 5 | 1500 | 2630 | 1.35 | " |

Exp. cond.: $MMA/o$-dichlorobenzene = 1/1 v/v; target $M_n = 30K$; $FeBr_3/AIBN = 4/1$; temp. = 85° C.; reaction time = 2 hr. TBPB = tetrabutylphosphonium bromide.
$M_{n,th} = [MMA]_0/2/[AIBN]_0 \times MW_{MMA} \times$ conversion The obtained MWs were much higher that the theoretical values (about double). This can be attributed to the incomplete decomposition of AIBN. At 85° C. the half lifetime of AIBN is about 55 min. Also, the increasing viscosity of the reaction mixture enhances the cage effect, leading to a lower yield of primary radicals. Based on the ratio $FeBr_3$/TBPB, it seems that $FeBr_4^-$ is a poorer deactivator than $FeBr_5^{2-}$ (expts 14-2-3 vs. expts. 14-4-5).

In order to have a faster decomposition of AIBN and to reduce the cage effect, temperature was increased to 100° C. (AIBN half lifetime about 10 min). The dilution was also increased. The results are shown in Table 4.

TABLE 4

"Reverse" ATRP of MMA at 100° C.

| Exp. | $FeBr_3$/TBPB | Conv. % | $M_{n,th}$ | $M_{n,SEC}$ | $M_w/M_n$ | Remarks |
|---|---|---|---|---|---|---|
| FM15-1 | 1/0.5 | 40.5 | 12150 | 13330 | 1.43 | red second phase on the tube wall |
| 15-2 | 1/1 | 63.4 | 19020 | 20110 | 1.65 | red second phase on the tube wall |
| 15-3 | 1/1.5 | 62.8 | 18840 | 21210 | 1.62 | red second phase on the tube wall |
| 15-4 | ½ | 38.4 | 11520 | 13650 | 1.30 | red second phase on the tube wall |
| 15-5 | 1/2.5 | 25.5 | 7650 | 9510 | 1.30 | red second phase on the tube wall |

Exp. cond.: $MMA/o$-xylene = 1/2 v/v; target $M_n = 30K$; $FeBr_3/AIBN = 4/1$; temp. = 100° C.; reaction time = 2.17 hr. TBPB = tetrabutylphosphonium bromide.

A much better agreement between the experimental and theoretical $M_n$'s was obtained in this case. Again, the lowest polydispersity was obtained when the ratio salt/$FeBr_3$ was higher than 2.

Figure 16:
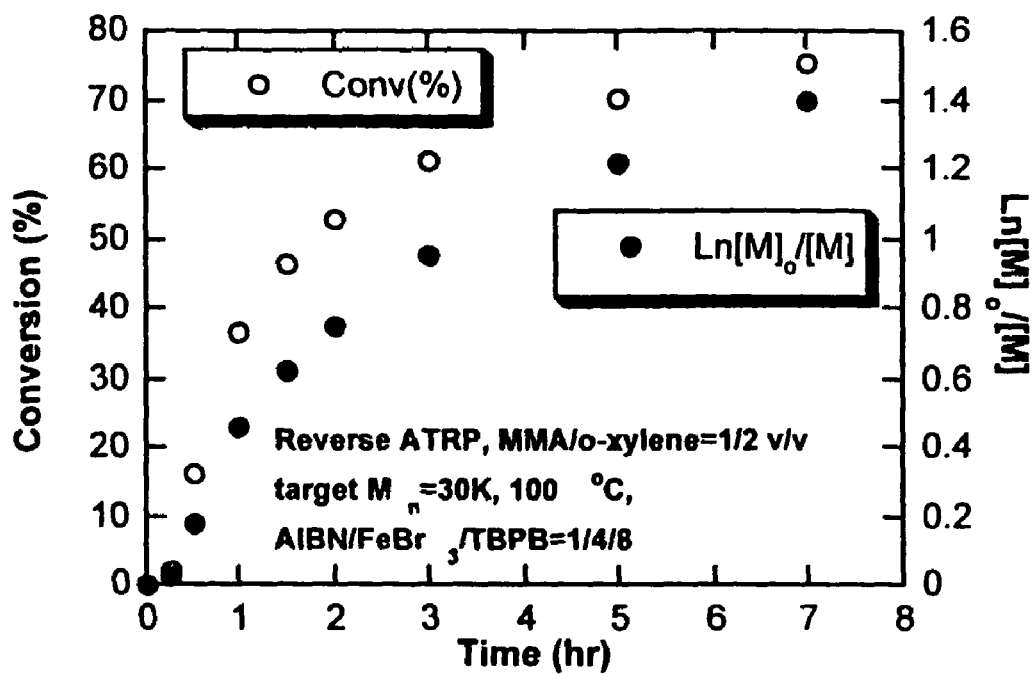
FIG. 16. is a graph showing time dependence of conversion and logarithmic conversion for "reverse" ATRP of MMA.
Figure 17:
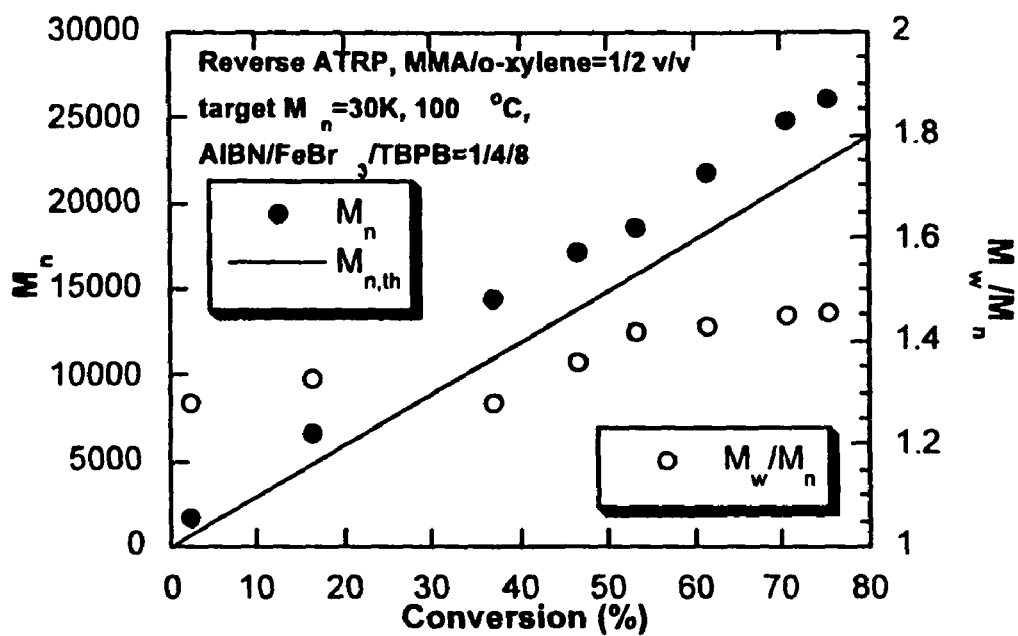
FIG. 17. is a graph showing dependence of $M_n$ and $M_w/M_n$ on the monomer conversion in "reverse" ATRP of MMA.

Using the conditions employed in experiment FM15-4, a kinetic experiment was run. The results are displayed in FIGS. 16 and 17.

Figure 8:
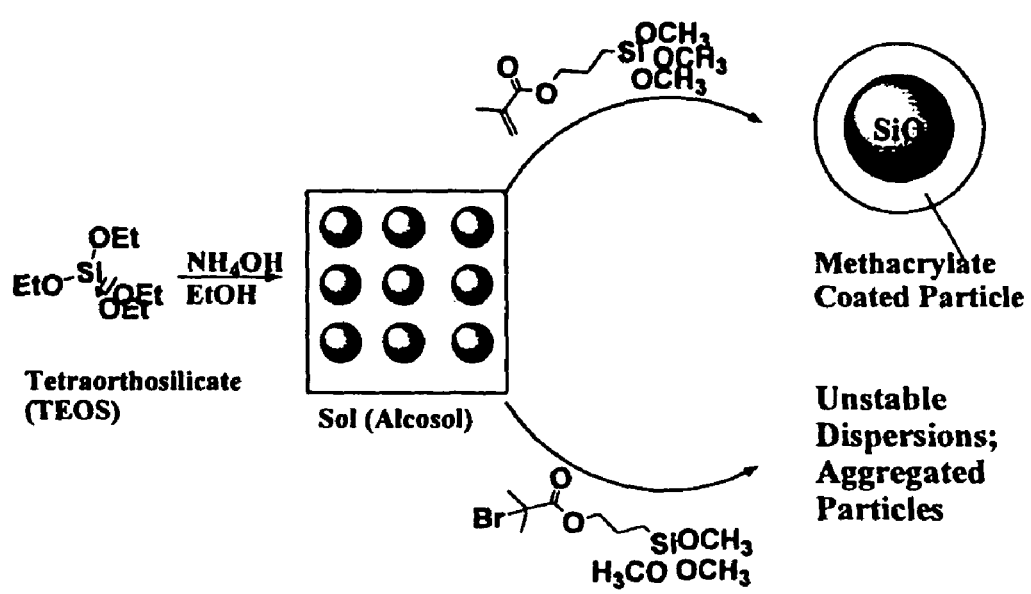
FIG. 8. is a reaction schematic of the Stober process toward functional silica particles.

GPC traces of pMMA obtained by "reverse" ATRP show curvature in the first order kinetic plot indicating that termination occurred during the polymerization (FIG. 7). Due to these termination reactions, tailing could be seen on the GPC traces and the MW are higher than the theoretical values by about 10-15%. Polydispersity is about 1.3 at low conversion then it increases up to about 1.45 (FIG. 8).

4b) Methyl Acrylate

The results of the "reverse" ATRP of methyl acrylate are shown in Table 5.

TABLE 5

"Reverse" ATRP of MA at 100° C.

| Exp. | FeBr$_3$/TBPB | Conv. % | $M_{n,th}$ | $M_{n,SEC}$ | $M_w/M_n$ | Remarks |
|---|---|---|---|---|---|---|
| FA24-1 | 1/0.5 | 3 | 600 | 480 | 1.11 | heterogeneous |
| 24-2 | 1/1 | 10 | 2000 | 3400 | 1.84 | " |
| 24-3 | 1/1.5 | 23 | 4600 | 5980 | 1.67 | " |
| 24-4 | ½ | 26.2 | 5240 | 7500 | 1.31 | " |
| 24-5 | 1/2.5 | 29.5 | 5900 | 7350 | 1.30 | " |

Exp. cond.: bulk; target $M_n$ = 20K; FeBr$_3$/AIBN = 4/1; temp. = 100° C.; reaction time = 22 hr.

As in the case of direct ATRP of styrene with transition metal salts, the polymerization is slow, similar conversions being obtained after similar reaction times. In addition, as was determined for the polymerization of MMA, the lowest polydispersities are obtained for FeBr$_3$/TBPB ratios higher than 2.

4c) Styrene

The reaction conditions and results are displayed in Table 6.

TABLE 6

"Reverse" ATRP of styrene

| Exp. | FeBr$_3$/TBAB | Conv. % | $M_{n,th}$ | $M_{n,SEC}$ | $M_w/M_n$ | Remarks |
|---|---|---|---|---|---|---|
| F34-1 | 1/0.5 | 53.5 | 10700 | 1700 | 3.7 | heterogeneous (a second red layer) |
| 34-2 | 1/1 | 42.0 | 8400 | 2400 | 4.27 | heterogeneous (a second red layer) |
| 34-3 | 1/1.5 | 31.1 | 6220 | 1980 | 5.17 | heterogeneous (a second red layer) |
| 34-4 | ½ | 25.5 | 5100 | 1860 | 6.73 | heterogeneous (a second red layer) |
| 34-5 | 1/2.5 | 37 | 7400 | 2420 | 5.30 | heterogeneous (a second red layer) |

Exp. cond.: bulk; target $M_n$ = 20K; FeBr$_3$/AIBN = 4/1; temp. = 110° C.; reaction time = 15 hr.
TBAB = tetrabutylammonium bromide.

The results show that an uncontrolled cationic polymerization occurred due to the presence of FeBr$_3$. The experiment should be redone by adding the monomer to the preformed complex.

Example 5

MMA Polymerization with FeBr$_2$/Onium Salts, Initiated by 2-Bromo-Isobutyric Acid A single tube experiment was performed under the following conditions: MMA/o-xylene=1/1 v/v; target $M_n$=40K; 2-Br-isobutyric acid/FeBr$_2$/TBPB=0.75/1/1; temp.=80° C.; time=2.25 hr. The results were: conversion=42%; $M_{n,th}$=16800; $M_{n,SEC}$=25550; $M_w/M_n$=1.29. The initiator efficiency calculated based on these data is 66%. After a comparison of these results with the results obtained above for MMA polymerization performed under similar conditions and initiated by ethyl 2-bromo isobutyrate one may conclude that the polymerization is not too affected by the free carboxylic initiator.

Example 6

MMA Copolymerization with Methacrylic Acid

A copolymerization experiment of MMA with methacrylic acid (5 mole-%) was attempted. The reaction was carried out in o-dichlorobenzene (1/1 v/v vs. MMA), target $M_n$=30K, at 80° C., for 21.5 hr, under nitrogen. The initiating system was EBiB:FeBr$_2$:TBPB=1:1:1. The catalyst was prepared first at room temperature in DCB+MMA, then degassed methacrylic acid was added, and finally EBiB. Samples were withdrawn from the reaction mixture at different time intervals in order to measure conversion. The final molecular weight and polydispersity were measured on both THF and DMF lines. The samples were processed in the usual way (passed through an alumina column). The results are shown in Table 7.

TABLE 7

Copolymerization of MMA and MAc using FeBr$_2$/salts

| Time hr | Conv. MMA % | Conv. MAc | $M_n$ | $M_w/M_n$ |
|---|---|---|---|---|
| 5.33 | 16.6 | 11.3 | — | — |
| 21.5 | 25.4 | 11.8 | 3520* | 1.91* |
|  |  |  | 4660** | 1.61** |

*THF line, PMMA standards;
**DMF line, PMMA standards.

The results from the THF line are affected by the presence of an impurity, whose peak overlap with the polymer peak.

Example 7

Use of Counterion Supported Catalysts and Counterion Exchange for Catalyst Recycle The following examples are provided to better illustrate the present invention of supporting the catalyst through use of a shared counterion by exemplifying the use of a transition metal catalyst supported on DOWEX™ sodium exchange resins for polymerization of methyl acrylate, and are not intended to be limiting. Most commercially available cationic ion exchange resins consist of sulfonated crosslinked polystyrene-divinylbenzene beads. Cations are typically H$^+$, Na$^+$ or a mixture of the two and the anionic counter ion is a sulfonyl group. The exchange of ATRP active copper complexes with Na$^+$ is much slower than with H$^+$, presumably due to the difference in cation size. Na$^+$ sites on the ion exchange resins can be converted to H$^+$ sites by treatment with strong mineral acid such as HNO$_3$ or HCl. Effective removal of the Cu(I) and Cu(II) ATRP active complexes can be achieved using large excess of ion exchange resins, i.e. excess of accessible H$^+$ sites. In that case, the above equilibrium shifts to the right favoring the complete removal of the copper complex from the solution. Due to the colored nature of the Cu(I) and Cu(II) complexes employed in ATRP, UV-Vis spectrometry was used to monitor their concentration in solution.

Materials

CuBr (99.999%, Aldrich), CuBr$_2$ (99.999%) and 2,2'-bipyridine (99+%, Aldrich) were stored in glove box under nitrogen atmosphere. DOWEX MSC-1 macroporous ion-exchange resins (20-50 mesh, Aldrich) were washed with deionized H₂O, acetone, and dried under vacuum for 48 h. N,N,N',N'',N''-Pentamethyldiethylenetriamine (99%, Aldrich), Tris-(2-dimethylaminoethyl)amine (synthesized according to well known literature methods) and all solvents were distilled and deoxigenized prior to usage.

UV-VIS Measurements

The spectroscopic measurements were performed on a UV/VIS/NIR spectrometer Lambda 900 (Perkin Elmer), using either a quartz UV cell or a quartz UV cell joined to a Schlenk flask. All samples were taken out of the reaction mixtures in the absence of oxygen, but were exposed to air for 2 h prior to dilution with methanol and UV-VIS analysis. Blank solutions were prepared by mixing 0.5 mL of the reaction solvent with 4.5 mL of methanol.

Loading Capacity of DOWEX MSC-1 Macroporous Ion-Exchange Resins in the Dry H⁺ Form In a typical experiment, 5.0 g of DOWEX™ MSC-1 macroporous ion-exchange resins were transformed into the H⁺ form by slow treatment with 500 mL of 1.6 M HNO₃. Subsequently, the resins were washed to neutrality with distilled water, suction-filtered and dried in air. Resins were then dried in a vacuum oven for 24 h to remove any residual H₂O. Dry resins (0.7274 g) were weighed into a 200 mL Erlenmeyer flask and allowed to stand 24 h with 100 mL of 0.1 M NaOH in 5% NaCl solution. 20.0 mL of the solution were then back titrated with 0.1 M H₂SO₄. 6.2 mL of acid was required to neutralize the solution of NaOH. Loading capacity of the resins in the dry H⁺ form was then calculated, based on the original and final amount of NaOH in the solution, to be $5.2 \times 10^{-3}$ mol of Na⁺/g of resins in the dry H⁺ form.

Loading Capacity of DOWEX MSC-1 Macroporous Ion-Exchange Resins in the Crude Form The same procedure was used as above with the exception that DOWEX™ MSC-1 macroporous ion-exchange resins were not treated with excess HNO₃ prior to the reaction with NaOH. Loading capacity was calculated to be $5.0 \times 10^{-3}$ mol of Na⁺/g of resins in the crude form.

Kinetic Studies of Catalyst Removal

In a typical experiment, 0.0347 g ($2.420 \times 10^{-4}$ mol) of CuBr and 0.05052 mL ($2.420 \times 10^{-4}$ mol) of N,N,N',N'',N''-Pentamethyldiethylenetriamine were placed in a Schlenk flask and 20.0 mL of solvent added (methyl acrylate, chlorobenzene, ethanol, acetone or different ratios of methyl acrylate and chlorobenzene and methyl acrylate and acetone). Mixture was stirred at room temperature for three hours to allow full complex formation. It was then transferred (via cannula) to 0.815 g of DOWEX™ MSC-1 macroporous ion-exchange resins. Samples were taken out of the mixture (0.5 mL) at different time intervals, exposed to air, and diluted to 5.0 mL with methanol prior to UV/VIS analysis. Concentrations were calculated based on Beer-Lambert's plot for the oxidized form of CuBr/[N,N,N',N'',N''-Pentamethyldiethylenetriamine] in methanol ($\lambda_{max}$=652 nm, $\epsilon$=143.22 Lmol⁻¹cm⁻¹, $R^2$=0.9998). The same experimental procedure was also used for other Cu(I) and Cu(II) complexes. Concentrations were determined based on the corresponding Beer-Lambert's plots.

When a solution of CuBr/PMDETA is brought into contact with DOWEX™ MSC-1 ion-exchange resins, it slowly decolorizes and becomes acidic. This observation is consistent with the following cationic ion-exchange equilibrium:

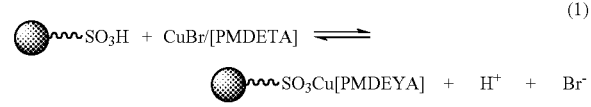

The position of the equilibrium is dependent on the polarity of the solvent, ionic character of the exchanging complex, pH of the solution, the degree of crosslinking, acidic strength and size of the ion-exchange resins. These factors are very important when considering maximizing removing capacity of ion-exchange resins towards Cu(I) complex. In particular, pH of the solution plays very important role. At lower pH values, protonation of PMDETA will occur which causes decomposition of the copper(I) complex. Also, on the other hand, exchange of CuBr/PMDETA with Na⁺ is much slower than with H⁺ due to the difference in cation size. Na⁺ sites on the DOWEX MSC-1 resins (Scheme 3) can be converted to H⁺ sites by treatment with strong mineral acid such as HNO₃ or HCl, which is a typical procedure when determining maximum loading capacity of the resins. However, these problems can be avoided by using large excess of ion-exchange resins relative to the concentration of CuBr/PMDETA. In that case, the above equilibrium shifts to the right which favors the complete removal of CuBr/PMDETA from the solution.

FIG. 1 shows the effect of the solvent on the removal of CuBr/PMDETA using DOWEX MSC-1 macroporous ion exchange resins. From the figure, it is apparent that solvent had little effect on the rate of removal of the Cu(I) complex from either methyl acrylate, methyl acrylate/chlorobenzene mixtures or ethanol. In fact, using 20.0 mL of $1.2 \times 10^{-2}$ molL⁻¹ of CuBr/PMDETA ($2.420 \times 10^{-4}$ mol) and 0.815 g of resins, it took approximately 60 min to remove more than 95% of the complex from the solution. Part of the solvent independence on the rate of removal lies in the fact that excess of H⁺ sites on the resins were used ($4.075 \times 10^{-3}$ mol, 17 eq.) relative to the amount of CuBr/PMDETA in solution, which shifted the equilibrium (Eq. 1) to the right. The rate of removal of CuBr/PMDETA became solvent dependent, and increased as solvent polarity increased, when the amount of H⁺relative to the CuBr/PMDETA was reduced below 5 equivalents.

Figure 2:
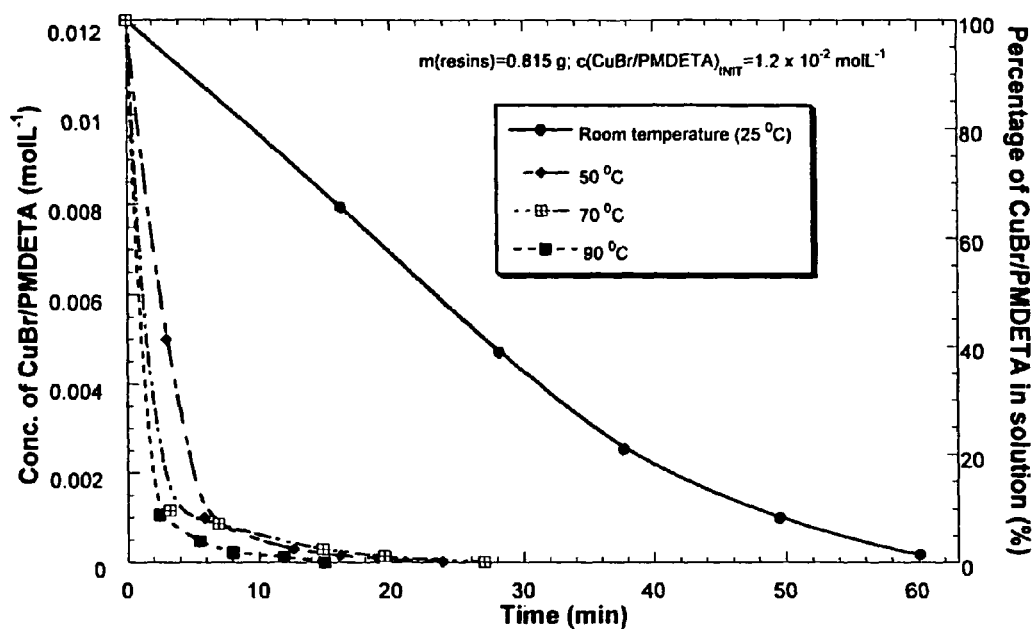
FIG. 2. is a graph showing temperature effect on the removal of CuBr/PMDETA in 50% methyl acrylate/50% chlorobenzene solution using DOWEX MSC-1 ion exchange resins.

In FIG. 2 is shown temperature effect on the removal of CuBr/PMDETA from a 50% methyl acrylate/50% chlorobenzene solution. The rate of removal increased with temperature. At temperatures above 50° C. it took approximately 20 min to remove more than 95% of CuBr/PMDETA from the solution. Similar results were also obtained using methyl acrylate and acetone or THF mixtures.

Figure 3:
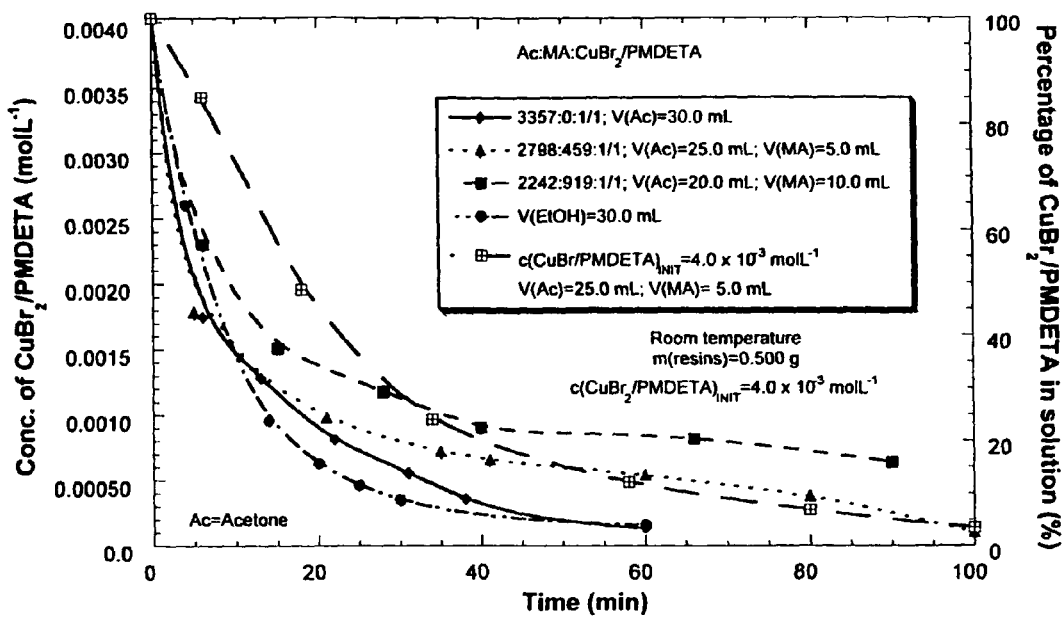
FIG. 3. is a graph showing Solvent effect on the removal of $CuBr_2$/PMDETA using DOWEX MSC-1 ion exchange resins.

FIG. 3 shows the effect of the solvent on the removal of CuBr₂/PMDETA using DOWEX MSC-1 ion-exchange resins. Studies were performed at much lower concentrations when compared to CuBr/PMDETA due to the limited solubility of Cu(II) complex. The rate of the removal was dependent on the polarity of the solvent and generally increased as the solvent polarity increased. When comparing Cu(I) and Cu(II) complexes with PMDETA under the same experimental conditions (FIGS. 1 and 3) it can be seen that the rates of removal are comparable.

Figure 4:
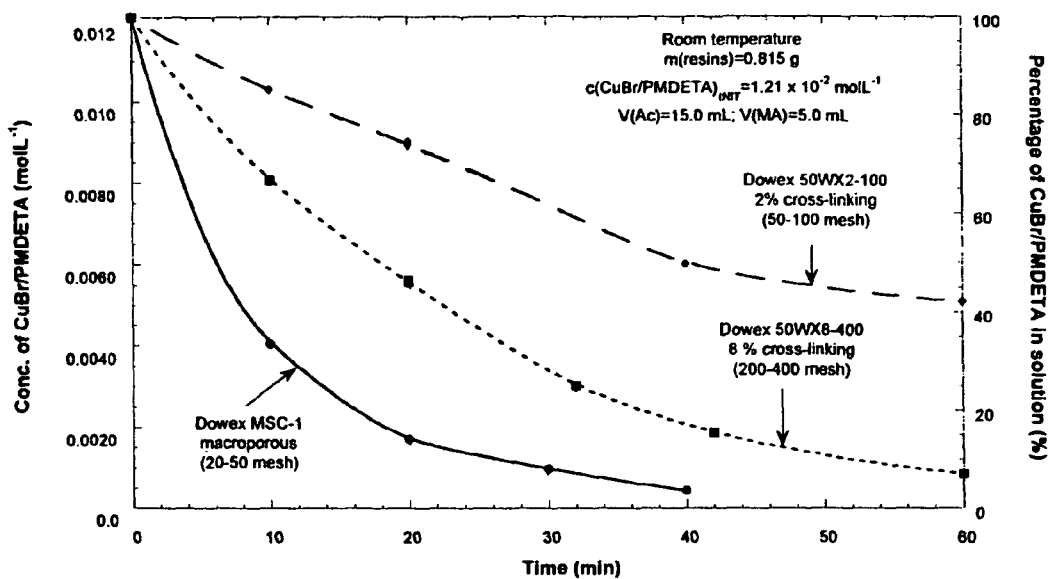
FIG. 4. is a graph showing removal of CuBr/PMDETA using different types of ion exchange resins.

The effect on the removal of CuBr/PMDETA using different types of ion exchange resins is presented in FIG. 4. The exchange was the fastest with macroporous resins, and was also depended on the degree of crosslinking of polystyrene and bead size. For the same bead size, the rate of removal of CuBr/PMDETA or CuBr₂/PMDETA decreased as the degree of crosslinking increased. Presumably, this was due to swelling effect of the resin polymer network, allowing for the copper salts to gain access to the sulfonated sites in the interior of the beads.

Figure 5:
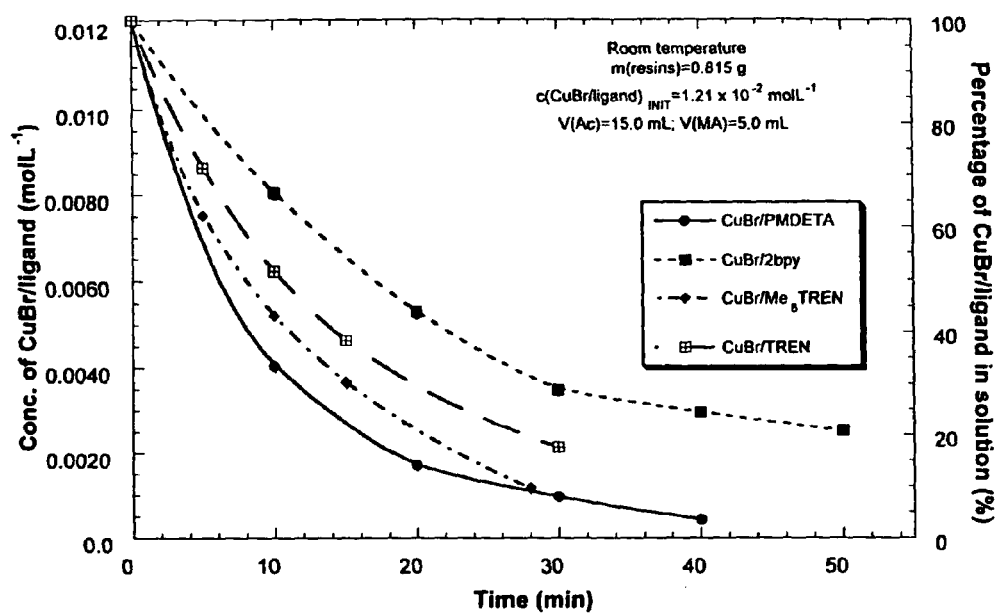
FIG. 5. is a graph showing ligand effect on the removal of CuBr complex using DOWEX MSC-1 ion exchange resins.

The rate of catalyst removal from an acetone/methyl acrylate mixture was found to be dependent upon the ligands used to complex the catalyst, FIG. 5. It was found that the removal was fastest with CuBr/PMDETA and slowest with CuBr/2 bpy. The ionic character of these complexes and their structures in solution are not precisely known, and hence no definitive conclusions can be drawn as to why they show different behavior when exchanging with $H^+$ sites on the ion exchange resins. For Cu(II) complexes we also found that the amount of $Br^-$ released to the solution depended on the ligand used. This effect was presumably due to the differences in the overall charge of the Cu(II) center, which depending on the ligand used can be +1 or +2.

These experiments demonstrate an efficient method for the removal of Cu(I) and Cu(II) complexes in ATRP using ion exchange resins with acidic groups. The utility of these resins to remove copper catalysts from bulk (monomer and solvent), polymerization and organic solutions has also been defined. The resins have also been used to remove catalyst from ATRP water-borne polymerizations without coagulation of the polymer latex. It was found that the rate of removal of copper complexes is dependent on the solvent polarity, temperature, type of ion exchange resins used and ionic character and size of the copper complex. In the limit of using large excess of $H^+$ sites on the resins, Cu(I) and Cu(II) complexes can be removed from reaction mixtures relatively fast. It is envisioned that the copper complexes can be recycled by the use of ion exchange resins as well.

Example 8

A DOWEX™ sodium exchange resin was loaded with Cu(I) and complexed with Me6TREN. Methyl acrylate and MBP initiator was added and the flask placed in an oil bath at 60° C. The experiment employed the following conditions: MA:MBP:Cu(I) on resins=500:1:10. The reaction was extremely fast and the solution became viscous within 5 min stirring. The product was dissolved in THF and separated from the resin. The GPC trace indicated the presence of a polymer with $M_n$=38100 g/mol, $M_w$=43770 g/mol, PDI=1.15 (theoretical, for 99% conversion is 43030 g/mol).

Example 9

The resins from example 8, were used again for the same reaction, but at room temperature. This time, the solution became extremely viscous (stirring stops) after 3 h. The polymer had the expected low molecular weight peak, but also a higher molecular weight peak. This was attributed to poor stirring. We believe that if the reactions are not fast the reactions cannot be done in bulk since coupling of the chains can occur at higher conversions (starting even at 50%), because radical chains find it difficult to reach Cu(II) to abstract Br back, and so they couple. (As noted elsewhere in the application this phenomenon can be addressed by increasing the concentration of Cu(II) on the support.)

Example 10

The resin from example 9 was reused once more. The conditions were as follows: MA:MBP:Cu(I) on the resins=1000:1:10. The objective was to use more monomer in order to reduce the rate of reaction and be able to watch the reaction, because it will now take more time. Again, after 50 min stirring at 60° C. the mixture became extremely viscous. The resulting polymer has the expected low molecular weight peak (20,000 g/mol) but also a much higher molecular weight peak (900,000). This is indicative of some redox initiated polymerization at low conversion prior to forming a Cu(I)/Cu(II) equilibrium in the catalyst system.

Example 11

The reaction was run using benzene as solvent, again using the same resin/catalyst. The ratio of reactants was MA:MBP:Cu(I) on resins: benzene=1000:1:10:3000, and the reaction was run at 60° C. The rate of reaction was followed by GC to examine at the kinetics. The results show that it is a "living" system with linear increase in molecular weight with conversion.

The results from examples 8-11 show that a transition metal supported on commercially available ion exchange resins show the same activity in repeat experiments and that they can be used over and over. This indicates that a transition metal catalyst for ATRP polymerization can be supported on a solid support through a "shared" counterion, one directly attached to the support, and that the catalyst can be used in a batch or continuous polymerization system.

In examples 8-11, $Cu(CH_3CN)_4 PF_6$ was the source of Cu+ on the resins. The supported Cu(I) is later complexed with Me6TREN.

Example 12

Supported Transition Metal Salt-Mediated ATRP

The following experiments performed were intended to check the possibility of conducting an ATRP reaction using supporting $FeBr_3$ on anion exchange resins. These initial examples are followed by the use of the supported catalyst in the "reverse" ATRP of MMA.

Two types of ion exchange resins were used to support the transition metal salts:

DOWEX 1×8-400 chloride—which is a gel type resins with 200-400 meshes bead size and has chloride as the exchangeable anion;

DOWEX MSA-1—which is a macroporous type resin with 20-50 meshes bead size.

The commercial product also has chloride as exchangeable anion.

One experiment was done with the resin in chloride form. For the second experiment, the resin was converted into bromide form, by loading it into a column, passing a aqueous solution of NaBr through the column, washing with deionized water and methanol, and dried under high vacuum.

Generally a loading capacity of $5 \times 10^{-4}$ meq/g was assumed for the resins. This was about 3 times lower than the loading capacity described in literature for this type of resins under standard use (anion exchange). The loading procedure was as follows: 1 g dry resin, 0.15 g ($5 \times 10^{-4}$ mole) $FeBr_3$ and 10 ml o-dichlorobenzene were loaded in a Schlenk flask. The mixture was stirred under nitrogen at room temperature for more than 20 hr. Then the resins were recovered by filtration with suction, washed with 100% ethanol and dried under vacuum. When chloride-form resins were used, the color of the final product was yellow. In the case of bromide-form resins the color was maroon. Based on the color change, one can conclude that the $FeX_4^-$ complex anion is formed on the surface of the resins, even though not all $FeBr_3$ added was absorbed on to the resin. Based on visual observation, more complex formed in case of macroporous resins, as would be expected.

Literature data show that $FeCl_4^-$ anion is yellow and $FeBr_4^-$ is brown. The yellow color of the beads shows that Cl and Br anions exchange very fast in $FeX_4^-$.

Two experiments were carried out in order to demonstrate the activity of the supported catalysts in the "reverse" ATRP of MMA.

Example 12a

FM18R

The following conditions were used: temp.=100° C.; MMA/dichlorobenzene=1/2; target $M_n$=30K. The target $M_n$ was calculated using the following relationship: $M_n$= $[MMA]_0/2/[AIBN]_o \times MW_{MMA} \times C$ %. A $FeBr_3$/AIBN of 6/1 was aimed, assuming that all $FeBr_3$ used in the reaction with the resins was supported. The actual amounts used were: MMA=1.5 ml; DCB=3 ml; $FeBr_3$=41 mg; AIBN=4 mg; macroporous resins–bromide form=0.4 g.

In a Schlenk flask fitted with condenser and stir bar AIBN and resins were loaded. After three vacuum-nitrogen cycles, degassed MMA and DCB were added via degassed syringes, and the reaction flask was placed in an oil bath kept at 100° C. the stirring rate was about 1000 rpm. At time intervals samples were withdrawn from the flask, and the conversion was checked by GC, using DCB as internal standard. Because of the size of the resins, the beads were not uniformly dispersed in the reaction mixture. After the viscosity of the reaction mixture increased, the mixing became even worse. At the final, the liquid phase was colorless. The results are shown in Table 8.

TABLE 8

"Reverse" ATRP of MMA catalyzed by $FeBr_3$ supported on macroporous resins

| Sample | Reaction time (hr) | Conversion (%) | $M_n$ | $M_w/M_n$ | $M_p$ |
|---|---|---|---|---|---|
| 1 | 0.5 | 52 | 26800 | 2.26 | 70150 |
| 2 | 1.5 | 64.2 | 20300 | 2.75 | 65300 |
| 3 | 4 | 71.6 | 28600 | 2.01 | 65300 |
| 4 | 7 | 88.1 | 29600 | 1.97 | 67400 |
| 5 | 21 | 95.6 | 31000 | 1.86 | 65100 |

Example 12b

FM 19R

Same conditions as in exp. FM 18R were employed except for 0.87 g of gel type resins (chloride) were used. The beads were homogeneously dispersed at the beginning of the reaction, but the mixing became bad after the viscosity of the reaction mixture increased. The results are shown in Table 9.

TABLE 9

"Reverse" ATRP of MMA catalyzed by $FeBr_3$ supported on gel type resin.

| Sample | Reaction time (hr) | Conversion % | $M_n$ | $M_w/M_n$ |
|---|---|---|---|---|
| 1 | 0.5 | 53 | 29800 | 2.04 |
| 2 | 1.5 | 63.6 | 32600 | 2.24 |

TABLE 9-continued

"Reverse" ATRP of MMA catalyzed by $FeBr_3$ supported on gel type resin.

| Sample | Reaction time (hr) | Conversion % | $M_n$ | $M_w/M_n$ |
|---|---|---|---|---|
| 3 | 3.5 | 68.1 | 35400 | 2.24 |
| 4 | 8 | 71.7 | 35500 | 2.26 |
| 5 | 21 | 82.2 | 36000 | 2.19 |

In both of these initial experiments the results look more like a dead-end polymerization. It seems that no deactivation-activation cycle occurred and the supported complex has to be modified to increase the concentration of the redox conjugate.

Example 13

Precipitation Polymerization

The concept behind these experiments were that besides supported catalyst and fluorinated solvents, another approach to recycle the ATRP catalyst would be the use of a solvent which dissolves the polymer at the polymerization temperature, but the polymer precipitates out at room temperature (or below). The polymer is recovered by filtration, and the filtrate containing the dissolved catalyst is recycled.

13a) Alcohols as Solvents

Methanol and absolute ethanol were used as solvents for the ATRP of MMA under the following conditions: target $M_n$=30K; 90° C.; MMA/alcohol=1/2 v/v; EBiB/CuCl/dN-bpy=1/1/2; 7.16 h. The results are shown in Table 10.

TABLE 10

Precipitation polymerization of MMA in alcohols

| Exp. | Solvent | Conversion % | $M_n$ | $M_w/M_n$ |
|---|---|---|---|---|
| P-MMA1-1 | MeOH | 54.7 | 19500 | 1.85 |
| P-MMA1-2 | EtOH | 64.3 | 20400 | 1.64 |

As expected, the reaction mixture was homogeneous at 90° C., however in a non-agitated rapidly cooled system by the time the solution had cooled to room temperature the polymer had precipitated as lump, which made it difficult to be recovered. In addition, methanol has swelled to some degree the polymer. Use of a less polar solvent, ethanol, afforded a lower polydispersity. An agitated solution during cooling leads to a precipitated powder.

13b) Heptane as Solvent

The following conditions were employed: target $M_n$=60K; 90° C.; MMA/heptane=1/2; EBiB/CuCl/dNbpy=1/1/2; 7.16 h. The polymer precipitated out during the polymerization. Conversion=14-16%; $M_n$=11400; $M_w/M_n$=1.21.

Example 14

Coupling Reactions

The model polymer was prepared by polymerization of methyl acrylate using ethylene glycol mono(2-bromoisobutyrate) as initiator and cuprous bromide/N,N,N',N",N"-pentamethyldiethylenetriamine (PMDETA) as the transition metal catalyst. The success of the atom transfer coupling reaction can be seen in Table 11. Use of 0.5 mole of α-methylstyrene per mole of α-bromo-ω-hydroxy-poly(methyl acrylate) in experiment 75NB1 shows that the number average molecular weight (Mn) essentially doubled. The proposed mechanism of this coupling reaction is shown in FIG. 6.

When 0.25 mole of di-isopropenyl benzene was used in the coupling reaction, experiment 77NB1; the Mn of the polymer, after removal of bromine, was quadrupled indicating the formation of a four armed star polymer with four terminal hydroxy groups.

If a 1:1 ratio of chains to m-diisopropenylbenzene was used, the MALDI-TOF-MS clearly showed that addition of m-diisopropenylbenzene was followed by elimination of HBr. This lead to the suggested mechanism shown in FIG. 7 where addition of poly(methyl acrylate) to m-diisopropenylbenzene is followed by reaction with cupric bromide and subsequent elimination, yielding HBr and a terminal olefin (1). The newly formed olefin is able to add to poly(methyl acrylate), to yield (2), which then reacts with cupric bromide and eliminates HBr to yield the coupled product (3). A similar addition can occur at the second double bond of the coupling agent and the final product is a star with up to four arms.

TABLE 11

Summary of Coupling Reactions

| Exp.# | Coupling Agent | Base | Mn before | MWD before | Ratio of Chains | Mn after | MWD after |
|---|---|---|---|---|---|---|---|
| 75NB1 | a-Methyl styrene | none | 1329 | 1.1 | 2 | 2965 | 1.32 |
| 76NB1 | m-di-isopropenyl benzene | none | 1329 | 1.1 | 1.9 | 3782 | 1.74 |
| 77NB1 | m-di-isopropenyl benzene | none | 1057 | 1.1 | 4 | 3856 | 1.69 |
| 87NB1 | a-Methyl styrene | Triethylamine | 1270 | 1.17 | 2 | 2448 | 1.44 |
| 88NB1 | m-di-isopropenyl benzene | Triethylamine | 1270 | 1.17 | 4 | 2601 | 2.48 |
| 89NB1 | a-Methyl styrene | Triethylamine | 1270 | 1.17 | 2 | 2457 | 1.42 |
| 90NB1 | m-di-isopropenyl benzene | Triethylamine | 1270 | 1.17 | 2.3 | 2534 | 1.57 |
| 98NB1 | a-Methyl styrene | 2,6-Dt-Bpy | 1060 | 1.13 | 2.4 | 2079 | 1.38 |

The above examples were provided only to illustrate the present invention and are not meant to be limiting. Any appropriately substituted olefin that can undergo the sequence of controlled radical addition, dehydrohalogenation and radical addition to the unsaturation formed by dehydrohalogenation, would be suitable for use in the following examples.

The third technique shown in scheme 6 as route C involves coupling of α-hydroxy-ω-bromo-poly(methyl acrylate) by a coupling agent (CA in scheme 6). This polymer was prepared by initiating methyl acrylate with ethylene glycol mono(2-bromoisobutyrate). The polymerization was terminated at 80% conversion, the crude reaction mixture was exposed to column chromatography with alumina as stationary phase, and the polymer was isolated by precipitation in hexanes. The coupling reaction was performed by measuring the polymer and cuprous bromide in a round-bottomed flask, the flask was sealed and purged with nitrogen. PMDETA, the coupling agent, and benzene were added and the reaction mixture was placed at 60° C. In the case where the coupling agent was α-methylstyrene and the ratio of chains to α-methylstyrene (R) was two, the molecular weight increased from 1330 g/mol to 2960 and the molecular weight distribution increased from 1.10 to 1.32. The degree of functionalization as determined by $^1$H NMR was f=1.8.

If m-diisopropenylbenzene was used as the coupling agent and the ratio of chains to m-diisopropenylbenzene (R) was four, the molecular weight increased from 1060 to 3860 and the molecular weight distribution increased from 1.10 to 1.69. The degree of functionalization as determined by $^1$H NMR was f=2.8. This result indicates that stars are formed if the coupling is performed with m-diisopropenylbenzene. MALDI-TOF-MS was used to tentatively investigate the mechanism.

Example 15

Incorporation of Functional End Groups

A hydroxy containing initiator, ethylene glycol mono(2-bromo isobutyrate) was employed to polymerize methyl acrylate with cuprous bromide/PMDETA catalyst system, p-dimethoxybenzene being present as solvent. Allyl alcohol was added after 80% conversion of monomer to polymer along with differing levels of copper zero and additional solubilizing ligand. The experimental details listed in Table 11 show that under appropriate conditions essentially a "homo"-telechelic α-ω-dihydroxy-polymer was formed within three hours.

TABLE 12

Functionalization with allyl alcohol

| CuBr:Ligand:Cu(0):I | 2*I:Allyl alcohol | Time | f |
|---|---|---|---|
| 0:0:1:9 | 1:15 | 23 | 0.77 |
| 1:1:0.17:1.5 | 1:14 | 3 | 1.37 |
| 1:1:0.17:1.5 | 1:14 | 24 | 1.43 |
| 1:1:0.37:3 | 1:16 | 4.5 | 1.76 |
| 1:1:0.37:3 | 1:16 | 23 | 2 |
| 1:1:1.7:1.8 | 1:13 | 0.5 | 1.3 |
| 1:1:1.7:1.8 | 1:13 | 1 | 1.6 |
| 1:1:1.7:1.8 | 1:13 | 2 | 1.8 |
| 1:1:1.7:1.8 | 1:13 | 3 | 1.9 |

Example 16

Incorporation of Vinyl Acetate

Vinyl acetate from Aldrich was distilled over $CaH_2$ and stored under an argon atmosphere at −15° C. $Fe(OAc)_2$ (97%) was purchased from Strem Chemicals and used without further purification. $CCl_4$ and N,N,N',N'',N''-pentamethyldiethylenetriamine (PMDETA) were from Aldrich, and ethyl acetate (EtOAc) (solvent) was from Fisher. They were all used as received.

Polymerization and Characterization. A dry round bottom flask was charged with $Fe(OAc)_2$. The flask was sealed with a rubber septum and was cycled between vacuum and argon three times to remove the oxygen. Degassed monomer, solvent and amine ligand were added using degassed syringes. The flask was immersed in an oil bath held by a thermostat at the desired temperature. Initiator was then added and timing was started. At timed intervals, samples were withdrawn from the flask using degassed syringes and added to THF. Monomer conversion was determined from the concentration of residual monomer using gas chromatography (GC). Molecular weights and molecular weight distributions were measured using size exclusion chromatography (SEC) using THF as the eluent. Polystyrene standards were used to calibrate SEC columns.

Single-Point Experiments Indicating Controlled Polymerization

A series of polymerizations were carried out under standard ATRP conditions using methyl 2-bromopropionate as the initiator and CuBr complexed by either 2,2'-bipyridine (bpy) or N,N,N',N'',N''-pentamethyldiethylenetriamine (PMDETA) as the catalyst at temperatures ranging from 50 to 110° C.; however, no formation of poly(vinyl acetate) (pVOAc) was observed. The use of other common ATRP initiators or chlorine as the exchanging halogen afforded similar results. The difficulty encountered in the ATRP of VOAc may be mainly attributed to the low equilibrium constant ($K_{eq}$) as defined below.

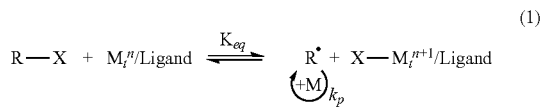

(1)

Other factors include possible side reactions such as the decomposition of the dormant chain ends.

Interestingly, polymers were obtained when $Fe(OAc)_2$ complexed by PMDETA was employed as a catalyst with $CCl_4$ as the initiator. An examination of representative size exclusion chromatography (SEC) traces showed progressive shift towards higher molecular weights with decreasing amount of $CCl_4$ used. Moreover, an almost linear relationship between the experimental molecular weights ($M_{n,SEC}$) and the theoretical values ($M_{n,SEC}$) was obtained. The theoretical values were calculated based on the ratios of consumed monomer to initiator assuming quantitative initiation from $CCl_4$. In addition, polyvinyl acetate made with the $CCl_4$/Fe$(OAc)_2$/PMDETA initiating system ($M_n$=3600 and $M_w/M_n$=1.81) was used as an efficient macroinitiator for the synthesis of block copolymers with n-butyl acrylate (nBA) and styrene (Sty) ($M_n$=24300 and $M_w/M_n$=1.42) using typical ATRP catalytic systems. The signal of the block copolymer shifted cleanly to higher molecular weights ad polydispersity was reduced. Thus, it appeared from these initial exemplary single-point experiments that polymerization of VOAc with the $CCl_4$/Fe$(OAc)_2$/PMDETA initiating system was controlled.

Kinetic Studies Indicating Transfer Dominated Polymerization

Further detailed kinetic studies were carried out to gain better insight into the polymerization. Examination of a semilogarithmic kinetic plot of the polymerization of VOAc which was initiated by $CCl_4$ and promoted by the $Fe(OAc)_2$/PMDETA complex showed that the concentration of the propagating species were approximately constant until the polymerization reached ca. 60% monomer conversion and then polymerization rate dropped abruptly. The molecular weight vs conversion plot shows that polymers with high molecular weights were formed at the early stage of the polymerization and that the experimental molecular weight remained relatively constant throughout the reaction. In addition, polymers with relatively high polydispersities ($M_w/M_n$~1.8 to 2.0) were obtained, independent of conversion.

Effect of Structure of Alkyl Halides and Transition Metal Complexes

Different initiators were also examined and the results are shown in Table 13. With $CCl_4$ as the initiator, the formed pVOAc had experimental molecular weight ($M_{n,SEC}$=7800) close to the theoretical value ($M_{n,SEC}$=6300) which was calculated based on the ratio of consumed monomer to initiator assuming quantitative initiation from $CCl_4$ without any chain transfer. Similar result was obtained using methyl 2,2-dichloroacetate (entry 2) or bromoform (entry 5) as the initiator. However, other initiators either led to pVOAc with too high molecular weight or resulted in the formation of oligomers.

Example 17

Telomerization of Vinylacetate

The results of the experiments designed for the preparation of polyvinyl acetate containing terminal functional groups that are active for ATRP are summarized in Table 14.

TABLE 13

Use of Different Initiators in the Polymerization of VOAc Promoted by Fe(OAc)$_2$/PMDETA complex

| entry[a] | initiator | time (h) | conv (%) | $M_{n, Cal}$[b] | $M_{n,SEC}$ | $M_w/M_n$ |
|---|---|---|---|---|---|---|
| 1 | $CCl_4$ | 0.4 | 63 | 6300 | 7800 | 1.8 |
| 2 | $CHCl_3$ | 1.2 | 41 | 4100 | 11900 | 3.5 |
| 3 | $CH_3OC(O)CHCl_2$ | 0.2 | 46 | 4600 | 4300 | 2.4 |
| 4 | $CH_3OC(O)CH(CH_3)Cl$ | 12.0 | 14 | 1400 | 117700 | 2.2 |
| 5 | $CBr_4$ | 16.2 | <5 | <500 | oligomers | |
| 6 | $CHBr_3$ | 16.2 | 22 | 2200 | 2100 | 2.6 |
| 7 | $CH_3OC(O)CH(CH_3)Br$ | 12.0 | 35 | 3500 | 217800 | 1.9 |
| 8 | $CHI_3$ | 0.4 | <5 | <500 | oligomers | |

[a]Conditions: 50° C.; [VOAc]$_o$ = 10.8 M (bulk); [VOAc]$_o$/[initiator]$_o$ = 117; [initiator]$_o$/[Fe(OAc)$_2$]$_o$/[PMDETA]$_o$ = 1/1/1.
[b]$M_{n,Cal}$ = ([M]$_o$/[In]$_o$) × (MW)$_o$ × conversion, where [M]$_o$ and [In]$_o$ represent the initial concentrations of monomer and initiator, and (MW)$_o$ is the molecular weight of the monomer.

Example 18

Ligand Developments

Materials. Initiators (Aldrich) were used as received. Diethylenetriamine (Aldrich) and 1-(2-aminoethyl)piperazine (Aldrich) were used as received.

Polymerizations. Solids were added to 10 mL round bottomed flask equipped with a stir bar. The flask was evacuated and back filled with nitrogen. Liquids were degassed by 3 freeze-pump-thaw cycles, then added to the reaction flask via syringe. The reaction mixture was heated to the polymerization temperature, then initiator was added via syringe.

Characterization. Conversion was measured using a Shimadzu GC-17A against an internal standard. Molecular weights were measured using a GPC equipped with Waters 717 Plus autosampler, PSS SDV $10^5$, $10^3$, and $10^2$ Å columns, and a Waters 410 RI detector against polystyrene and poly[methyl methacrylate] standards.

Example 18a

Polymerization of t-BA with Cu(I)/PMDETA

The polymerization of MA with Cu(I)/PMDETA initiated with methyl 2-bromopropionate (MBrP), has been shown to be well controlled in earlier applications. However, under the same reaction conditions the polymerization of (t-BA) is not well controlled. Table 15 shows the results of ATRP of (t-BA) using the CuBr/PMDETA catalyst system and MBrP as the initiator.

Reactions initially performed in bulk at 65° C. were fast, reaching high conversion within 20 minutes (Entry 1). By lowering the temperature and increasing the degree of polymerization, the reaction was controlled, however, the final polydispersity was still rather high, $M_w/M_n=1.33$, and the rate of the reaction quite slow (Entry 2). Addition of $CuBr_2$ improved the polydispersity, but it also decreased the rate further. p-Dimethoxybenzene was used as a solvent and although the reaction was well-controlled, the catalyst was not fully soluble and the polydispersities remained higher than 1.2 (Entry 3). More polar solvents, such as acetone or DMF, initially provided a homogeneous catalyst system. The slower rate and lower final polydispersities in these reactions suggest the polar solvents improve the concentration of the deactivator in solution, which in this case is the element necessary to achieve a controlled polymerization.

TABLE 14

Results for ATRP of t-BA using MBr/CuBr/PMDETA

| No. | Solvent | T (° C.) | Time | Conv (%) | $M_n$ | $M_w/M_n$ |
|---|---|---|---|---|---|---|
| 1 | Bulk[a] | 65 | 20 min. | >95 | 2800 | 1.49 |
| 2 | Bulk[b] | RT | 17 hrs. | 77 | 5300 | 1.33 |
| 3 | 20% DMB[c] | 60 | 1.25 hrs. | 95 | 5000 | 1.23 |
| 4 | 25% acetone[c] | 60 | 5 hrs. | 93 | 6000 | 1.11 |
| 5 | 25% DMF[c] | 60 | 4.5 hrs. | 93 | 6500 | 1.10 |

[a]ratio of [tBA]:[MBrP]:[CuBr]:[PMDETA] = 25:1:0.25:0.25
[b]ratio of [tBA]:[MBrP]:[CuBr]:[PMDETA] = 50:1:0.5:0.5
[c]ratio of [tBA]:[MBrP]:[CuBr]:[PMDETA]:[CuBr2] = 50:1:0.5.525:0.025

Example 18b

Polymerization of MA with Cu/DETA

Polymerizations of MA in bulk with Cu(I), Cu(II), DETA, and initiator (Entry 1/Table 13) showed no control of molecular weight. Based on previous results it was anticipated that the addition of a polar solvent would increase the solubility of the catalyst in MA and improved polymerization control. Several reactions were conducted using different solvents and variable dilutions, the results of these experiments are shown in Table 15. As shown in the table, the reaction was quite sensitive to the amount of solvent used, and it appears that a lower concentration (5-10%) of a polar solvent gives the best control of the reaction. As in the case of t-BA with PMDETA, it appears that the addition of a polar solvent increases the concentration of the deactivator in solution to give a more controlled polymerization.

TABLE 15

Results for ATRP of MA using MBrP/CuBr/CuBr2/DETA

| No. | Solvent | Temp (° C.) | Time | Conv (%) | $M_n$ | $M_w/M_n$ |
|---|---|---|---|---|---|---|
| 1 | Bulk[a] | RT | 10 min. | 32 | 13700 | 2.8 |
| 2 | 50% DMF[a] | RT | 31 hrs. | 56 | 11000 | 3.5 |
| 3 | 10% DMF[a] | 90 | 5 hrs. | 57 | 12100 | 2.8 |
| 4 | 5% DMF[b] | 70 | 13 hrs. | 78 | 13880 | 1.2 |
| 5 | 10% ethylene carbonate[b] | 90 | 6.3 hrs. | 71 | 8300 | 2.1 |
| 6 | 50% ethanol[a] | 90 | 24 hrs. | 41 | 6200 | 1.7 |
| 7 | 10% ethanol[b] | 90 | 24 hrs. | 66 | 14800 | 1.3 |

[a]ratio of [MA]:[MBrP]:[CuBr]:[CuBr2]:[DETA] = 230:1:0. 5:0. 5:1
[b]ratio of [MA]:[MBrP]:[CuBr]:[CuBr2]:[DETA] = 230:1:1:0. 1:1.1

The kinetics and molecular weight plots of the reaction labeled above as Entry 4 showed linear first order kinetics and good agreement of molecular weight with the predicted values.

Example 18c

Polymerization of n-BA and MMA using Cu/AEP

Initial experiments on polymerizations of n-BA and MMA in bulk with Cu(I)Br, AEP, and initiator, showed no control of molecular weights, broad molecular weight distributions, and non-linear first order kinetics. The bulk polymerizations of these monomers took place in heterogeneous reaction mixtures due to the limited solubility of the Cu/AEP catalyst system in the monomers. If the understanding of the requirements for preparation of a suitable ligand were correct then the addition of solvent could make this ligand useful in the same way that PMDETA and DETA were made more effective. Several experiments were conducted using different solvents and different amounts of solvent. The results of these experiments are shown in Table 16. These reactions also show that the addition of a polar solvent, in this case DMF or acetone, can increase the level of control of the polymerization. These reactions are very sensitive to the amount of solvent added, and when the optimal amount of solvent was not used the reaction displayed results similar to those seen for reactions in which no solvent was added.

TABLE 16

Results for ATRP of n-BA using MBrP/CuBr/AEP and MMA using ethyl 2-bromoisobuytyrate (EBriB)

| No. | M | Solvent | T (° C.) | Time | Conv (%) | $M_n$ | $M_w/M_n$ |
|---|---|---|---|---|---|---|---|
| 1 | n-BA[a] | bulk | 80 | 40 min | 67 | 14800 | 1.81 |
| 2 | MMA[b] | bulk[b] | 70 | 3.5 hrs | 79 | 20600 | 1.69 |
| 3 | n-BA[a] | 20% DMF | 80 | 3.3 hrs. | 48 | 5000 | 1.75 |
| 4 | n-BA[a] | 10% DMF | 80 | 3 hrs. | 90 | 10300 | 1.51 |
| 5 | n-BA[a] | 5% DMF | 80 | 4 hrs. | 39 | 3750 | 2.06 |
| 6 | MMA[b] | 10% DMF | 80 | 3 hrs. | 94 | 6700 | 1.47 |
| 7 | n-BA[a] | 10% acetone | 80 | 3 hrs. | 99 | 15500 | 2.16 |
| 8 | n-BA[a] | 10% acetone | 50 | 3.6 hrs. | 56 | 4500 | 1.9 |
| 9 | n-BA[a] | 10% acetone | RT | 20 min | 86 | 4000 | 2.6 |
| 10 | n-BA[a] | 50% acetone | 80 | 4 hrs. | 90 | 11100 | 1.67 |

[a]ratio of [n-BA]:[MBrP]:[CuBr]:[AEP] = 78:1:1:1
[b]ratio of [MMA]:[EBriB]:[CuBr]:[AEP] = 100:1:1:1 in 50% diphenyl ether The kinetics and molecular weight plots of two polymerizations of n-BA and MMA show good agreement between measured molecular weight and molecular weight predicted by DP=$[M]_o/[I]_o$, and low polydispersities.

Addition of redox conjugate to suspending media improves the level of control in a biphasic controlled polymerization.

The advent of controlled/"living" radical polymerization techniques, such as atom transfer radical polymerization (ATRP), has improved the ease with which block copolymers can be synthesized, and also expanded the range of monomers that can be incorporated into the block copolymer. Furthermore, it has opened the possibility of synthesizing block copolymers in water-borne systems, where other mechanisms are too sensitive to water to survive.

Example 19

Emulsion Polymerizations with Substituted Bipyridines as Ligands

A series of experiments were run under similar conditions with different substituents present of the ligand to adjust the solubility of the catalyst in the biphasic system. The results are summarized below in Table 17.

TABLE 17

Polymerization of BMA using bpy derivatives as the ligand.[a]

| Ligand | T(° C.) | Time | Conv. | $M_{n,th}$ | $M_{n,sec}$ | $M_w/M_n$ |
|---|---|---|---|---|---|---|
| 1 bpy | 70 | 3.0 h | 100% | 28,400 | 272,000 | 3.27 |
| 2 dThpy | 70 | 2.1 h | 98% | 27,900 | 36,100 | 1.52 |
| 3 | 70[b] | 1.8 h | 93% | 26,500 | 33,800 | 1.39 |
| 4 dNbpy | 90 | 1.3 h | 85% | 24,200 | 32,300 | 1.28 |
| 5 dAbpy[c] | 90 | 1.7 h | 89% | 25,300 | 37,200 | 1.33 |
| 6 | 70 | 1.8 h | 88% | 25,000 | 34,000 | 1.25 |
| 7 | 70[d] | 2.0 h | 90% | 25,600 | 33,000 | 1.18 |
| 8 dHDbpy | 90 | 2.2 h | 83% | 23,580 | 27,750 | 1.21 |

[a]BMA/water = 1.5 ml/10 ml, surfactant Brij 98, 2% vs. water, [EBiB]$_0$:[CuBr]$_0$:[ligand]$_0$ = 1:1:2
[b]with 8% of CuBr$_2$ (vs. Cu total) added
[c]dAbpy: mixture of dNbpy and (1) in 1/1 ratio
[d]with 11% of CuBr$_2$ (vs. Cu total) added The catalyst complexed with dHDbpy solubilizes well in the system. Compared with the results using dNbpy or dAbpy as the ligand under the same condition, the polymerization are slower, both in direct ATRP and reverse ATRP. For direct ATRP of BMA, the initiation efficiency and polydispersity are a little better when using dHDbpy as the ligand, indicating more Cu(II) in the organic phase. For reverse ATRP and the polymerization of BA, the difference in molecular weight control between dHDbpy and dAbpy is not obvious. From the point of view of both polymerization rate and molecular weight control, dNbpy seems better than dHDbpy.

Example 20

Emulsion Polymerization with a Terpyridene Ligand

Use of 4,4',4"-Tris(5-nonyl)-2,2':6',2"-terpyridine (tNtpy), a substituted terpyridine also led to controlled polymerization of BMA. With EBiB as the initiator at 70° C., the monomer conversion reached 84% after 1.7 h. The resultant polymer had $M_n$=37,200 and $M_w/M_n$=1.38. The fast rate of polymerization, as well as the quick change in color of the emulsified mixture from brown to blue, suggests that an even better controlled polymerization may be attained at a lower temperature.

Example 21

Emulsion Polymerizations Using Aliphatic Amines as Ligands

The exemplary emulsion polymerization of butyl acrylate using aliphatic amines as ligands are reported below in Table 18.

TABLE 18

Polymerization of BMA using aliphatic amines as the ligand.[a]

| Ligand | T(° C.) | Time | Conv. | $M_{n,th}$ | $M_{n,sec}$ | $M_w/M_n$ |
|---|---|---|---|---|---|---|
| 1 PMDETA | 70 | 3.0 h | 100% | 28,400 | 380,000 | 6.7 |
| 2 Me$_6$TREN | 70 | 3.0 h | 100% | 28,400 | 9,800,000 | 3.8 |
| 3 Me$_6$TREN | 20[b] | 1.3 h | 73% | 20,800 | 928,700 | 2.2 |

[a]BMA/water = 1.5 ml/10 ml, surfactant Brij 98, 5% vs. water, [EBiB]$_0$:[CuBr]$_0$:[ligand]$_0$ = 1:1:1
[b]Brij 98, 3% vs. water.

Example 22

Use an ATRP Initiator in a "Reverse" ATRP Polymerization

Table 19 displays the results of an experiment wherein an initiator for a normal forward ATRP polymerization is added to the monomer in a "reverse" ATRP emulsion polymerization. The overall control of the emulsion polymerization is improved.

TABLE 19

Reverse ATRP in the presence of EBiB as added ATRP type initiator.
BMA/H$_2$O = 1.5/10 ml, T = 90° C., Brij 98 = 0.2 g

| Exp. | DP$_{th}$ | EBiB/V-50/CuBr$_2$/dNbpy | Time | Conv. | M$_{n,th}$ | M$_{n,sec}$* | M$_w$/M$_n$* | f |
|---|---|---|---|---|---|---|---|---|
| BMA-162 | 100 | 1/0.5/1/2 | 4.7 h | 92% | 13 080 | 23 220 | 1.28 | 0.56 |
| BMA-163 | 100 | 1/0.5/1.8/3.5 | 20 h | 23% | / | / | / | / |
| BMA-164 | 145 | 1/0.2/1/2 | 5.2 h | 0% | / | / | / | / |

*Measured by precipitation in methanol

Under appropriate conditions, the initiation efficiency was improved from 0.2-0.3 for pure reverse ATRP to ~0.6 in the presence of EBiB. The particle size determined for the emulsion was similar to that of the "reverse" ATRP polymerization.

Example 23

Block Copolymers

Here we report conditions tailored for the synthesis of block copolymers by ATRP in two distinct methods. Firstly, water-borne block copolymers are synthesized, and secondly, acrylate-methacrylate di- and tri-block copolymers are made in a one-pot synthesis.

General Methods and Equipment

Monomers (styrene (STY), n-butyl acrylate (BA), methyl methacrylate (MMA), n-butyl methacrylate (BMA)) were run through a column of alumina, distilled under vacuum and then stored at −4° C. under N$_2$. Immediately before use they were purged with N$_2$ for at least 30 mins. CuBr was purified, and the ligands (dAbpy, BPMODA) were synthesized, as reported earlier. The ligands hexamethyltriethylenetetramine (HMTETA), pentamethyldiethylenetriamine (PMDETA) were obtained from Aldrich and used as received. Methyl 2-bromopropionate (MeBrP), ethyl 2-bromoisobutyrate (Et-2BriB) and hexadecane (HEX) were obtained from Fisher and used as received. Monomer conversions were measured by GC on either a Shimadzu GC14 or 17A, relative to an internal standard. Molecular weights were measured on a GPC system consisting of a Waters 515 pump, Waters 717plus Autoinjector, PSS 10$^5$, 10$^3$, 10$^2$ ? columns and a Waters 410 RI detector, and calibrated with either polystyrene or poly(methyl methacrylate) standards. $^1$H NMR spectra were collected on a Bruker AM 300 MHz spectrometer in CDCl$_3$.

Example 23a

Water-Borne Block Copolymers: Pre-Synthesized Macroinitiator

A poly(n-butyl acrylate) (PBA) macroinitiator was synthesized by the ATRP of BA, CuBr, MeBrP and PMDETA in a mole ratio of 100/1/0.2/0.2 at 60° C. for 2 hours. After dissolving in THF, the catalyst was removed by filtration through alumina, and the excess monomer removed by evaporation. The number average molecular weight (M$_n$) was 9600 and polydispersity (M$_w$/M$_n$) was 1.2. Between 0.5-1.0 g of PBA was transferred into a round-bottom flask along with half of the required surfactant (Brij98 or Tween20), and dissolved in approximately half of the appropriate monomer (purged with N$_2$ for at least 30 mins.). CuBr, ligand (either dApy or BPMODA), and surfactant was added to a Schlenk flask and degassed with 3 vacuum/N$_2$ cycles. The other half of the monomer was then added to the Schlenk under N$_2$, and the catalyst/surfactant dissolved. Water (deionized, purged with N$_2$ for at least 30 mins.) was then added evenly to both the PBA and catalyst solutions, and each stirred vigorously for approximately 30-60 mins. The PBA solution was then cannulated into the Schlenk flask. Samples were withdrawn at regular periods by a N$_2$-washed stainless steel syringe. It was noticed that if the Schlenk (or a round-bottom flask) was sealed with a rubber septum that it was often soaked in monomer by the end of the reaction. Therefore, all reactions reported here were performed in an all glass reactor.

An examination of the development of the molecular weight distribution of a PBA-initiated water-borne ATRP of styrene with the Brij98 surfactant shows a peak at ~1500 from the surfactant, and the macroinitiator peak shows a small, high molecular weight peak. This later peak is most likely due to a small amount of polymerization that occurs at the beginning of the reaction before enough Cu$^{II}$ deactivator has been accumulated to ensure good control. The polymer increases in molecular weight and the molecular weight distribution remains narrow throughout the polymerization. However, the polymerization mixture contained a styrene phase at the meniscus that slowly disappeared during the reaction, although the stability of the resulting 'emulsion' was also good.

Example 23b

Acrylate/Methacrylate Block Copolymers:
Sequential Addition of Monomer

CuBr was weighed into a Schlenk flask equipped with a magnetic stirring bar and degassed with 3 vacuum/N$_2$ cycles. n-BA (9 mL, purged with N$_2$ for 30 mins) and PMDETA were added and the solution placed in an oil bath and stirred to dissolve the catalyst. The solutions were light green in color and homogeneous to the eye. The initiator (either MeBrP or dimethyl 2,6-dibromoheptanedioate (DMDBHD)) was added to 1 mL of monomer which was then stirred and cannulated into the monomer/catalyst solution. After the desired time, a second MMA/CuCl/HMTETA solution was made up. This was also homogeneous, and was cannulated into the Schlenk flask. The solution quickly became less viscous, but then progressively became more viscous within 30 mins. of this second monomer addition. After a second time period of polymerization, THF was introduced into the flask to dissolve the polymer. Samples had the catalyst removed from them by filtration through alumina and precipitated into methanol/water mixtures.

An examination of the molecular weight distributions from two different experiments, one the synthesis of a diblock copolymer of PBA-b-PMMA, and the other of a tri-block copolymer PMMA-b-PBA-b-PMMA is informative. In each case, the PBA was grown first (with monofunctional and difunctional initiators respectively), then the MMA, with CuCl/HMTETA dissolved in it, was added to the PBA. The molecular weight increased, and there is no sign of terminated polymer that would correspond to 'dead' macroinitiator. The number average molecular weights, polydispersities and monomer conversions are given in Table 20. In each case the conversion of BA and then of MMA reached approximately 90%, and the polydispersities remained low (~1.20-1.25). These experiments show that ATRP can be applied to the synthesis of block copolymers without the need to isolate macroinitiators, even when there are several factors, such as cross-propagation rates, that may effect the success of the block copolymerization.

TABLE 20

Kinetic and Molecular Weight Data.

| Sample | Time (hrs) | % Conversion n-Ba | % Conversion MMA | $M_n$ | $M_w/M_n$ |
|---|---|---|---|---|---|
| PBA-Br | 2 | 91 | 0 | 9,700 | 1.25 |
| PBA-b-PMMA | 5 | 96 | 88 | 21,300 | 1.26 |
| Br-PBA-Br | 16.5 | 88 | 0 | 67,500 | 1.16 |
| PMMA-b-PBA-b-PMMA | 18.5 | 93 | 76 | 91,300 | 1.20 |

These experiments demonstrate that ATRP is a very versatile method for synthesizing block copolymers, specifically being able to produce block copolymers with free radically copolymerizable monomers. This applies to both within water-borne polymerizations and through sequential monomer additions in bulk polymerizations.

Example 24

Emulsion Polymerization Using Picolyl Amines as Ligands

Butyl acrylate was polymerized under standard conditions using picolyl amines as ligands. The results are presented in Table 21.

TABLE 21

Polymerization of BMA using picolyl amines as the ligand.[a]

| Ligand | T(° C.) | Time | Conv. | $M_{n,th}$ | $M_{n,sec}$ | $M_w/M_n$ |
|---|---|---|---|---|---|---|
| 1 BPMOA | 70 | 2.5 h | 94% | 26,700 | 48,300 | 1.97 |
| 2 BPMODA | 70 | 2.0 h | 96% | 27,300 | 43,100 | 1.78 |

[a]BMA/water = 1.5 ml/10 ml, surfactant Brij 98, 2% vs. water, [EBiB]$_0$:[CuBr]$_0$:[ligand]$_0$ = 1:1:1

Example 25

Use of a Less Active Monomer in Emulsion Polymerization Using Picolyl Amines as Ligands The two ligands were examined for the polymerization of a less active monomer, butyl acrylate, the control was improved because of the smaller equilibrium constants. The results are presented in table 22.

TABLE 22

Polymerization of BA using picolyl amines as the ligand.[a]

| Ligand | T(°C.) | Time | Conv. | $M_{n,th}$ | $M_{n,sec}$ | $M_w/M_n$ |
|---|---|---|---|---|---|---|
| 1 BPMOA | 90[b] | 3.0 h | 81% | 20,700 | 21,500 | 1.11 |
| 2 | 70 | 8.3 h | 81% | 20,700 | 31,900 | 1.64 |
| BPMODA | 90 | 3.0 h | 93% | 23,800 | 28,800 | 1.24 |
| 4 | 70 | 17 h | 93% | 23,800 | 27,100 | 1.20 |

[a]Unless noted, BA/water = 1.5 mL/10 ml, surfactant Brij 98, 2% vs. water, [EBiB]$_0$:[CuBr]$_0$:[ligand]$_0$ = 1:1:1
[b]Bulk polymerization. [EBiB]$_0$:[CuBr]$_0$:[ligand]$_0$ = 1:1:1

Potentially the partitioning constants of the Cu(II) complexes may also play a role. BPMOA, although excellent in bulk polymerization of butyl acrylate (entry 1), still resulted polymers with polydispersities higher than 1.5 in water-borne system. This indicated a poor solubility of the deactivator in the organic phase. Having a longer hydrophobic chain, BPMODA greatly enhances the organic solubility of Cu(II) species. As a consequence, the polymerization of butyl acrylate using BPMODA as the ligand was well controlled, as evidenced by a linear increase of molecular weight with monomer conversion, as well as polydispersities less than 1.3 throughout the polymerization.

Example 26

ATRP of Styrene, MA and MMA Catalyzed by Cu(I) Complexed by Pyridine-Imine Ligands The results of the extension of pyridine-imine ligands to the ATRP polymerization of styrene and methyl acrylate are reported below in table 23, and compared to the results on the polymerization of methyl methacrylate.

TABLE 23

ATRP of Styrene, MA and MMA Catalyzed by Cu(I) Complexed by OPMI or PMOI

| Ligand | Monomer | Temp (° C.) | Time (h) | Conv (%) | $M_n$, Cal | $M_n$, SEC | $M_w/M_n$ |
|---|---|---|---|---|---|---|---|
| OPMI | styrene[a] | 110 | 15.0 | 92 | 9200 | 10400 | 1.34 |
| OPMI | MA[b] | 90 | 15.0 | 84 | 16800 | 14700 | 1.23 |
| OPMI | MMA[c] | 90 | 3.50 | 53 | 10600 | 15800 | 1.33 |
| PMOI | styrene[a] | 90 | 1.05 | 75 | 7500 | 11500 | 1.33 |
| PMOI | MA[b] | 110 | 0.50 | 58 | 11600 | 12100 | 2.03 |
| PMOI | MMA[d] | 90 | 0.50 | 62 | 12400 | 15100 | 1.50 |

[a]bulk; [styrene]$_0$/[ligand]$_0$ = 96; [PEBr]$_0$/[CuBr]$_0$/[ligand]$_0$ = 1/1/2.
[b]bulk; [MA]$_0$/[EBP] = 232; [EBP]$_0$/[CuBr]$_0$/[ligand]$_0$ = 1/1/2.
[c]50 vol % in anisole; [MMA]$_0$/[EBiB]$_0$ = 200; [EBiB]$_0$/[CuCl]$_0$/[ligand]$_0$ = 1/1/2.
[d]50 vol % in anisole; [MMA]$_0$/[EBiB]$_0$ = 200; [EBiB]$_0$/[CuBr]$_0$/[ligand]$_0$ = 1/1/2.

Example 27

Polymerization Using Tridentate Pyridine-Imine Based Ligands

Two tridentate ligands containing the pyridine-imine moiety, N-(2-pyridylmethyl)-(2-pyridyl)methanimine (PMPMI) and N-(2-N-(dimethyl)ethyl)-(2-pyridyl)methanimine (DMEPMI), were synthesized by the condensation reactions using bidentate primary amines with 2-pyridinecarboxaldehyde. Complexes of copper(I) and tridentate nitrogen ligands generally show a different conformation (e.g., squarer pyramidal) than the tetrahedral conformation found in most complexes of copper(I) and bidentate nitrogen ligands. As a result, a ligand to metal ratio of 1 is sufficient to achieve the maximum rate of polymerization. Table 24, displays the results of the ATRP using the two tridentate ligands. With PMPMI as the ligand, well-controlled polymerizations were obtained for both styrene and MA; however, high polydispersity was observed for MMA. When DMEPMI was used as the ligand, well-controlled polymerization was again obtained for styrene, with a slight increase of polydispersity for MA and a decrease of polydispersity for MMA.

TABLE 24

ATRP of Styrene, MA and MMA Catalyzed by Cu(I) Complexed by PMPMI or DMEPMI

| Ligand | Monomer | Temp (° C.) | Time (h) | Conv (%) | $M_n$, Cal | $M_n$, SEC | $M_w/M_n$ |
|---|---|---|---|---|---|---|---|
| PMPMI | styrene[a] | 110 | 1.5 | 60 | 6000 | 8100 | 1.14 |
| PMPMI | MA[b] | 0 | 2.0 | 57 | 11400 | 12300 | 1.06 |
| PMPMI | MMA[c] | 90 | 1.5 | 40 | 8000 | 17700 | 2.77 |
| DMEPMI | styrene[a] | 90 | 3.2 | 61 | 6100 | 7200 | 1.17 |
| DMEPMI | MA[b] | 110 | 5.2 | 47 | 9500 | 15000 | 1.37 |
| DMEPMI | MMA[c] | 90 | 1.0 | 29 | 5800 | 10500 | 1.67 |

[a]bulk; [styrene]$_0$/[PEBr]$_0$ = 96; [PEBr]$_0$/[CuBr]$_0$/[ligand]$_0$ = 1/1/1.

[b]bulk; [MA]$_0$/[EBP]$_0$ = 232; [EBP]$_0$/[CuBr]$_0$/[ligand]$_0$ = 1/1/1.

[c]50 vol % in anisole; [MMA]$_0$/[EBiB]$_0$ = 200; [EBiB]$_0$/[CuCl]$_0$/[ligand]0 = 1/1/1.

The kinetic plots for the polymerization of styrene and MA using PMPMI as the ligand were drafted and linear plots of $\ln([M]_o/[M]_t)$ vs time was observed for both monomers indicating the constant concentration of the growing radicals. Molecular weights showed a linear increase along with conversion, and the measured molecular'weights were close to the calculated values for MA. The polydispersities of the resulting polymers remained quite low throughout the polymerization ($M_w/M_n$ ~1.1-1.2), indicative of a fast exchange between the active sites and the dormant species.

Example 28

Controlled Polymerizations Using Supported Ligands

The initial series of experiments were conducted using "standard" ATRP polymerization conditions. The results are reported in Table 19 for polymer supported s-TERN as ligand

TABLE 25

Results of Polymerization Using Polymer-Supported Tris(2 aminoethyl)amine (s-TREN) with Ethyl 2-Bromopropionate as Initiator.

| M | [M]$_0$/[I]$_0$/ [CuBr]$_0$/[L]$_0$ | Te [° C.] | Time [min] | Conv. [%] | $M_n$ [$10^3$] | $M_{n,th}$ [$10^3$] | $M_w/M_n$ |
|---|---|---|---|---|---|---|---|
| MA | 200/1/1/1[a] | 90 | 90 | 60 | 11.7 | 10.5 | 3.14 |
| MA | 200/1/1/1[a] | 90 | 220 | 76 | 7.48 | 13.8 | 3.28 |
| St | 100/1/1/1[a] | 110 | 220 | 55 | 5.95 | 5.49 | 12.2 |
| MMA[b] | 200/1/1/1[c] | 90 | 120 | 29 | 3.82 | 5.76 | 19.6 |

[a][M]$_0$/[I]/[CuBr]$_0$/[L]$_0$ = [monomer]$_0$/[methyl 2-bromopropionate]$_0$/[CuBr]$_0$/[s-TREN]$_0$

[b]50 vol.-% anisole solution

[c][M]$_0$/[I]$_0$/[CuBr]$_0$/[L]$_0$ = [MMA]$_0$/[2-bromopropionitrile]$_0$/[CuBr]$_0$/[s-TREN]$_0$

Example 28a

Tailored Polymer Supported Ligands

N,N-Bis(2-pyridylmethyl)-2-hydroxyethylamine (HO-BPMEA) was immobilized on commercially available Merrifield resin containing benzyl chloride functional group, which is used widely for peptide synthesis and combinatorial synthesis of small organic molecules Methyl acrylate (MA) was chosen for study since HO-BPMEA provided one of the best-controlled solution polymerizations of MA. In the first experiment, a bimodal molecular weight distribution was observed by SEC. The reason for the bimodal molecular weight distribution was not immediately clear, but it is likely that the initial growing radicals cannot easily access the deactivator and thus polymerize in uncontrolled manner with normal free radical termination reactions occurring (high molecular peak). After generation of enough amounts of deactivator by termination, a fully controlled polymerization then proceeds (low molecular peak).

Example 28b

Addition of Redox Conjugate

Varying levels of CuBr$_2$ were added to the polymerization and the results are presented in Table 26.

TABLE 26

Results of polymerization using supported s-BPMEA ligand carried out under different conditions

| No. | M | $[M]_0/[I]_0/[CuBr]_0/[CuBr_2]_0/[L]_0$ | Temp [°C.] | Time [min] | Conv. [%] | $M_n$ $[10^3]$ | $M_n$ (th.) $[10^3]$ | $M_w/M_n$ |
|---|---|---|---|---|---|---|---|---|
| 1 | MA | 230/1/1/0/1$^c$ | 22 | 180 | 32 | 10.2 | 6.4 | 57.4$^d$ |
| 2$^a$ | MA | 230/1/0.75/0.25/1$^c$ | 90 | 60 | 50 | 40.8 | 10.6 | 2.68 |
| 3$^a$ | MA | 230/1/0.50/0.50/1$^c$ | 90 | 180 | 62 | 36.7 | 12.5 | 1.90 |
| 4$^b$ | MA | 230/1/0.25/0.75/1$^c$ | 90 | 930 | 67 | 26.7 | 13.4 | 1.62 |
| 6$^a$ | MMA$^e$ | 203/1/0.50/0.50/1$^f$ | 90 | 900 | 68 | 23.9 | 13.7 | 1.92 |
| 7$^a$ | St | 192/1/0.50/0.50/1$^c$ | 90 | 900 | 66 | 30.0 | 13.1 | 2.14 |

$^a$Reaction was stirred at 22° C. for 3 hours before heating
$^b$Reaction was stirred at 22° C. for 40 min before heating
$^c[M]_0/[I]_0/[CuBr]_0/[CuBr_2]_0/[L]_0 = [monomer]_0/[2\text{-bromopropionate}]_0/[CuBr]_0/[CuBr_2]_0/[\text{s-BPMEA}]_0$
$^d$Bimodal distribution
$^e$50 vol.-% anisole solution
$^f[M]_0/[I]_0/[CuBr_0/[CuBr_2]_0/[L]_0 = [monomer]_0/[2\text{-bromopropionitrile}]_0/[CuBr]_0/[CuBr_2]_0/[\text{s-BPMEA}]_0$ The following examples are provided only to illustrate the present invention and are not meant to be limiting.

Example 29

Synthesis and Functionalization of Poly(Methyl Acrylate) (pMA) Star with 1,2-Epoxy,5-Hexene The synthesis of a star polymer with epoxy groups at the terminus of each arm was conducted by the ATRP of MA from a trifunctional initiator, followed by ATRA of the polymer to a functional alkene. Poly(methyl acrylate) stars prepared from ATRP were purified by passing the polymer solution through alumina before use in ATRA reactions. The synthesis of the pMA star was performed by using a Cu(I)Br/PMDETA catalyst, and 1,1,1-tris(2-bromoisobutyryloxy) phenyl ethane as the initiator. The polymerization was stopped at 70% monomer conversion to insure retention of alkyl halide chain end functionality. Molar masses of the star polymers was determined by SEC, using linear PS standards ($M_n$=7,390; $M_w/M_n$=1.08). Functionalization of pMA stars by ATRA reactions was done using a Cu(I)Br/dTbpy catalyst. The functionalization reaction was monitored by $^1$H NMR analysis, where the disappearance of end-group methine protons (m, 1H, δ=4.2 ppm) and the formation of glycidyl protons (s, 3H, δ=2.9, 2.7, 2.5) suggested efficient formation of epoxy-functionalized star polymers.

Example 30

Synthesis and Functionalization of Hyperbranched Polymers

Hyperbranched polymers were prepared by the ATRP of 2-(2-bromopropionyloxy)ethyl acrylate (BPEA), using a Cu(I)Br/dTbpy catalyst. Using both SEC and $^1$H NMR analysis, the polymer was estimated to be highly branched, possessing a high degree of alkyl halide functionality. Residual catalyst was then removed from the polymer by dissolution of the polymer in THF, followed by filtration through alumina. ATRA of 1,2-epoxy,5-hexene was then conducted with purified pBPEA, using additional Cu(I)Br/dTbpy as the catalyst. From this reaction, hyperbranched pBPEA with epoxy groups at the periphery of the polymer was obtained. The ATRA functionalization reaction was monitored by $^1$H NMR, where the disappearance of methyl protons adjacent to a bromine (d, 3H, δ=1.8 ppm) was observed, along with the formation of glycidyl proton resonances (s, 3H, δ=2.9, 2.7, 2.5). From the $^1$H NMR analysis, high conversions (p≧0.90) of alkyl halide end-groups to epoxy groups were observed. Other resonances observed at δ=1.4-2.2 were assigned to aliphatic protons from the alkene formed after radical addition to the polymer.

The "arm first" technique involved the preparation of macroinitiators with living chain ends, followed by microgel formation using multifunctional linkers or divinyl reagents. Poly (t-butyl acrylate) (PtBA) star polymers were prepared by this technique. First, well-defined PtBA was prepared using methyl 2-bromopropionate as the initiator and CuBr/PMDETA as the catalyst in 25% acetone at 60° C. The isolated PtBA ($M_n$=6,900, $M_w/M_n$=1.18) along with divinyl reagents, such as divinylbenzene (DVB), were reacted to form multi-armed stars, by ATRP. This technique was extended towards the preparation of functional star polymers, with functionality at the terminus of each arm. A variety of functional initiators can be used in ATRP due to the wide tolerance of functional groups inherent to radical processes. For example, PtBA with epoxy α-end functional groups was synthesized using 1,2-epoxypropyl 2-bromopropionate as the initiator. The molar mass of the macroinitiator was determined by SEC ($M_n$=5,600, $M_w/M_n$=1.30). The molar mass was also determined from $^1$H NMR by integrating the resonances of side chain over the resonances from terminal functional groups at the end of each arm. The molecular weights estimated by $^1$H NMR ($M_n$=6,300) agreed with values measured by SEC. This suggested that the functionalities were retained during the polymerization. The ATRP of the epoxy functional PtBA macroinitiator with DVB afforded functional star polymers with epoxy groups at the end of each arm. For these reactions, the efficiency of the star synthesis by ATRP was not affected by the presence of functional groups from the initiator.

Example 31

Formation of Functional Poly(t-Butyl Acrylate) Star Polymers t-Butyl acrylate (tBA) was washed with 5% NaOH aqueous solution to remove the acid and then washed with $H_2O$ until the aqueous phase was neutral. The solution was dried over $CaCl_2$, filtered, and then distilled under reduced pressure. The monomer was stored at −20° C. under argon prior to use CuBr was purified according to the published procedure set forth U.S. Pat. No. 5,763,548. Other reagents were all commercial products and used without further purification.

Example 31a

Kinetic Studies of the ATRP of tBA

A dry round-bottom flask was charged with CuBr (19.6 mg, 0.137 mmol), N,N,N',N'',N''-pentamethyldiethylenetriamine (PMDETA) (28.5 µL, 0.137 mmol), tBA (2 ml, 13.7 mmol), anisole (0.5 mL), and a magnetic stir bar. The flask was sealed with a rubber septum, and degassed by three freeze-pump-thaw cycles. The flask was then immersed in an oil bath with the thermostat set at 60° C., and methyl 2-bromopropionate (MBP) (30.4 mL, 0.272 mmol) was added slowly. At timed intervals, aliquots of the reaction solution were withdrawn via syringes fitted with stainless steel needles, and were dissolved in THF to measure conversion (GC) and molecular weight (SEC).

Synthesis of tBA Macroinitiators. PtBA macroinitiators were prepared in 25 vol % p-dimethoxybenzene (DMB) solution at 60° C. using the above mentioned procedure. The reaction mixture were dissolved in acetone after the polymerization, and were precipitated in 50 vol % methanol/$H_2O$ after passing through an alumina column to remove the copper complexes. The samples were redissolved in ethyl ether and then concentrated using a rotary evaporator, followed by drying under vacuum at room temperature for 2 days

Example 31b

Synthesis of Star Polymers Using Macroinitiators

In a typical experiment, a dry glass tube was charged with CuBr (4.2 mg, 29.3 µmol), PMDETA (6.1 µL, 29.2 [mol), PtBA macroinitiator (0.2 g, 29.0 µmol), DVB (62.0 µL, 0.435 mmol), anisole (0.5 mL) and a magnetic stir bar. The glass tube was degassed by three freeze-pump-thaw cycles and sealed under vacuum. The glass tube was immersed in an oil bath with the thermostat set at 110° C. After 5 h, the glass tube was taken out and broken. The sample was dissolved in THF to measure conversion (GC) and molecular weight (SEC).

Characterization. Monomer conversions were determined from the concentration of the residual monomer on a Shimadzu GC-14 gas chromatograph equipped with a J&W Scientific 30 m DB-WAX column and a flame ionization detector with helium as the carrier gas. Molecular weights and molecular weight distributions were measured on PSS SDV columns (Guard, $10^5$, $10^3$, and $10^2$) coupled with a Waters 410 differential refractometer using THF as the eluent. PSS GPC scientific software version 4.02 was used to analyze the data. $^1$H NMR was performed on a Brucker WP300 instrument using $CDCl_3$ as the solvent.

ATRP of tBA. tBA was polymerized according to procedures disclosed in earlier applications using CuBr complexed by N,N,N',N'',N''-pentamethyldiethylenetriamine (PMDETA) as the catalyst and methyl 2-bromopropionate (MBP) as the initiator. Under typical reaction conditions, a linear semilogarithm plot of monomer conversion vs time was observed indicating a constant number of propagating chains. The molecular weights ($M_n$) of PtBA increased linearly with the conversion and agreed well with the predicted values assuming that each initiator molecular produced one polymer chain. SEC traces of the obtained polymers displayed narrow monomodal molecular weight distribution ($M_w/N_n$) which decreased with the monomer conversion. These observations suggested that the polymerization was a controlled process. The Br ω-functionality of thus prepared PtBA as isolated macroinitiators was assessed by chain extension using a fresh batch of tBA monomer or cross propagation to styrene (St) to form block copolymers. Examination of the overlaid SEC traces of the PtBA macroinitiator, the resulting PtBA-b-PtBA polymer after chain extension to a new batch of tBA, and the PtBA-b-PSt block copolymer displayed a clean shift of the SEC traces towards higher molecular weights indicated that most of the PtBA macroinitiator chain ends had reactive Br functional groups.

Effect of the coupling reagent. Three commercially available divinyl coupling reagents, divinylbenzene (DVB), 1,4-butanediol diacrylate (BDDA), and ethylene glycol dimethacrylate (EGDMA), were reacted with the PtBA macroinitiator ($M_{n,SEC}$=6900, $M_w/M_n$=1.18) using CuBr/PMDETA as the catalyst in anisole at 110° C. DVB, BDDA and EGDMA were chosen as the coupling reagents due to their structural resemblance to styrene, acrylate and methacrylate, the three common monomers used in ATRP. Under the reaction conditions, EGDMA led to a complete gelation of reaction mixture within 1.5 h while BDDA and DVB led to no significant gelation after 20 h. When BDDA was used as the coupling reagent, the reaction medium turned viscous quickly but remained fluid. The SEC trace showed that BDDA led to significant star-star coupling and afforded star polymers with high molecular weights and broad molecular weight distributions. In contrast, DVB led to the formation of star polymers with narrow molecular weight distributions. Approximately 5% of high order star polymer was formed after 20 h as estimated using the SEC analysis software. These results were consistent with the previous studies on the PSt star polymer formation under similar conditions.

Effect of DVB to macroinitiator ratio. The formation of star PtBA using DVB as the coupling reagent was studied in more detail with varying ratios of DVB to PtBA macroinitiator. The molecular weights of star polymers increased with an increasing ratio of DVB to PtBA. The ratio of DVB/PtBA of 15 was found to be optimal, leading to a high yield (i.e., high conversion of the macroinitiator) of star polymer without significantly broadening the molecular weight distribution. The yield of star polymer was estimated from the ratio of SEC peak integration of the star polymer and the macroinitiator using the function provided by the SEC analysis software. Lower ratios of DVB to PtBA afforded star polymers with lower yields. For example, DVB/PtBA ratios of 5 or 10 resulted in yields of 82% and 86%, respectively. A higher DVB/PtBA ratio of 20 led to a significantly broader molecular weight distributions of star polymers without significant improvement of the yield.

The molecular weights of the star polymer were estimated form polystyrene-calibrated SEC with an RI detector. These were apparent molecular weights since the hydrodynamic volumes of PtBA star polymers were obviously different from that of linear polystyrene. The absolute molecular weights determined by triple detection SEC were significant different from the RI detection SEC. For example, for the PtBA star polymer prepared with a DVB to PtBA ratio of 15, measurement by single detection SEC afforded $M_n$=53600 and $M_w/M_n$=1.71.

Effect of $CuBr_2$ and exchange halogen. Other factors pertinent to the polymerization were adjusted in an attempt to further improve the yield of star polymer formation. Additional $CuBr_2$ (20% of total Cu) was added in the hope that radical coupling reaction would be further suppressed in the presence of excess Cu(II) deactivator. However, SEC analysis of the resulting polymer showed that the yield was not improved. The use of CuCl/PMDETA as the catalyst was studied. It was reported previously that halide exchange reaction using macroinitiators with Br end groups in the presence CuCl/ligand led to an improved macroinitiator initiation in comparison with the propagation of the second monomer during the block copolymer formation. This would favor the cross propagation to form the short DVB block, and disfavor the addition of polymeric radical terminal to DVB block on another polymer chain (cross link to form microgel star core) since C—Br bonds were broken during the cross propagation and mainly C—Cl bonds were cleaved during the cross linking. Indeed, when CuCl was used in place of CuBr, PtBA star polymers with similar molecular weights and molecular weight distributions were obtained. The yield of the star formation was further improved to 95% in comparison with 90% in the case of CuBr.

Effect of reaction time. Using a ratio of DVB/PtBA/CuCl/PMDETA=15/1/1/1, the kinetics of star formation was studied. The conversion of DVB was measured by GC. Reaction time of 5 h seemed to be optimal for the star formation. Longer reaction time led to star-star coupling which was evident from the presence of high molecular weight shoulder in the SEC traces for the reaction time of 7.5 h and 20 h. The semilogarithm plot of DVB conversion vs. time displayed first order kinetics with respect to DVB until the reaction time of 5 h, and then the conversion leveled off which was consistent with the SEC data. This suggested that during the first 5 h of the reaction there were active macroinitiator chain ends and sterically accessible star cores in the reaction solution that continued to add to the DVB molecules in solution and to the dangling vinyl groups on the DVB block on other polymer chains. After 5 h, uncross-linked macroinitiator chains were nearly depleted, and the star core became sterically congested. As a result, the consumption of DVB and the addition of polymeric radical to star core progressively slowed down. The star formation process was also followed by $^1$H NMR. The methoxy protons ($H_a$) and the proton ($H_b$) adjacent to Br group on the last tBA unit were clearly visible. During the star formation, the signal from $H_b$ decreased with the reaction time and eventually disappeared indicating that all the macroinitiator chain extended to form block copolymers with DVB. The dangling vinyl protons ($H_c$) and phenyl protons ($H_d$) on the DVB units showed an initial increase in intensities but decreased with the reaction time, and had significantly lower intensities than those estimated from DVB conversion. These results were consistent with the formation of a star-shaped polymer with mobile PtBA arms and a DVB microgel core. The star core formed initially were loose and had some degree of intramolecular mobility. The star core hardened as cross linking progressed. The loss of intramolecular mobility eventually caused the $^1$H NMR signals of the microgel core to be too broad to be detected.

Effect of solvent. Reactions were carried out in various solvents to study the effect of the solvent on the star formation process. After the same amount of reaction time (5 h), star polymers formed in benzene showed significantly higher molecular weight and broader molecular weight distribution than those carried out in polar solvents. This result was further supported by relatively high conversion of DVB compared to other systems and high degree of cross linking indicated by the formation of some insoluble star polymers (gels). These observations were attributed to the relatively poor solubility of Cu(II) complex in benzene. The low concentration of Cu(II) complex led to higher concentration of radicals and higher degree of radical determination reactions. Polar solvents, such as 1,2-dichlorobenzene and ethyl acetate, provided star polymers with similar molecular weights distributions and DVB conversions as in the case of anisole. 2-Butone as a solvent afforded star polymers with slightly lower molecular weight and DVB conversion, probably due to the good solubility of Cu(II) complexes and/or relatively low solubility of polystyrene units in this solvent.

Example 31c

End Functional PtBA Stars

A variety of functional initiators were used directly during the macroinitiator synthesis due to the tolerance of ATRP process to different functional groups. For example, 1,2-epoxypropyl 2-bromopropionate was used to prepare PtBA macroinitiator with an epoxy α-functional and a bromine ω-functional end. The isolated macroinitiator has $M_{n,SEC}$=5,600 and $M_w/M_n$=1.22 by SEC. Alternatively, the molecular weight was determined using $^1$H NMR by comparing the integration of the protons on the side chains with that of protons adjacent to the α- or ω-functional group. The consistence of molecular weight obtained by NMR ($M_{n,NMR}$=6,300) with that by SEC suggested high functionality of the PtBA macroinitiator on both polymer chain ends. When this functional macroinitiator was reacted with DVB, end functional star polymers with epoxy end functional groups were obtained. The yield of the star polymer using the epoxy functional macroinitiator was similar to that of non-functional PtBA which suggested that star formation under ATRP conditions was not effected by the presence of functional groups. $^1$H NMR spectrum of epoxy functional star polymer showed the presence of the epoxy group as well as the disappearance of signals from the proton adjacent to Br group on the last tBA unit ($H_f$). Again, signals from DVB microgel core and the dangling vinyl bonds had lower intensities than the value estimated from DVB conversion as discussed previously. These data were consistent with the proposed star formation mechanism. Similarly, end functional stars with hydroxy-, amino-, cyano-, and bromine end functional groups on the out layers were prepared in good yields. The conservation of the functional groups were all confirmed by $^1$H NMR These experiments in this example exemplify a method to form functional star copolymers through use of telechelic PtBA as macrotelefunctional feedstock. PtBA star polymers have been successfully prepared by the "arm first" method using copper-mediated ATRP. Among different divinyl coupling reagents used, DVB provided PtBA star polymers with highest yield and narrowest molecular weight distribution. Several factors pertinent to the star formation, including the choice of the exchange halogen, the addition of Cu(II) deactivator species, the ratio of DVB to macromer, and the star formation time were addressed. End functional stars have been successful synthesized by introducing α-functional groups directly onto the PtBA macroinitiators. Star polymers with various end functional groups, such as hydroxy-, epoxy-, amino-, cyano-, and bromine groups, were prepared. The above example discussed homopolymeric arms but the properties of the "star" could be further modified, or controlled, by first preparation of block, random or gradient copolymers prior to coupling.

Example 32

Synthesis of the Poly(Methyl Acrylate) Three-Armed Star and Hyperbranched Polymer and Radical Addition to 1,2-Epoxy,5-Hexene Poly(methyl acrylate) star polymer and hyperbranched poly(2-2-(bromopropionyloxy)ethyl acrylate), (pBPEA, $M_n$=2950, $M_w/M_n$=4.8, against linear PS standards), were synthesized as reported in earlier publications.

Example 32a

Radical Addition to 1,2-Epoxy-5-Hexene

To a degassed mixture of 4,4'-di-tert-butyl-2,2'-bipyridyl (dTbpy), star or hyperbranched polymer, and CuBr, degassed 1,2-epoxy-5-hexene was added. The reaction was stirred at 70° C. The polymer was recovered by precipitation into n-hexanes (10-fold excess).

Example 33

Poly(t-Butyl Acrylate) Stars

The poly(t-butyl acrylate) (PtBA) macroinitiators were prepared via a procedure described previously. To prepare PtBA stars, a dry glass tube was charged with CuBr, N,N,N',N'',N''-pentamethyldiethylenetriamine (PMDETA), PtBA macroinitiator, divinylbenzene (DVB), anisole and a magnetic stir bar. The glass tube was degassed by three freeze-pump-thaw cycles and sealed under vacuum. The glass tube was immersed in an oil bath with the thermostat set at 110° C. After a certain time, the glass tube was taken out and broken. The sample was dissolved in THF to measure conversion (GC) and molecular weight.

Example 34

Functional DIOLS

Materials: Methyl acrylate was distilled over calcium hydride at reduced pressure. The middle fraction was collected and stored under nitrogen at −18° C. Nitrogen was dried by passing it through DRIERITE®. Cuprous bromide was purified by stirring it in acetic acid for five days and drying it at 1 mm Hg, 100° C. for three days. N,N,N',N'',N''-pentamethyldiethylenetriamine (PMDETA) was purified by fractional distillation at 78° C., 2 mm Hg. All other reagents were used as received.

Measurements: GC and GPC measurements were made according to published procedures.'Polymer composition was measured by $^1$H NMR using a 300 MHz Bruker spectrometer operated by Tecmag data acquisition software. MALDI-TOF MS-spectra (in linear mode) were obtained using a PerSeptive Biosystems' Voyager Elite instrument, equipped with a $N_2$ laser at 337 nm. Dithranol, 0.1 M in THF, doped with $Na^+$, was used as the matrix solution. Electrospray Ionization (ESI) MS was conducted using a Finnegan LCQ, equipped with an octupole and an ion trap mass analyzer. Polymer solutions ($10^{-4}$ M in methanol, doped with $Na^+$) were injected at 3 μl/min.

Polymerizations: Appropriate amounts of p-dimethoxybenzene and cuprous bromide were placed in a Schlenk flask, which was sealed with a rubber septum and purged with nitrogen for 15 min. Methyl acrylate was purged with nitrogen for 15 min, and ca. 5 mL was added to the reaction flask by syringe. PMDETA was added. The reaction flask was subjected to three freeze/pump/thaw cycles. The initiator was added. The reaction mixture was heated to 60° C. Samples were collected by syringe. The ratio of I:CuBr:PMDETA was 20:1:1 for the initiator (I) being dimethyl 2,6-dibromoheptadionate and 10:1:1 for the initiator being ethylene glycol mono(2-bromoisobutyrate).

Functionalization: Poly(methyl acrylate)-diols were prepared in situ by polymerizing methyl acrylate. At ca. 80% conversion, 15 equivalence of allyl alcohol to the chain ends, copper(0), cuprous bromide, and PMDETA were added, the ratio of I:CuBr:Cu(0):PMDETA was 1:1:3.8:1. The reaction was allowed to stir. Samples were removed for ESI-MS and $^1$H NMR analysis.

Coupling of poly(methyl acrylate). Poly(methyl acrylate) and cuprous bromide were added to a round-bottomed flask. The flask was sealed and purged with nitrogen for 15 min. Benzene, PMDETA, and a coupling agent such as m-diisopropenylbenzene or α-methylstyrene were added. The ratio of chains to coupling agent was varied from 2 to 4. The ratio of chains:PMDETA:CuBr was 1:1:1.

Example 35

Extension of "Reverse" ATRP Initiators to Include Peroxides

The use of conventional radical initiators in ATRP in the presence of complexes of transition metals in their higher oxidation state, has been reported and referred to as "reverse" or "alternative" ATRP. The range of "standard free radical initiators" that can be used in such "reverse" ATRP reactions can now be expanded to include peroxides. This expansion is demonstrated by the results of the homogeneous "reverse" copper-mediated ATRP using as the initiator benzoyl peroxide (BPO) which are presented, and compared with those using azobisisobutyronitrile (AIBN).

Table 26, compares the results of the bulk styrene polymerization initiated by AIBN and BPO in the presence of $CuBr_2$ or CuBr complexed by 4,4'-di(5-nonyl)-2,2'-bipyridine (dNbpy). Earlier work has shown that the addition of CuBr to AIBN initiated systems has little effect on kinetics, molecular weights ($M_n$) or polydispersities ($M_w/M_n$). However, AIBN in the presence of $CuBr_2$/2dNbpy leads to a successful "reverse" ATRP. In contrast, uncontrolled and slow polymerization was obtained when BPO was used in conjunction with $CuBr_2$/2dNbpy under similar conditions. Surprisingly, control of the polymerization for BPO initiated system was obtained in the presence of CuBr/2dNbpy. When the reaction was carried out in the presence of salts whose anions can not reversibly deactivate the growing radicals, an uncontrolled polymerization, similar to BPO alone, was obtained.

TABLE 26

Polymerizations of Styrene in Bulk at 110° C. Initiated by AIBN and BPO in the Presence of Copper Complexes

| entry | $M_rX$ | In | $[In]_0/[M_rX]_0/[dNbpy]_0$ | Time (h) | conv (%) | $M_n$, SEC | $N_w M_n$ |
|---|---|---|---|---|---|---|---|
| 1[a] |  | AIBN | 1/0/0 | 1.0 | 66 | 9700 | 60 |
| 2[a] | CuBr | AIBN | 1/1/2 | 1.0 | 64 | 9200 | 2.90 |
| 3[b] | $CuBr_2$ | AIBN | 0.6/1/2 | 4.6 | 69 | 5500 | 1.11 |
| 4[c] |  | BPO | 1/0/0 | 0.5 | 86 | 11300 | 2.19 |
| 5[d] | $CuBr_2$ | BPO | 0.6/1/2 | 39.0 | 19 | oligomer |  |
| 6[c] | CuBr | BPO | 1/1/2 | 1.5 | 61 | 10700 | 1.14 |
| 7[c] | CuAc | BPO | 1/1/2 | 0.5 | 51 | 18800 | 1.92 |
| 8[c] | $CuAc_2$ | BPO | 1/1/2 | 0.5 | 82 | 11900 | 2.21 |

[a]Conditions: Initiator (In) = AIBN; $[styrene]_0$ = 8.6 M; $[styrene]_0/[AIBN]_0$ = 96.
[b]$[styrene]_0/[AIBN]_0$ = 160.
[c]$[styrene]_0/[BPO]_0$ = 96. [d]$[styrene]_0/[BPO]_0$ = 160.

The differences in the initiation process for AIBN and BPO have been discussed earlier and these discussions were based on an examination of the results of the kinetic studies of the polymerization of styrene using the $AIBN/CuBr_2$ and the BPO/CuBr initiating system, respectively show in both cases, that the rate of polymerization increases with an increase of either AIBN or BPO concentration, as a result of more radicals being generated by the decomposition of the initiator. The molecular weight values increased linearly with conversion. For AIBN, the apparent initiator efficiency (apparent initiator efficiency $M_{n,Cal}/M_{n,SEC}$) slightly decreased with a increase of the $[AIBN]_o/[CuBr_2/2dNbpy]_o$ ratio, possibly due to termination reactions caused by the insufficient deactivation by $CuBr_2$ at the beginning of the polymerization which resulted in the decrease of the number of propagating chains. For BPO, the number of chains roughly corresponds to an apparent initiator efficiency of 50% based on $[BPO]_o$ in all cases. This means that not all bromines were transferred from CuBr to polymer head groups and may indicate the presence of both CuBr and $Cu(O_2CPh)$ as activators. The low initiator efficiency may also partially be ascribed to the aromatic substitution side reaction of the benzoyloxy radical.

Homogeneous "reverse" ATRP can now be successfully carried out, or initiated by, decomposition of either diazo compounds or peroxides. For AIBN initiated polymerization, CuBr has little effect while "reverse" ATRP occurs efficiently in the presence of $CuBr_2$ which can scavenge initiating/growing radicals and form CuBr and RBr species. In contrast, $CuBr_2$ is an inefficient component of "reverse" ATRP initiated by BPO due to fast electron transfer from the resulting Cu(I) to BPO and coordination of benzoate anions to copper. However, the polymerization initiated by BPO can be controlled in the presence of a sufficient amount of CuBr. After the induced decomposition of BPO, growing radicals are deactivated by Cu(II) species to produce bromine terminated oligomers and Cu(I) species. Both $Cu(O_2CPh)$ and CuBr can then successfully catalyze ATRP.

Example 36

Charged Ligands

The different polymerization reactions using charged ligand (1) as a catalyst and their conditions are listed in Table 27.

TABLE 27

Results of polymerization reactions using charged ligand 1.

| Monomer | entry | Conditions (monomer/cat./AIBN/ anisole; temperature) | Time | Con. (%) | $M_w/M_n$ | $M_{n,exp.}$ ($10^4$ g/mol) | $M_{n,theo.}$ ($10^4$ g/mol) |
|---|---|---|---|---|---|---|---|
| MA | 1 | 500/1/0.5/50; 100° C. | 1 h | 53 | 1.46 | 7.9 | 2.3 |
|  | 2 | 500/1/1/500; 90° C. | 21 h | 52 | 2.0 | 3.7 | 2.2 |
|  | 3 | 200/1/0.25/0.125; 90° C. | 29.5 h | 63 | 1.58 | 2.2 | 1.1 |
|  | 4 | 200/1/0.1/0.05; 70-90° C. | 44.5 h | 34 | 2.02 | 0.5 | 0.3 |
| MMA | 5 | 500/1/0.5/50; 90° C. | 1.25 h | 32 | 1.86 | 6.7 | 1.6 |
|  | 6 | 500/1/0.5/500; 60° C. | 22 h | 11 | 1.55 | 2.3 | 0.6 |
|  | 7 | 500/1/0.5/500; 90° C. | 14 h | 80 | 1.67 | 41.8 | 40 |
|  | 8 | 500/2/0.5/500; 90° C. | 14 h | 14 | 1.66 | 1.3 | 0.7 |
|  | 9 | 500/3/0.5/500; 80° C. | 3 d | 26 | 1.50 | 3.4 | 1.3 |
| styrene | 10 | 200/1/0.5/20; 110° C. | 23 h | 66 | 2.52 | 3.5 | 1.4 |
|  | 11 | 200/3/0.5/50; 80° C. | 3 d | 18 | 2.30 | 0.4 | 0.37 |

Example 36a

Reversed ATRP with the Tripodal Charged Ligand-Cu(II)-Complex 2

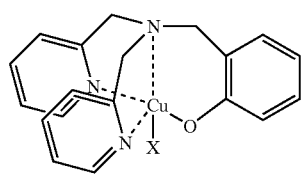

Complex 2 with a Tripodal Charged Ligand (X=Br, Cl)

In the polymerization reactions, the initial green and insoluble complex 2 dissolved and the solutions turned yellow for styrene and light green for MMA and MA. The complex 2 showed a good activity in the polymerization of styrene and MMA but polymerized MA slowly, Table 28. The polymerization reactions in anisole were only achieved at 110° C.

TABLE 28

Results of the Polymerization Reactions with Complex 2 at 110° C. and in 50% anisole

| Monomer | Conditions monomer/ cat./ AIBN/ | Time | Con. (%) | $M_w/M_n$ | $M_{n,exp.}$ ($10^4$ g/mol) | $M_{n,theo.}$ ($10^4$ g/mol) |
|---|---|---|---|---|---|---|
| MMA styrene MA | 200/1/0.5 | 5.5 h | 52 | 1.25 | 1.95 | 1.04 |
|  | 200/1/0.5 | 5.5 h | 50 | 1.42 | 1.68 | 1.04 |
|  | 200/1/0.5 | 21 h | 42 | 1.18 | 0.48 | 0.72 |

As the polymerization of MMA in anisole at 110° C. showed a limiting conversion of 52% and the resulting polymer had a molecular weight $M_n$ two times higher than the calculated one $M_{n,theo}$ it was the goal to work out better conditions for this polymerization. The different approaches with their conditions are listed in Table 29.

TABLE 29

Results of the Polymerization Reactions of MMA with Complex 2 at 110° C. and in 50% anisole

| Solvent | Conditions monomer/cat./AIBN/BPN | T (° C.) | Time (h) | Con. (%) | $M_w/M_n$ | $M_{n,exp.}$ ($10^4$ g/mol) | $M_{n,theo.}$ ($10^4$ g/mol) |
|---|---|---|---|---|---|---|---|
| anisole | 200/1/0.55/0 | 90 | | | no polymerization | | |
| anisole | 200/1/0.55/0 | 110 | 5.5 | 52[2] | 1.25 | 1.95 | 1.04 |
| anisole | 200/0.2/0.11/1 | 90 | | | no polymerization | | |
| anisole | 200/1/0.55/0 + Cu[1] | 110 | | | redox-initiated polymerization | | |
| anisole | 200/0.2/0.11/1 | 110 | 1 | 40[2] | 1.25 | 0.76 | 0.80 |
| xylole | 200/1/0.55/0 | 90 | | | no polymerization | | |
| xylole | 200/1/0.55/0 | 110 | 4 | 77 | 1.62 | 3.14 | 1.54 |
| 1,4-dimethoxy-benzene | 200/1/0.55/0 | 90 | 4.5 | 90 | 1.63 | 3.27 | 1.80 |
| 1,4-dimethoxy-benzene | 200/0.2/0.11/1 | 90 | 4 | 40[2] | 1.23 | 8.13 | 8.00 |
| proprionitril | 200/1/0.55/0 | 90 | | | redox-initiated polymerization | | |
| ethylene carbonate | 200/1/0.55/0 | 90 | 2 | 49 | 1.28 | 2.16 | 0.98 |
| methyl-pyrrolidinone | 200/1/0.55/0 | 90 | 4[3] | 64 | 1.52 | 3.19 | 1.28 |
| DMF | 200/1/0.55/0 | 90 | 5[3] | 64 | 1.64 | 3.36 | 1.28 |

[1]addition of 2 eq. Cu(0)
[2]limiting conversion
[3]induction period 120 min

The use of other solvents, which are listed above, have an dramatic effect on the polymerization behavior and some permit the polymerization at 90° C.

Example 37

Polyethylene Graft Copolymers

Earlier in this application the preparation of novel graft copolymers, wherein the graft (co)polymer was attached to the backbone (co)polymer within the grafted polymer chain, was disclosed; we would now like to describes the some advances in the case of normal graft copolymers through modification of, and subsequent polymerization from, poly(ethylene-co-glycidyl methacrylate). Ring-opening of the epoxide groups with chloroacetic acid is described along with subsequent polymerization with styrene and benzyl acrylate. Details on the hydrolysis of the benzyl groups in the latter copolymer toward synthesis of amphiphillic graft copolymers are also taught.

Materials Poly(ethylene-co-glycidyl methacrylate) (P(E-co-GMA)) containing 8% (wt.) GMA units, chloroacetic acid and chlorobenzene were used as received from Aldrich. Styrene and benzyl acrylate, from Aldrich, were distilled from calcium hydride and calcium chloride, respectively, prior to use. Copper chloride (CuCl) was washed with glacial acetic acid, washed with absolute ethanol and dried under vacuum. 4,4'-Di-nonyl-2,2'-bipyridine (dNbpy) was synthesized by a previously reported procedure.

Measurements FTIR spectra of polymer films cast on Teflon were recorded with a ATI Mattson Infinity Series FTIR. Monomer conversion was measured on a Shimadzu GC-14A gas chromatograph equipped with a wide-bore capillary column (DB-Wax, J&W Sci.). The composition of the purified samples were measured by $^1$H NMR on a 300 MHz General Electric GN 300 spectrometer with variable temperature capability using Tecmag data acquisition software. Size exclusion chromatography (SEC) measurements in THF were carried out using a Waters 510 liquid chromatograph pump equipped with four PSS columns (100 Å, 1000 Å, $10^5$ Å and guard) in series with a Waters 410 differential refractometer. Molecular weight analyses were calculated with PSS software; calibration based on low polydispersity polystyrene standards. Differential scanning calorimetry (DSC) data was obtained from a Rheometrics DSC Plus. Elemental analyses were measured by Midwest Micro labs.

Example 37a

Synthesis of the Macroinitiator

P(E-co-GMA) (5.0 g, 3.8 mmol GMA), chloroacetic acid (0.30 g, 3.2 mmol) and 100 ml xylene were heated to 115° C. under argon and stirred until the polymer completely dissolved. Tetrabutylammonium hydroxide (0.28 mmol) in 0.72 ml ethanol was added and the reaction was stirred at 115° C. for 43 hours. The hot solution was precipitated into excess methanol and collected by filtration. The product was reprecipitated into methanol from hot xylene. The white powder was isolated and dried under vacuum. Elemental analysis showed that 51% of the GMA groups had been functionalized.

Example 37b

Graft Polymerizations

For the ATRP of styrene, 0.2 g ($7.4 \times 10^{-2}$ mmol Cl) of the macroinitiator, 7.3 mg (0.74 mmol) CuCl and 60 mg (0.15 mmol) dNbpy were placed into three glass ampoules and degassed by three vacuum/argon cycles. To each tube, 1.0 ml (8.7 mmol styrene) of 5% chlorobenzene in styrene was added. The tubes were sealed under vacuum and placed into a 130° C. oil bath. The tubes were removed periodically. The reaction mixtures were placed in vials with benzene for conversion measurements by GC. The products from each tube were purified by two precipitations from solutions of hot toluene into methanol. The white powders were dried at room temperature under vacuum.

The ATRP of benzyl acrylate was performed in the drybox to facilitate removal of kinetics samples. 0.5 g (20 mmol Cl) Macroinitiator, 2.0 g (12 mmol) benzyl acrylate and 2.5 g of toluene were placed into a 50 ml round bottom flask and stirred at 90° C. until a finally dispersed mixture formed. To this, a solution of 10 mg (0.10 mmol) CuCl, 82 mg (0.20 mmol) dNbpy, 1.2 g (7.4 mmol) benzyl acrylate and 0.7 g toluene was added to the reactor. The maroon liquid was stirred at 90° C. for one minute to ensure that all macroinitiator dissolved at which time the first kinetics sample was removed. Subsequent samples were removed periodically from the reaction. Products were isolated from each sample by precipitation from hot toluene solutions into methanol. The white powders were dried at room temperature under vacuum.

Example 37c

Cleavage of Polystyrene Grafts 0.1 g of poly(ethylene-g-styrene) was placed into a 50 ml round bottom flask with 10 ml THF and 0.45 ml of 1 M tetrabutylammonium hydroxide solution in methanol. The solution was stirred under reflux for 16 hours. Upon cooling to room temperature, the polyethylene precipitated from solution. The liquid phase was removed, neutralized with hydrochloric acid and injected onto the SEC chromatograph for molecular weight determination of the polystyrene. This method served to cleave the ester groups of the functionalized glycidyl methacrylate and acetate moieties. The molecular weight of the polystyrene chains increased with monomer conversion during the polymerization and polydispersities were low, $M_w/M_n$<1.4. These reactions were consistent with a similar system where the homopolymerization of styrene from vinyl chloroacetate occurred under control and with high initiation efficiency. Examination of the SEC chromatograms in clearly confirmed that the growth of polystyrene proceeded under control; the entire peak shifted to higher molecular weight with increasing extent of reaction.

Example 37d

ATRP of Benzyl Acrylate

While the use of a drybox is not generally required for ATRP, one was used in this case to facilitate greater ease in removal of samples. Samples could not be removed by a needle as in many typical ATRP procedures because the polyethylene would precipitate as the temperature of the reaction decreased. Therefore, in a drybox the cover to the reactor was removed without concern for contamination by oxygen and samples were extricated with a wide bore syringe or glass pipette.

The reaction was run in 50% toluene in benzyl acrylate at 90° C. using 0.5 equivalents of CuCl(dNbpy)$_2$ relative to chloroacetate groups. The ratio of monomer to chloroacetate was 100. As the reaction proceeded, the swellability of the polymers in xylene increased indicating incorporation of a segment whose homopolymer is soluble in that solvent. FTIR spectroscopy of a film of the purified material showed and intense carbonyl stretch at 1736 cm$^{-1}$ indicating the presence of the acrylate in the copolymer. An attempt to cleave the grafted chains using the method described above for styrene was not made due to competing hydrolysis of the benzyl ester groups.

Herein the modification of a commercially available poly (ethylene-co-glycidyl methacrylate) into an ATRP macroinitiator by reaction with chloroacetic acid had been detailed. The pendant functionalized polyolefin was used for the controlled polymerization of styrene and benzyl acrylate. In both cases, incorporation of the vinyl monomer into the copolymer increased with extent of reaction.

Example 37e

Methyl Methacrylate Grafted Polyethylene by ATRP: Preparation of the Macroinitiator with Bromo Isobutyryl Groups In order to be able to graft methacrylates onto polyethylene, a macroinitiator with bromo isobutyryl groups was prepared by the reaction of poly(ethylene-co-GMA) copolymer with bromoisobutyric acid (BIBA), catalyzed by tetrabutylammonium hydroxide (TBAH). The copolymer (10 g, 7.75× $10^{-3}$ mole GMA), BIBA (2.6 g, 15.5×$10^{-3}$ mole) and 150 ml o-xylene were heated at 115° C., under nitrogen. After the polymer dissolved, 0.8 ml TBAH 1M in methanol (7.75×$10^{-4}$ mole) was added, and the reaction mixture was stirred at 115° C. for 38 hr. The final yellowish mixture was poured into a large excess of methanol in order to recover the polymer. The macroinitiator was purified by 2 more precipitation from hot toluene into methanol. The final product was dried under vacuum. The elemental analysis showed the following composition: C=79.92%; H=13.13%; Br=3.90%; O=3.15%.

Synthesis and characterization of P(E-g-MMA) copolymer. The macroinitiator prepared as described was used to initiate MMA polymerization. The polymerization was performed in xylene solution, MMA/xylene=1/2, at 90° C., in tubes, under nitrogen. Br/CuCl/dNbpy=1/1/2. target $M_{n,grafts}$=20K The catalyst solution in xylene/MMA was prepared in a Schlenk flask, under nitrogen, and then transferred via argonated syringes into tubes containing the macroinitiator under nitrogen. The tubes were sealed and placed in the oil bath at 90° C. At certain time intervals, tubes were withdrawn from the oil bath, cooled down and the content was transferred to 20-ml vials by using THF as dispersant. All samples were heated up in order to dissolve in THF, and then left to cool down (separation occurred). All samples were soluble in hot THF. Conversion were determined after that by GC, using xylene as internal standard and increased linearly with time showing a controlled polymerization.

The $^1$H NMR spectra of the purified polymerization products displayed peaks for both polyMMA ($\delta$=3.4 ppm —OC$\underline{H_3}$; 2.1 ppm —C$\underline{H_2}$—C(CH$_3$)—; 1.3 ppm —CH$_2$—C(C $\underline{H_3}$)—) and polyethylene ($\delta$=1.4 ppm) segments (FIG. 20), demonstrating the formation of the graft copolymer.

As conversion increased, the amount of MMA in the graft copolymer increased as well (Table 30). The MMA content of P(E-g-MMA) was determined by $^1$H NMR, using the area of the triplet at $\delta$=3.4 ppm versus the area of the peaks at $\delta$=1.2-1.5 ppm, and also calculated from monomer conversion. The two sets of copolymer compositions agreed very well.

TABLE 30

Conversion and composition data for the ATRP of MMA from PEBr[a]

| Sample | Time (min) | Conversion (%) | MMA content[b] (wt. %) | MMA content[c] (wt. %) |
|---|---|---|---|---|
| 1 | 90 | 9 | 45 | 47 |
| 2 | 180 | 20 | 67 | 66 |

TABLE 30-continued

Conversion and composition data for the ATRP of MMA from PEBr[a]

| Sample | Time (min) | Conversion (%) | MMA content[b] (wt. %) | MMA content[c] (wt. %) |
|---|---|---|---|---|
| 3 | 330 | 34 | 77 | 77 |
| 4 | 480 | 43 | 80 | 81 |

[a][MMA]$_0$ = 3.12 M; [2-bromoisobutyrate]$_0$ = [CuCl]$_0$ = [dNbpy]$_0$/2 = 15.6 mM; solvent o-xylene, 90° C.;
[b]determined by $^1$H NMR;
[c]calculated from MMA conversion DSC analysis of the P(E-g-MMA) samples showed the presence of the glass transition of polyMMA grafts (about 125° C.), indicative for the phase separation. The glass transition temperature of polyMMA was more visible in samples with MMA content above 67 wt %.

Example 38

ATRP of MMA-POSS

To a glass tube with magnetic stir bar was added, MMA-POSS (200 mg, 0.194 mmol), initiator (10-mol % relative to monomer), Cu(I)Cl (0.0097 mmol), PMDETA (2.0 µL, 0.0097 mmol) and degassed 1,2-dichlorobenzene (50-wt % relative to monomer). The tube was evacuated while under liquid nitrogen for three freeze, pump, thaw cycles and sealed under vacuum. The tube was then placed in an oil bath at 70° C. for 42 hrs. Polymer was recovered by precipitation into methanol (10-fold excess). From SEC analysis (in toluene against linear PS), the synthesis of low molar mass polymer with low polydispersity was confirmed ($M_n$=9,590; $M_w/M_n$=1.14). The $M_{n,SEC}$ was significantly lower than theoretical predictions ($M_{n,\,theoretical}$=14,790) and was attributed to hydrodynamic volume differences between p(MA-POSS) and linear PS standards.

Example 39

Synthesis of Poly(MMA-POSS) Block Copolymers

To a glass vial with a magnetic stir bar was added, MMA-POSS (200 mg, 0.194 mmol), initiator (10-mol % relative to monomer), Cu(I)Cl (0.0097 mmol). The vial was fitted with rubber septum and evacuated/back-filled with argon (three times). Degassed toluene (50-wt % relative to monomer and macroinitiator) was added via syringe. PMDETA (2.0 µL, 0.0097 mmol) was added last, via syringe. The reaction flask was then placed in an oil bath at 60° C. for 24 hrs. Polymers were recovered by precipitation into methanol (10-fold excess).

Example 40

ATRP of Sty-POSS and Styrene

A similar procedure was used a for the ATRP of MMA-POSS except with: Sty-POSS (503 mg, 0.5 mmol), phenylethyl bromide (7.0 µL, 0.05 mmol), Cu(I)Br (3.6 mg, 0.025 mmol), PMDETA (5.3 µL, 0.025 mmol), styrene (471 mg, 4.5 mmol) and benzene (981 mg, 12.5 mmol) at 80° C.

In a further experiment Sty-POSS was homopolymerized using a bromine-terminated, difunctional p(n-BA) macroinitiator ($M_{n,SEC}$=2300; $M_w/M_n$=1.3). For this system, a Cu(I)Br/PMDETA catalyst was used, in a toluene solution (50-wt % relative to monomer/macroinitiator) under the following conditions: [M]:[I]:[Cu(I)Cl]:[PMDETA]=0.39 M:0.019 M:0.011 M:0.011 M at 110° C.

Example 41

Synthesis of Homopolymer, Diblock and Random Copolymers of POSS-Materials

The synthesis of p(MMA-POSS) homopolymer was conducted using ethyl-2-bromoisobutyrate as an initiator. Low $DP_n$'s were targeted and a monomer conversion of p=0.50, was obtained, as determined by $^1$H NMR analysis. AB diblock copolymers were synthesized by the application of a monofunctional poly(n-butyl acrylate) macroinitiator ($M_n$=2200, $M_w/M_n$=1.3) to the polymerization of MMA-POSS. From the SEC analysis, efficient chain extension from the macroinitiator was observed. Additionally, random copolymers of styrene and Sty-POSS were also prepared at a feed ratio of 9:1, of the respective monomers. The incorporation of Sty-POSS into the growing polymer was found to be constant, as determined by $^1$H NMR analysis at various monomer conversions. All of the polymerizations were done in 1,2-dichlorobenzene, or toluene as a solvent, because the POSS-monomers ($M_n$>1000) were solids at room temperature. The SEC chromatograms of the aforementioned polymers are presented in Table 31.

TABLE 31

POSS-based Homopolymers and Copolymers Synthesized by ATRP

| Polymer /Composition | $M_n$ | $M_w/M_n$ |
|---|---|---|
| p(MMA-POSS)/ homopolymer | 4,620* | 1.08 |
| p(BA)-b-p(MMA-POSS)/diblock copolymer | 5,840* | 1.18 |
| p(Sty)-r-p(Sty-POSS)/random copolymer | 15,750§ | 1.30 |

*Apparent molar mass determined by SEC in THF against linear PMMA
§Apparent molar mass determined by SEC in THF against linear Psty Example 42

Synthesis of Star Block and Triblock Copolymers from MMA-POSS

As alluded to earlier, the synthesis of block copolymers with hard segments of POSS-based polymers and soft segments of another polymer with a low $T_g$, is an area of great interest towards the preparation of thermoplastic elastomers. Thus, star block and ABA triblock copolymers with hard, p(MMA-POSS) segments at the periphery were prepared. The synthesis of star block copolymers was conducted by the application of a three-armed poly(methyl acrylate) macroinitiator ($M_n$=7,900, $M_w/M_n$=1.10) to the ATRP of MMA-POSS. In the block copolymer synthesis, a $DP_n$=20 was also targeted for the chain extension reaction. The SEC chromatogram (SEC in THF, against linear PMMA), indicated a well-defined block copolymer containing p(MMA-POSS) was prepared.

Additionally, ABA triblocks were made by the use of a difunctional p(BA) macroinitiator ($M_n$=11,000, $M_w/M_n$=1.16) in the ATRP of MMA-POSS. For the chain extension reaction of MMA-POSS from a p(BA) macroinitiator, a $DP_n$=20 was targeted. From the SEC chromatogram (in THF against linear pMMA) an increase in molar mass in the ATRP of MMA-POSS from the macroinitiator was observed.

From $^1$H NMR analysis of the block copolymers, the incorporation of p(MMA-POSS) was verified.

In the polymerizations of MMA-POSS toward the synthesis of ABA triblocks and star block copolymers, monomer conversion was determined by consumption of vinylic protons (δ=5.6, 6.1 ppm), as observed in the $^1$H NMR spectra. Analysis of the unprecipitated reaction mixtures revealed that vinyl bonds were consumed to high conversions (p>0.95). Resonances for cyclopentyl protons associated with the POSS cube were observed at δ=0.6, 1.0, 1.6 and 1.8 ppm and overlapped with resonances from the polymer backbones of p(MA) and p(BA) macroinitiators. For the pMA-b-p(MMA-POSS) star block copolymer methoxy protons were observed at δ=3.8, while for the p(MMA-POSS)-b-pBA-b-p(MMA-POSS) triblock copolymers, methylene protons were seen at δ=4.1 ppm. Additionally, resonances at δ=3.9 from the methylene protons of the p(MMA-POSS) components were observed, indicative of successful chain extension from the polyacrylate macroinitiators.

The synthesis of triblock copolymers with p(MA-POSS)-r-p(MMA) hard segments was also conducted. This material has the potential advantage of possessing enhanced physical properties from incorporation of POSS components, while cutting the total amount of POSS that needs to be used. This is a direction of great practical interest, due to the current high cost of POSS-monomers.

The experimental approach was identical to that used in the synthesis of p(MA-POSS)-b-p(BA)-b-p(MA-POSS), where a difunctional pBA macroinitiator ($M_n$=13,750; $M_w/M_n$=1.18) was employed in a 50-wt % solution of toluene. A 1:1 molar feed ratio of MA-POSS to MMA was used to prepare hard segments around the pBA macroinitiator. NMR analysis revealed the incorporation of both MMA and MA-POSS onto the macroinitiator however determination of the monomer conversions was difficult due to overlapping resonances. GPC showed the presence of some unreacted MA-POSS but the $M_n$ of the block copolymer has increased to 24,050.

Example 43

Particles Possessing Appropriate Functionality for Controlled ATRP

The general procedure for the synthesis of functional particles from the Stober process was as follows:

TEOS (8 mL, 35 mmol) was added to a stirring solution of absolute ethanol (120 mL) and the appropriate concentration of ammonium hydroxide (aq.) (7.4 mL) and was allowed to stir for seven hours, yielding a white, turbid suspension. To prepare coated particles, a functional trialkoxysilane (1 mL) was added via syringe to a 35 mL aliquot of the alcosol prepared from TEOS and allowed to adsorb on the particle surfaces for 30 min. The suspension was then slowly concentrated (10 mL distilled over 2 hours) to drive condensation reactions of functional silane to the silica particles. Isolation of the particles was conducted by stripping of solvent from the already concentrated alcosol of coated particles to a volume of 5-10 mL, precipitation into heptane (10-fold excess), followed by centrifugation (3000 rpm) for 2 hrs. The resulting product was initially a white gel, which after drying yielded a white solid. (10% yield) The particles were then suspended in toluene (5 mL) treated with hexamethyldisilazane (1.0 mL, 4.7 mmol) to end-cap residual silanol groups, however, this treatment did not improve the solubility of the particles. And after isolation of the particles in the solid state, dissolution in non-polar (THF, toluene) and polar solvents (methanol, ethanol) was not possible.

As described earlier in the discussion, particle sizes of the colloidal silica, prepared from the Stober process, were controlled by using various concentrations of ammonium hydroxide. Table 32, lists the experiments that were conducted, along with the concentration of ammonium hydroxide and the resulting particle sizes that were achieved.

TABLE 32

Summary of Conditions for Preparation of Functional Stober Particles

| Experiment # | Concentration of NH$_4$OH | Particle Size (from TEM) | Functional Silane |
| --- | --- | --- | --- |
| JP-6-54 | 20 N | ~60 nm | MPS (methacrylate) |
| JP-6-62 | 5 N | ~6-10 nm | MPS (methacrylate) |
| JP-6-64 | 5 N | ~6-10 nm | BIB-TMS (bromoisobutyrate) |

While the coating of colloidal silica MPS was successful, isolation of the particles, was problematic, as evidenced by the limited solubility of the coated particles after recovery from precipitation into heptane. Methacrylate particles prepared from the Stober process yielded turbid dispersions after the coating process, while still in the presence of ammonium hydroxide. Thus, the tuning of the particle sizes of the colloidal silica was achieved by using 20 N and 5 N concentrations of ammonium hydroxide. In both cases, the addition of a large excess of toluene to the coated colloidal dispersion did not result in precipitation, indicative that particles were capable of being redispersed in organic solvents. TEM measurements confirmed that particle sizes of the coated silica particles were greatly affected by the concentration of ammonium hydroxide. From the TEM micrographs, the presence of discrete nanoscale spheres were observed, revealing that large scale aggregation of particles did not occur. Additionally, $^{29}$Si CP-MAS NMR of particles from JP-6-54 clearly showed the presence of "T"-resonances for silicon-carbon bonds in the region of −40 to −60 ppm, in addition to "Q" resonances at −90 to −110 ppm, which is indicative of successful surface treatment of the particles.

The synthesis of bromoisobutyrate functional particles was also accomplished using the Stober process, but initially yielded unstable dispersions and aggregated particles. To prepare bromoisobutyrate functional particles, 3-(2-bromoisobutyryloxy) propyltrimethoxysilane (BIB-TMS) was added to a colloidal dispersion of silica. However, upon addition of BIB-TMS to the dispersion, immediate coagulation of the silica colloids was observed, as evidenced by the formation of a white precipitate. The destabilization was presumably due to the hydrophobicity of the BIB-TMS monomer. Despite the precipitation, characterization of the particles was conducted. TEM of the particles also showed the presence of discrete particles around 6-10 nm in diameter. Additionally, the $^{29}$Si CP-MAS NMR of the particles also confirmed the coating of silica colloids with BIB-TMS. However, as in the case of the methacrylate particles, the limited solubility of the particles strongly implies that some small-scale aggregation took place, preventing complete dissolution of the particles in organic solvents (THF, toluene, ethanol, methanol).

The general procedure for the synthesis of particles from this approach is presented below: methyltrimethoxysilane (2.56 mL, 18.3 mmol) was added slowly over a 45 minute period to a solution of 6 mM NaOH (12.5 mL) and benzethonium chloride (6-30 wt % relative to trialkoxysilane) and then allowed to stir for 5 hours. Methoxytrimethylsilane (0.8 mL, 5.8 mmol) was then added and the reaction was allowed to proceed overnight. The reaction was then precipitated into methanol, and the solid was recovered by centrifugation. The white solid was then resuspended in toluene (5 mL) and hexamethyldisilazane (0.8 mL, 1.5 mmol) and allowed to react overnight. Particles were recovered by precipitation into methanol and filtration.

The synthesis of trimethylsilyl functional particles was first conducted using both 6%-wt of and 12.2%-wt of benzenthonium chloride (surfactant). Using the aforementioned conditions, particles prepared from the 6%-wt of benzethonium chloride system were found to be insoluble in organic solvents and displayed a significant amount of aggregation in the TEM micrographs. While large scale aggregation was observed by TEM in this system, it should be noted the spherical particles (6-10 nm) were still present. This result implied that additional surfactant was required to stabilize particle formation. By doubling the wt % of surfactant (12.2%-wt), particles that were completely soluble in THF and toluene were prepared. Solutions of the particles were also able to be passed through 0.2 micron PTFE filters. TEM of these particles was not conducted, however, spherical particle formation as seen in micrographs from the 6%-wt experiment, along with the solubility properties of the particles, imply that the synthesis was successful. TEM characterization is pending. TGA analysis revealed that over 80%-wt of the material was still present above 800° C., indicating the presence of silicate networks.

Example 44

ATRP of Acrylamides

A series of experiments has determined that the ligand to be used for the polymerization of acrylamides should be pure and that final conversion was dependant on the amount of CuCl added to the system.

Example 44a

DMAA Polymerization Using Different Amounts of CuCl

The target $M_n$ was 10K. The experiment was performed in tubes, without stirring, at room temperature, under nitrogen. The results are displayed in Table 33.

TABLE 33

DMAA polymerization with different amounts of CuCl

| Exp. | MCP/CuCl/ Me$_6$Tren | Time hr | Conv. % | $M_{n,th}$ | $M_n$ | $M_w/M_n$ |
|---|---|---|---|---|---|---|
| DMAA70-1 | 1/1/1 | 14.5 | 59 | 5900 | 5820 | 1.12 |
| 70-2 | 1/2/1 | 14.5 | 82 | 8200 | 8650 | 1.20 |
| 70-3 | 1/3/1 | 14.5 | 24.4 | 2440 | 2940 | 1.17 |
| 70-4 | 1/4/1 | 14.5 | 17 | 1700 | 1990 | 1.50 |

Example 44b

DMAA Polymerization with Me$_6$Tren—Sequential Addition of CuCl

In order to check if higher yields can be reached by using an excess of CuCl, the transition metal compound was added sequentially, while the amount of Me$_6$Tren was kept constant. Each CuCl portion was equal with the amount of Me$_6$Tren introduced initially. The results are displayed in Table 34.

TABLE 34

DMAA polymerization with different amounts of CuCl—sequential addition

| MCP/CuCl/ Me$_6$Tren | Time hr | Conv. % | $M_{n,th}$ | $M_n$ | $M_w/M_n$ | Remarks |
|---|---|---|---|---|---|---|
| 1/1/1 | 8.5 | 69 | 6900 | 7100 | 1.07 | initially introduced |
| 1/2/1 | 23.17 | 82.4 | 8240 | 8350 | 1.12 | 1st additional portion of CuCl |
| 1/3/1 | 33 | 81.8 | 8180 | 7900 | 1.11 | 2nd additional portion of CuCl |
| 1/4/1 | 47.17 | 80.7 | 8070 | 7800 | 1.11 | 3rd additional portion of CuCl |

The reaction was carried out at room temperature, in a Schlenk flask, under nitrogen, with stirring.

These results show that the limiting conversion depends on the catalyst to initiator ratio.

Example 45

Acrylamide Polymerization

For the polymerization of DMAA the polarity of the solvent influences the limiting conversion. More polar solvents decreases the limiting conversion (Table 35).

TABLE 35

DMAA polymerization—influence of the solvent

| Exp. | Solvent | Time (h) | Conv. (%) | $M_n$ | $M_w/M_n$ |
|---|---|---|---|---|---|
| DMAA78 | toluene | 22.25 | 56 | 6860 | 1.11 |
| DMAA85-1 | ethyl acetate | 16.5 | 40.6 | 4080 | 1.10 |
| DMAA85-2 | dichlorobenzene | 16.5 | 21 | 2860 | 1.14 |
| DMAA94K | DMF | 21.85 | 44 | 5980 | 1.17 |

Exp. cond.: DMAA/solvent = 1/3; target $M_n$ = 10K; MCP/CuCl/Me$_6$Tren = 1/1/1; rt.

No precipitate was observed in dichlorobenzene and DMF, while the precipitate formed when toluene and ethyl acetate were used as solvents.

By adding Cu$^0$ the limiting conversion increased, but the increase was small (Table 36). The final reaction mixtures were green and free of precipitate (only unreacted Cu$^0$).

TABLE 36

DMAA polymerization in the presence of Cu$^0$

| Exp. | CuCl/Cu$^0$ | Time (h) | Conv. (%) | $M_n$ | $M_w/M_n$ |
|---|---|---|---|---|---|
| DMAA78 | 1/0 | 22.25 | 56 | 6860 | 1.11 |
| DMAA79 | 1/1 | 16 | 69 | 8000 | 1.16 |
| DMAA81-1 | 1/3 | 19.5 | 75 | 9070 | 1.17 |
| DMAA81-2 | 1/5 | 19.5 | 76 | 9080 | 1.17 |

Exp. cond.: DMAA/toluene = 1/3; target $M_n$ = 10K; MCP/CuCl/Me$_6$Tren = 1/1/1; Cu$^0$ = powder, dendritic, 3 microns; 99.7%

Example 45a

Addition of Excess Transition Metal Compound

By adding CuCl in excess, the limiting conversion increases at the beginning (MCP/CuCl=1/2), and then decreases (Table 37). A too large excess of CuCl actually shut down the reaction.

TABLE 37

DMAA polymerization with different amounts of CuCl-one pot addition

| Exp. | MCP/CuCl/ Me$_6$Tren | Time hr | Conv. % | M$_{n,th}$ | M$_n$ | M$_w$/M$_n$ |
|---|---|---|---|---|---|---|
| DMAA70-1 | 1/1/1 | 14.5 | 59 | 5900 | 5820 | 1.12 |
| 70-2 | 1/2/1 | 14.5 | 82 | 8200 | 8650 | 1.20 |
| 70-3 | 1/3/1 | 14.5 | 24.4 | 2440 | 2940 | 1.17 |
| 70-4 | 1/4/1 | 14.5 | 17 | 1700 | 1990 | 1.50 |

Target M$_n$ = 10K; DMAA/toluene = 1/3; RT.

Example 45b

Intermittent Addition of Transition Metal Compound

Sequential addition of CuCl led to an increase of conversion and molecular weight, showing that active end groups were present at the limiting conversion stage.

TABLE 38

DMAA polymerization with different amounts of CuCl—sequential addition

| MCP/CuCl/ Me$_6$Tren | Time hr | Conv. % | M$_{n,th}$ | M$_n$ | M$_w$/M$_n$ | Remarks |
|---|---|---|---|---|---|---|
| 1/1/1 | 8.5 | 69 | 6900 | 7100 | 1.07 | initially introduced |
| 1/2/1 | 23.17 | 82.4 | 8240 | 8350 | 1.12 | 1st additional portion of CuCl |
| 1/3/1 | 33 | 81.8 | 8180 | 7900 | 1.11 | 2nd additional portion of CuCl |
| 1/4/1 | 47.17 | 80.7 | 8070 | 7800 | 1.11 | 3rd additional portion of CuCl |

Target M$_n$ = 10K; DMAA/toluene = 1/3; RT.

Example 45c

Intermittent Addition of Reagents/Reactants

Addition of a new portion of catalyst (CuCl/Me$_6$TREN) dissolved in monomer, after a time interval long enough to reach the limiting conversion stage, led to an increase of the molecular weight (Table 39). After 6.45 h a precipitate formed in the reaction mixture, which dissolved when the second portion of catalyst dissolved in monomer was added.

TABLE 39

Chain extension experiment by addition of CuCl/Me$_6$Tren dissolved in monomer

| Sample | MCP/CuCl/Me$_6$Tren cumulative | Time (h) | Conv. (%) | M$_n$ | M$_w$/M$_n$ |
|---|---|---|---|---|---|
| 1 | 1/1/1 | 8.25 | 51 | 6100 | 1.11 |
| 2 | 1/2/2 | 23.16 | — | 7100 | 1.14 |
| 3 | 1/3/3 | 31.5 | — | 7300 | 1.21 | initially: target M$_n$ = 10K; DMAA/toluene = 1/3; RT; the second and the third portion of catalyst were dissolved in ⅓ the initial volume of monomer.

Example 45d

Addition of Redox Conjugate

Increasing amounts of CuCl$_2$ added from the very beginning to the reaction mixture largely slowed down the polymerization (Table 40). All samples were homogeneous at the beginning of the polymerization. The time interval after which the precipitate forms seems to depend on the amount of CuCl$_2$ added. The larger the amount of CuCl$_2$, the lower the time interval is.

TABLE 40

DMAA polymerization—influence of CuCl$_2$

| Exp. | CuCl/CuCl$_2$/ Me$_6$Tren | Time (h) | Conv. (%) | M$_n$ | M$_w$/M$_n$ |
|---|---|---|---|---|---|
| DMAA78 | 1/0/1 | 22.25 | 56 | 6860 | 1.11 |
| DMAA87-1 | 1/0.1/1.1 | 22 | 28.9 | 3650 | 1.10 |
| DMAA87-2 | 1/0.2/1.2 | 22 | 21.7 | 3000 | 1.10 |
| DMAA96-1 | 1/0.3/1.3 | 21.75 | 18.5 | 2450 | 1.11 |
| DMAA96-2 | 1/0.4/1.4 | 21.75 | 9.5 | 1540 | 1.09 |
| DMAA97 | 1/0.5/1.5 | 22 | 6.1 | 1250 | 1.06 |

Exp. cond.: DMAA/toluene = 1/3; target M$_n$ = 10K; MCP/CuCl/Me$_6$Tren = 1/1/1; rt.

Example 45e

Addition of Initiator

A new portion of initiator added at the limiting conversion stage failed to produce polymer (Table 41). Therefore, at the limiting conversion stage there is no active catalyst present.

TABLE 41

DMAA polymerization—sequential addition of the catalyst

| Sample | MCP/catalyst cumul | Time (h) | Conv. (%) | M$_n$ | M$_w$/M$_n$ |
|---|---|---|---|---|---|
| DMAA93-1 | 1/1 | 7 | 55.3 | 6900 | 1.12 |
| DMAA93-2 | 2/1 | 21.25 | 57 | 7000 | 1.11 |

Exp. cond. (initial): DMAA/toluene = 1/3 v/v; target M$_n$ = 10K; MCP/CuCl/Me$_6$Tren = 1/1/1; RT.

Example 45f

Analysis of End Groups

Polymerization performed in the NMR tube, using deuterated toluene as a solvent, under different conditions, showed that the active chain end groups are partially lost during the polymerization. However, the results seems to indicate that there is not a direct correlation between conversion and the decrease of the end group functionality, which may indicate the presence of a side reaction leading to the lost of the end groups (Tables 42-44). All conversions are a little overestimated due to the overlapping of the polymer peaks with the toluene peak at 2.09 ppm.

TABLE 42

DMAA polymerization - NMR experiment. DMAA/deut. toluene = 1/3 v/v; target $M_n$ = 1000; MCP/CuCl/Me$_6$TREN = 1/0.2/0.2. Temp: 37° C.-5.5 h; then RT

| No. | Time (min) | Cl end groups (%) | Conversion |
|---|---|---|---|
| DMAA89K-1 | 5 | 90 | 26 |
| DMAA89K-2 | 10 | 87 | 29.5 |
| DMAA89K-3 | 17 | 81 | 28 |
| DMAA89K-4 | 25 | 84 | 26 |
| DMAA89K-5 | 40 | 84 | 28 |
| DMAA89K-6 | 90 | 72 | 26.5 |
| DMAA89K-7 | 180 | 67 | 28 |
| DMAA89K-8 | 200 | 69 | |
| DMAA89K-9 | 317 | 70 | 32 |
| DMAA89K-10 | 1720(28 h 40 min) | 66 | 30 |
| DMAA89K-11 | 2970(49.5 h) | 65 | 33.3 |
| DMAA89K-12 | 7440(124 h) | 72 | 52 |
| DMAA89K-13 | 19050(317.5 h) | 70 | 67 |

After 5.5 h the sample was green and it contained a precipitate. The final polymer had $M_n$=1330 and $M_w/M_n$=1.12.

TABLE 43

DMAA polymerization - NMR experiment. DMAA/deut. toluene = 1/3 v/v; target $M_n$= 1000; ClDMAA/CuCl/Me$_6$TREN = 1/0.2/0.2. Temp: 37° C.-5 h; then RT

| No. | Time (min) | Cl end groups (%) | Conversion |
|---|---|---|---|
| DMAA98K-1 | 6 | 82 | 37 |
| DMAA98K-2 | 13 | 80 | 41 |
| DMAA98K-3 | 22 | 76 | 41 |
| DMAA98K-4 | 30 | 79 | 43 |
| DMAA98K-5 | 60 | 74 | 41 |
| DMAA98K-6 | 120 | 72 | 44 |
| DMAA98K-7 | 212 | 63 | 45 |
| DMAA98K-8 | 300 | 63 | 46 |
| DMAA98K-9 | 1825 | 64 | 51 |
| DMAA98K-10 | 10495 | 71 | 78 |
| DMAA98K-11 | 20245 | 64 | 79 |

After 5 h the sample was green and it contained a small amount of precipitate. The final polymer had $M_n$=1500 and $M_w/M_n$=1.14.

TABLE 44

DMMA polymerization-NMR experiments. Higher molecular weights targeted. DMAA/deuterated toluene = 1/3 v/v; RT.

| Exp. | Target $M_n$ | Initiating system | Time (h) | Conv. (%) | $f_{terminal\ halogen}$ |
|---|---|---|---|---|---|
| DMAA99-1 | 5000 | MCP/CuCl/Me$_6$Tren 1/1/1 | 7.33 | 79 | — |
| | | | 23 | 81 | — |
| | | | 122 | 83 | — |
| DMAA99-2 | 5000 | MBP/CuBr/Me$_6$Tren 1/1/1 | 7.75 | 30 | — |
| | | | 26 | 36 | — |
| | | | 124 | 38 | — |
| DMAA100 | 5000 | ECP/CuCl/Me$_6$Tren 1/1/1 | 7 | 74 | 0.43 |
| | | | 24.5 | 74 | 0.35 |
| | | | 166.5 | 79 | 0.16 |
| DMAA101-1 | 2500 | ECP/CuCl/Me$_6$Tren 1/1/1 | 6.5 | 80 | 0.43 |
| | | | 22 | 81 | 0.32 |
| | | | 142.5 | 94 | 0.2 |
| DMAA101-2 | 10000 | ECP/CuCl/Me$_6$Tren 1/1/1 | 7.25 | 53 | 0.38 |
| | | | 24 | 53 | 0.06 |
| | | | 148 | 54 | — |

The first NMR measurement was performed after the limiting conversion stage was reached, because usually 500 scans were necessary to see the end groups (larger molecular weight than previously). Remarks: DMAA99-1 exp.: no precipitate after 23 h; DMAA 99-2: precipitate formed after 1.5 h; DMAA99-1,2-end group functionality could not be determined because of the overlapping of the signal due to C$\underline{H}_3$O protons with that of the polymer.

Example 46

Block Copolymers of Acrylamides

Poly(methyl acrylate) with chlorine end groups ($M_n$=3600, D=1.23 (PSt standards, THF line); $M_n$=4100, D=1.15 (PMMA standards, THF line); $M_n$=6500, D=1.15 (PMMA standards, DMF line)) was used to initiate DMAA polymerization in order to prepare block copolymers. The target $M_n$ for the DMAA block was always 10K, the reaction was run at room temperature, and toluene was the solvent. The ratio Cl/CuCl/Me$_6$Tren was 1/1/1. The results are shown in Table 45. Because the DMF system of the GPC has been broken for more than 8 weeks, I don't have all $M_n$s and polydispersities.

TABLE 45

Preparation of polyDMMA-polyMA block copolymers.

| Exp. | DMAA/toluene v/v | Time h | Conv. % | $M_n$ | $M_w/M_n$ |
|---|---|---|---|---|---|
| MA-DMAA1 | 1/3 | 45 | | 8200 | 1.14 |
| MA-DMAA2 | 1/3 | 15 | 7 | 8000 | 1.11 |
| MA-DMAA3 | 1/5 | 21.83 | 18.6 | | |

The working procedure was slightly different. MA-DMAA1: polyMA+CuCl were loaded in a Schlenk flask and cycled 3 times between vacuum and nitrogen. Then degassed DMAA, degassed chlorobenzene and degassed Me$_6$Tren were added.

MA-DMAA2: a Schlenk flask loaded with CuCl was cycled 3× between vacuum and nitrogen. Separately, polyMA was loaded into another flask and cycled 3× between vacuum and nitrogen. Then, degassed toluene was added, and the solution was transferred to the flask containing CuCl. Then, DMAA, Me$_6$Tren, chlorobenzene were added.

MA-DMAA3: toluene, polyMA, DMAA and CB were loaded in a flask, and after polyMA dissolved, the solution was bubbled with nitrogen for 30 min. Then the solution was transferred into another flask containing CuCl under nitrogen. Then, degassed Me$_6$Tren was added.

The GPC traces for the MA-DMAA1 experiment showed a nice shift of the molecular weight, which indicates that initiation occurred.

Example 46a

Examination of Different Ligands

By replacing $Me_6TREN$ by TPMA (tripodal ligand with pyridine groups), the conversion was much lower (Table 46). After 22 h the color of both reaction mixtures was green, characteristic for Cu(II). Therefore, deactivation of the catalyst occurred.

TABLE 46

DMAA polymerization with TPMA as a ligand

| Exp. | Initiating system | Conversion % | $M_n$ | $M_w/M_n$ |
|---|---|---|---|---|
| DMAA103-1 | MCP/CuCl/tpma | 7.3 | | |
| DMAA103-2 | MBP/CuBr/tpma | 6.3 | | |

Target $M_n$ = 10K;
DMAA/toluene = 1/3 v/v;
time = 22.16 h; RT.

Example 47

Substituents on Amine Ligands for Control of Catalyst Solubility/Reactivity ATRP of styrene, MA and MMA were performed to evaluate the application of a new ligand prepared to examine the effect of different polarity substituents on amine ligands. Results are shown in the following table. For comparison, results using a structurally similar ligand are also shown. Preliminary one-point results show the substituted linear triamine afforded controlled polymerization only for MMA. For styrene or MA, experimental $M_n$ was close to the calculated value; however, $M_w/M_n$ was quite high. Both substituted ligands yielded similar results. Apparently, the unfavorable steric hindrance around the catalytic center can affect the control of the polymerizations. It is interesting to note that ligand A made from Michael addition did not lead to soluble copper catalyst under the reaction conditions. In contrast, the simple alkyl-substituted ligand B resulted in a homogenous catalyst.

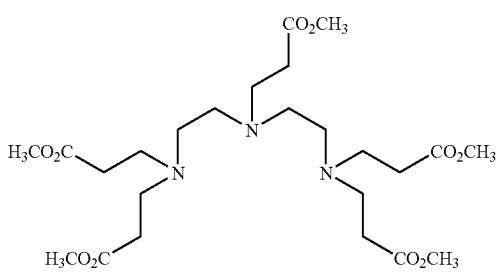

A

-continued

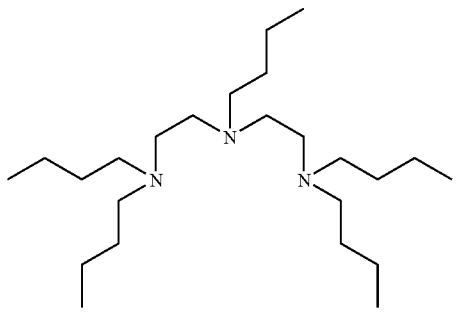

B

TABLE 47

Effect of substituents on amine ligands

| Ligand | monomer | $M_rX$ | temp (° C.) | time (h) | conv (%) | $M_{n,Cal}$ | $M_{n,SEC}$ | $M_w/M_n$ |
|---|---|---|---|---|---|---|---|---|
| A | styrene[a] | CuBr | 90 | 17.5 | 62 | 6 200 | 9 400 | 2.75 |
| A | MA[b] | CuBr | 90 | 2.6 | 65 | 13 000 | 14 200 | 1.95 |
| A | MMA[c] | CuBr | 90 | 4.1 | 71 | 14 200 | 13 000 | 1.40 |
| B | styrene | CuBr | 110 | 1.5 | 75 | 7 500 | 8 500 | 1.92 |
| B | MA | CuBr | 90 | 2.0 | 63 | 12 600 | 14 600 | 1.54 |
| B | MMA[d] | CuBr | 90 | 1.5 | 80 | 16 000 | 17 200 | 1.28 |

[a]bulk; [styrene]$_0$/[PEBr]$_0$ = 96; [PEBr]$_0$/[CuBr]$_0$/[ligand]$_0$ = 1/1/1.
[b]bulk; [MA]$_0$/[EBP]$_0$ = 232; [MBP]$_0$/[CuBr]$_0$/[ligand]$_0$ = 1/1/1.
[c]50 vol % in anisole; [MMA]$_0$/[EBIB]$_0$ = 200; [EBIB]$_0$/[CuBr]$_0$/[ligand]$_0$ = 1/1/1.
[d]50 vol % in anisole; [MMA]$_0$/[BPN]$_0$ = 200; [BPN]$_0$/[CuBr]$_0$/[ligand]$_0$ = 1/0.5/0.5.

Example 48

Polymerization from Surfaces

Materials. Trichlorosilane was obtained from Gelest. 10-Undecen-1-ol and 2-bromoisobutyryl bromide were obtained from Aldrich. Styrene was distilled from calcium hydride. Methyl acrylate was washed three times with 5% sodium hydroxide solution and once with water. After drying with magnesium sulfate, the monomer was obtained in pure form by distillation twice from calcium chloride. 3,3,4,4,5,5,6,6,7,7,8,8,9,9,10,10,10-Heptadecafluorodecyl acrylate (fluoro acrylate) was distilled at 90° C. and 4 mmHg. All of these monomers were stored in the drybox freezer immediately following distillation. tert-Butyl acrylate was purified in the same manner as methyl acrylate but was distilled only once from calcium chloride. The monomer was stored in the freezer outside of the drybox. Karstedt's catalyst was synthesized according to the method of Lewis et al. Copper-(I) bromide (CuBr) was stirred in glacial acetic acid overnight, filtered, and washed with absolute ethanol under an argon blanket. The compound was dried under vacuum at 60° C. overnight. (PMDETA) was distilled from calcium hydride and stored at room temperature in the drybox. The complex copper(II) bromide bis-(4,4'-di-n-nonyl-2,2'-bipyridine) was prepared by stirring 0.25 g (1.1 mmol) of $CuBr_2$ and 0.92 g (2.2 mmol) of dnNbpy in a 1:1 (v) mixture of THF and acetonitrile at room temperature until a homogeneous green solution formed. The solvents were removed by trap-to-trap distillation, and the green solid dried under vacuum (1 mmHg) overnight at room temperature. The complex copper (II) bromide-N,N,N',N",N"-pentamethyldiethylenetriamine was prepared by stirring 0.52 g (2.4 mmol) of $CuBr_2$ and 0.41 g (2.4 mmol) of PMDETA in methanol at room temperature until a homogeneous green solution formed. The solvents were removed by trap-to-trap distillation, and the green solid dried under vacuum (1 mmHg) overnight at room temperature. Both compounds were henceforth stored in the drybox. Chloroform was distilled from calcium hydride and stored in the drybox. "Triple distillation" quality water for contact angle measurements was obtained from a Barnstead Nanopure II purification system.

Measurement. Film thickness was measured with a Gaertner model L116B ellipsometer operating with a 633 nm He/Ne laser at a 70° incident angle. The following refractive indices were used for the various layers: 3.865 for native silicon, 1.465 for silicon oxide, 1.527 for poly(acrylic acid), 1.466 for poly(tert-butyl acrylate) (value from poly(n-butyl acrylate)), 1.339 for poly(fluoro acrylate), 1.5672 for poly(methyl acrylate), and 1.59 for polystyrene. Measurements were obtained at three spots on each wafer, 10 measurements per spot. The surface composition was measured using X-ray photoelectron spectroscopy (XPS) at 10 −9 mmHg from a VG-Scientific Mg-KR X-ray source (hî) 12 535.6 eV). The energies of emitted electrons were measured using a Fissions Clam II hemispherical analyzer at a pass energy of 50 eV. IR spectra of the polymer films grown on silicon substrates were measured in the external reflection mode using a Mattson RS1 FT-IR spectrometer coupled with a custom-made reflection optical system. P-polarized light was used at an incident angle of 80° with respect to the surface normal. A total of 1024 scans were co-added for each spectrum at 4 cm −1 spectral resolution from both the sample and a clean silicon reference. Contact angle measurements using both the horizontal and tilting platform methods were obtained from a Panasonic GP-KR222 video camera connected to a Hitachi video copy processor model P71U. Angles from three different spots on each wafer were measured 10 times and statistically compiled. Molecular weights for free soluble polymers were measured in THF using a Waters 510 liquid chromatograph pump equipped with four Polymer Standards Service (PSS) columns (100 Å, 1000 Å, linear, and guard) in series with a Waters 410 differential refractometer. Molecular weights were calculated with PSS software; calibration was based on low-polydispersity polystyrene standards. Prior to injection, samples dissolved in either THF or chloroform were passed through a 2 cm column of alumina followed by a 0.2 im syringe filter. When an air/moisture-free environment was required, a Vacuum Atmospheres HE-33 drybox was used. The concentrations of oxygen and water were both below 1 ppm in the nitrogen atmosphere.

Example 48a

Initiator Synthesis and Monolayer Self-Assembly. 10-Undecen-1-yl 2-Bromo-2-Methylpropionate To a solution of 4.257 g (25 mmol) of ω-undecylenyl alcohol in 25 mL of dry tetrahydrofuran was added 2.1 mL of pyridine (26.5 mmol) followed by dropwise addition of 3.10 mL of 2-bromoisobutyryl bromide (25 mmol) over 5 min. The mixture was stirred at room temperature overnight and then diluted with hexane (50 mL) and washed with 2 N HCl and twice with water. The organic phase was dried over sodium sulfate and filtered. The solvent was removed from the filtrate under reduced pressure, and the colorless oily residue was purified by flash column chromatography (hexane/ethyl acetate 25/1 v/v) to give 7.34 g (92%) of the ester as a colorless oil.

(11-(2-Bromo-2-methyl)propionyloxy)undecyltrichlorosilane. To a dry flask were added 1.35 g (4.23 mmol) of 10-undecen-1-yl 2-bromo-2-methylpropionate and 4.2 mL of trichlo-rosilane (42.6 mmol), followed by the addition of Karstedt catalyst (4 iL, 100 ppm Pt equivalents). The mixture was stirred at room temperature while the reaction was monitored by GC. The reaction was usually complete within 5 h. The solution was quickly filtered through a plug of silica gel to remove the catalyst. The excess reagent was removed under reduced pressure. The residue was found to be >95% pure by GC and was used as such. The compound can be further purified by vacuum distillation. When not in use, the compound was stored in the drybox at 5° C.

Silicon (100) wafers, cut into 1 cm 2 pieces, were cleaned in a toluene bath under ultrasound for 5 min. The wafers were then rinsed with HPLC grade toluene, acetone, and absolute (water-free) ethanol and dried in a nitrogen stream. The samples were then oxidized in a UV/ozone chamber for 15 min; the thickness of the $SiO_2$ layer was 16.1 Å measured by ellipsometry. The wafers were transferred to the drybox and placed into a solution of 5 iL of the trichlorosilane in 10 mL of toluene (4 mM on wafer). The samples were allowed to stand in this solution for 18 h without stirring. The wafers were removed from the solution, cleaned by ultrasound in toluene for 1 min, rinsed again with toluene, acetone, and absolute ethanol, and again dried in a nitrogen stream. When not used in reactions, the wafers were stored at room temperature in the drybox.

Examples 48b

Polymerizations from Surfaces

For polymerizations where samples were removed from a common reaction medium as a function of time, experiments were performed in glass jars with screw-top lids in a thermostated oil bath in the drybox. The purpose was to allow easy removal of individual wafers without prolonged exposure of the reaction to oxygen. A representative example is as follows: 4.5 g (43 mmol) of styrene and 36 mg (3.4×10 −2 mmol) of CuBr2(dnNbpy)2 were placed into the reactor and stirred until a homogeneous purple solution formed. Then, 99 mg (0.69 mmol) of CuBr, 560 mg (1.4 mmol) of dnNbpy, and 2.7 g (26 mmol) of styrene were added and stirred until a homogeneous maroon solution formed. The wafers were then placed into the reactor, and the covered apparatus was held in a 100° C. oil bath. Periodically, wafers were removed from the reactor and rinsed with chloroform. At the conclusion of the reaction, any adsorbed polymer formed adventitiously in solution was removed from the wafers by Soxhlet extraction in toluene for 24-48 h. Upon removal from the extractor, the wafers were dried under a stream of argon or nitrogen and stored at room temperature under air. For experiments examining the corresponding molecular weights of chains grown in solution, the above procedure was duplicated with the exception that, after all reagents had combined and homogeneity reached, 11 iL (7.3·10$^{-2}$ mmol) of ethyl 2-bromoisobutyrate was added in the absence of wafers. The reaction was conducted in such a way that solution samples were removed at times corresponding to removal of the wafers The molecular weight of the polymer samples dissolved in THF was then determined. When a polymerization from only one wafer was performed, a different procedure was adopted. Into a 10 mL round-bottom flask was placed 3.0 mg (1.3_ 10 −2 mmol) of CuBr2, 49 mg (0.34 mmol) of CuBr, and 290 mg (0.71 mmol) of dnNbpy. The solids were degassed under room-temperature vacuum for 20 min and backfilled with nitrogen. To this, 4.4 g (34 mmol) of tert-butyl acrylate, which was deoxygenated by a nitrogen bubble for 20 min, was added, and the mixture was stirred in a 60° C. oil bath under nitrogen for 30 min to promote formation of a homogeneous maroon solution. During the above process, a silicon wafer, with a preformed polystyrene layer, was placed into a 25 mL sidearm Erlenmeyer flask, covered with a rubber septum, and connected to the Schlenk line via rubber vacuum tubing. The flask was evacuated for 15 min and backfilled with nitrogen. The monomer/catalyst solution was then cannula transferred into the Erlenmeyer flask, and the reactor was placed into a 90° C. oil bath and stirred under nitrogen. After 4.5 h the wafer was removed from the flask and rinsed with chloroform. The wafer was then Soxhlet extracted with toluene for 20 h and dried under a nitrogen stream.

The "persistent radical effect," applied to controlled radical polymerizations, suggests that a sufficient concentration of deactivator be present to provide reversible deactivation of chains during propagation. In a typical ATRP process, a few percent of chains terminate and spontaneously form deactivating Cu(II) species. As detected by EPR, the concentration of Cu(II) is in the range 10 −3 mol/L, and such a concentration is needed for a sufficiently controlled process. In the previous controlled radical polymerization experiments growing dense polymer films from the surface, the "sacrificial" initiator was present in solution. The "free" (untethered) chains terminated in solution, thereby spontaneously forming a sufficient amount of the deactivator. It was reported that the presence of the sacrificial initiator was required for polymerization control. In our experiments, we did not use the sacrificial initiator but added a sufficient amount of the deactivator at the beginning of the reaction. Otherwise, no control can be observed, and the process would resemble a redox-initiated conventional radical system. Since under typical conditions of self-assembly the concentration of initiator is such that even the termination of all alkyl halide fragments would provide a concentration of CuBr2 that is 10 000 times lower than that observed and required for a well-controlled ATRP. This was resolved by the addition of the persistent radical prior to the commencement of the reaction.

Bulk ATRP of methyl acrylate from the same 2-bromoisobutyrate-modified silicon wafers. The ligand in the transition-metal complex was PMDETA. 1 mol % CuBr and 0.03% CuBr2 both relative to monomer were used; the deactivator concentration was again determined from EPR measurements. It was found that even after stirring in monomer for 30 min at 70° C., the CuBr2(PMDETA) complex was not entirely soluble. However, a linear increase in film thickness with time indicated that there was sufficient deactivator in solution to provide control over the growth of the brush chains.

Example 48c

Block Copolymers

An additional method toward verifying the functionality of a polymer prepared by ATRP is its use as a macroinitiator for the ATRP of the same or another monomer. Since XPS was not conclusive in determining the concentration of bromine, a chain extension of methyl acrylate from a surface composed of a polystyrene layer was performed. The polymerization was initiated from a 10 nm thick macro-initiator layer using 1 mol % CuBr(dnNbpy)2 and 0.03 mol % CuBr2(dnNbpy)2 dissolved in the bulk monomer. Similar to polymerizations from the initiator bound to the surface, show that a linear relationship was established between the increase in layer thickness and reaction time. The increase in thickness upon addition of the second block demonstrated that some fraction of the chains contained terminal bromine groups capable of participating in ATRP. Similar to the polystyrene-modified surfaces prepared by redox initiated polymerization, the final sample, more than 100 nm thick, had a blue appearance.

In another example, a 26 nm thick polystyrene layer was grown from two silicon wafers primed with initiator. One of those substrates was then chain extended with tert-butyl acrylate using 1% CuBr(dnN-bpy) 2 and 0.03% CuBr2(dnNbpy)2 at 90° C. An increase in film thickness to 37 nm was measured by ellipsometry after a 4.5 h reaction time.

Example 48d

Tuning Surface Properties

A benefit of radical polymerization over other techniques such as ionic or metathesis processes is the wide variety of monomers amenable to the process. Therefore, by choice of monomer one can tune the physical properties of the surface. One such property is hydrophilicity. The water contact angles of a series of polymers prepared by ATRP from identically modified silicon wafers was measured. A polystyrene layer 10 nm thick showed a contact angle of 90°. When that surface was chain extended with an additional 12 nm of poly(tert-butyl acrylate), the surface became slightly less hydrophilic (86°). The polyacrylate was then hydrolyzed to poly-(acrylic acid) by refluxing a solution of 10% aqueous HCl over the wafer overnight. Ellipsometry showed that the thickness decreased to 16 nm most likely due to relaxation of the chains upon removal of the bulky tert-butyl groups. The presence of the acid was confirmed by the significant decrease of the water contact angle from 86° to 18°.

Finally, in a separate experiment a very hydrophobic surface composed of a poly(fluoro acrylate) was constructed. The large contact angle of 119° is typical of surfaces containing high fluorine contents. All of the above examples demonstrate the versatility of the ATRP technique to polymerize a variety of monomers from the surfaces and the continued activity of the terminus of the tethered polymer towards further controlled polymerization. This terminal functionality remains until the end groups are deliberately transformed into another group.

Example 49

MMA Polymerization with Ni and Mn and Onium Salts a) Nickel

MMA polymerization with $NiBr_2$ and tetrabutylphosphonium bromide (TBPB) at 80° C., in xylene solution (MMA/xylene=1/1 v/v), target $M_n$=30K was carried out. The results are displayed in Table 48.

TABLE 48

MMA polymerization with the system ethyl 2-bromoisobutyrate (EBIB)/$NiBr_2$/TBPB

| Exp. | $NIBr_2$/TBPB | Conv (%) | $M_{n,th}$ | $M_n$ | $M_w/M_n$ |
|---|---|---|---|---|---|
| NM1-1 | 1/0.5 | 16.2 | 4860 | 36000 | 3.63 |
| 2 | 1/1 | 13.3 | 3990 | 29000 | 4.05 |
| 3 | 1/1.5 | 11.4 | 3420 | 30600 | 4.84 |
| 4 | ½ | 10.5 | 3150 | 30300 | 4.44 |
| 5 | ½.5 | 14.9 | 4470 | 36000 | 4.02 |
| 6 | ⅓ | 15.8 | 4740 | 40000 | 3.79 |

Exp. cond: EBIB/$NiBr_2$ = 1/1; time = 2.5 hr

The samples were heterogeneous at both RT and 80° C. A blue precipitate formed after 15 min at 80° C. in samples 2-6.

b) Manganese

Similar conditions as for nickel were employed. The results are displayed in Table 49.

TABLE 49

MMA polymerization with the system EBIB/MnX$_2$/onium salts

| Exp. | Catalytic system | Time hr | Conv (%) | $M_{n,th}$ | $M_n$ | $M_w/M_n$ |
|---|---|---|---|---|---|---|
| MM1-1 | MnCl$_2$/TBAC 1/0.5 | 2.33 | 13.3 | 39300 | 33650 | 2.74 |
| 2 | MnCl$_2$/TBAC 1/1 | " | 25.1 | 7530 | 65500 | 3.38 |
| 3 | MnCl$_2$/TBAC 1/1.5 | " | 21.0 | 6300 | 58400 | 4.21 |
| 4 | MnCl$_2$/TBAC 1/2 | " | 39.6 | 11880 | 88100 | 2.23 |
| 5 | MnCl$_2$/TBAC 1/2.5 | " | 44.3 | 13290 | 95300 | 2.07 |
| 6 | MnCl$_2$/TBAC 1/3 | " | 17.7 | 5310 | 49400 | 8.43 |
| MM3-1 | MnBr$_2$/TBPB 1/0.5 | 5 | 4.5 | 1350 | 12800 | 4.65 |
| 2 | MnBr$_2$/TBPB 1/1 | " | 9.5 | 2850 | 21360 | 3.56 |
| 3 | MnBr$_2$/TBPB 1/1.5 | " | 17.4 | 5220 | 42540 | 2.60 |
| 4 | MnBr$_2$/TBPB 1/2 | " | 19.2 | 5760 | 57700 | 5.19 |
| 5 | MnBr$_2$/TBPB 1/2.5 | " | 16.6 | 4980 | 57000 | 6.78 |
| 6 | MnBr$_2$/TBPB 1/3 | " | 28.6 | 8580 | 68320 | 4.09 |
| MM4-1 | Mn(OAc)$_2$/TBPB 1/0.5 | 2.5 | 25.3 | 7590 | 37100 | 6.71 |
| 2 | Mn(OAc)$_2$/TBPB 1/1 | " | 18.2 | 5460 | 49100 | 5.58 |
| 3 | Mn(OAc)$_2$/TBPB 1/1.5 | " | 15.2 | 4560 | 46000 | 4.94 |
| 4 | Mn(OAc)$_2$/TBPB 1/2 | " | 16.5 | 4950 | 44600 | 5.52 |
| 5 | Mn(OAc)$_2$/TBPB 1/2.5 | " | 18.3 | 5490 | 49200 | 4.98 |
| 6 | Mn(OAc)$_2$/TBPB 1/3 | " | 22.4 | 6720 | 55400 | 6.06 |

Figure 18:
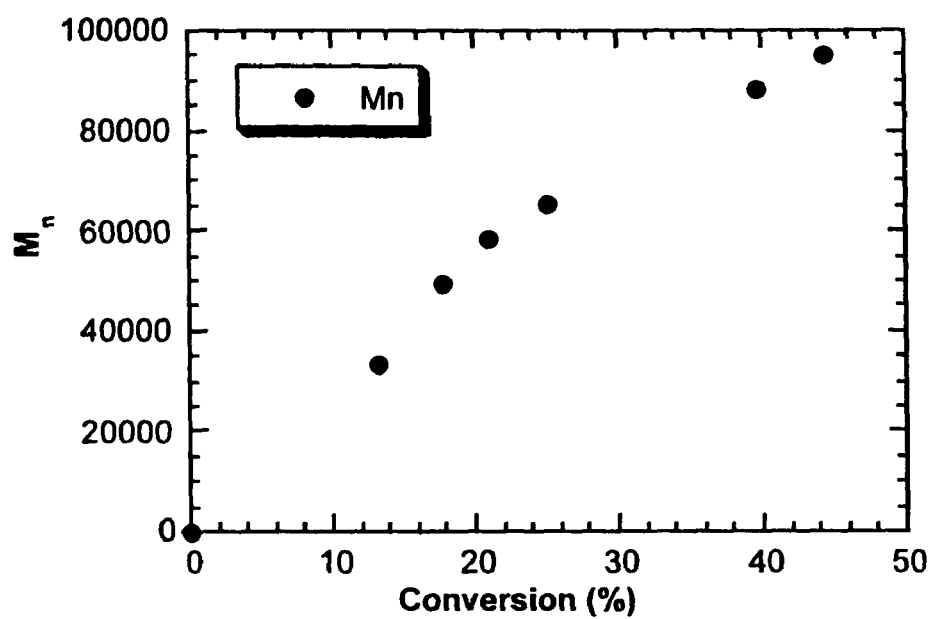
FIG. 18. is a graph showing $M_n$ vs. conversion, for different ratios $MnCl_2$/TBAC.

Exp. cond: EBIB/MnX$_2$ = 1/1, TBAC = tetrabutylammonium chloride, TBAB = tetrabutylammonium bromide By plotting $M_n$ versus conversion for the system MnCl$_2$/TBAC an increase in molecular weight with conversion was noticed (FIG. 18).

c) Chromium

Experiments using CrCl$_2$ as metal in conjunction with tetrabutylammonium chloride in the MMA polymerization was performed. The results are shown in Table 50.

TABLE 50

MMA polymerization with CrCl$_2$/TBAC

| Exp. | CrCl$_2$/TBAC | Conversion % | $M_n$ | $M_w/M_n$ |
|---|---|---|---|---|
| ChM1-1 | 1/0.5 | 8 | 40300 | 5.68 |
| 1-2 | 1/1 | 8 | 64000 | 9.52 |
| 1-3 | 1/1.5 | 4 | 61500 | 6.54 |
| 1-4 | 1/2 | 4.5 | 61700 | 4.63 |
| 1-5 | 1/2.5 | 2.5 | 74500 | 5.91 |
| 1-6 | 1/3 | 2.5 | 12480 | 12.8 |

Exp. cond.: 80° C.;
MMA/o-xylene = 1/1 v/v;
target $M_n$ = 30K;
EBIB/CrCl$_2$ = 1/1.

The invention claimed is:

1. A process of atom transfer radical addition for adding functionality to an oligomer or polymer, comprising:
   reacting a first oligomer or polymer having a radically transferable atom or group with an unsaturated second compound having a first desired functional group, the second compound reactive with the first oligomer or polymer after removal of the radically transferable atom or group, in the presence of a system comprising:
   a catalyst which participates in a reversible cycle with the first oligomer or polymer transferring the radically transferable atom or group from the first oligomer or polymer to the catalyst, forming an active species from the first oligomer or polymer that adds the unsaturated second compound to form a second oligomer or polymer and transferring the radically transferable atom or group from the catalyst to the second oligomer or polymer,
   wherein the second oligomer or polymer having the first desired functional group and the radically transferable atom or group is not reactive to the catalyst.

2. The process of claim 1, wherein the catalyst comprises a transition metal salt.

3. The process of claim 1, wherein the second compound comprises a α,α-disubstituted olefin group and the second oligomer or polymer having the radically transferable atom or group undergoes a β-elimination reaction to form a macromonomer.

4. The process of claim 1, wherein the catalyst is a transition metal complex.

5. The process of claim 4, wherein the transition metal complex comprises a transition metal and a ligand, and the process further comprises adding additional transition metal and, optionally, additional ligand.

6. The process of claim 1, further comprising reacting the second oligomer or polymer with a third compound which is reactive with the second oligomer or polymer, wherein the third compound has a second desired functional group.

7. The process of claim 6, wherein the second compound comprising the first desired functional group has a structure:

$$CH_2 = CR^1 - (CH_2)_n - X$$

wherein
$R^1$ is on selected from H, $CH_3$ or aryl;
n is an integer; and,
X is the first desired functional group.

8. The process of claim 1, wherein the first oligomer or polymer has a plurality of radically transferable atoms or groups.

9. The process of claim 6, wherein the second oligomer or polymer is one of a homotelechelic-polymer or a heterotelechelic polymer.

10. The process of claim 9, wherein the second desired functional group is subject to further reaction conditions to convert the second functional group into a third functional group.

11. The process of claim 10, wherein the third functional group comprises a double bond.

12. The process of claim 11, wherein the further reaction conditions results in a dehydrohalogenation reaction.

13. The process of claim 12, wherein the further reaction conditions includes the presence of an acid acceptor.

14. The process of claim 1, wherein the second compound is an unsaturated molecule which is not radically (co)polymerizable in the presence of the catalyst and terminates the polymer.

15. The process of claim 14, wherein the unsaturated molecule comprises a second functional group.

16. The process of claim 15, further comprising:
adding a third compound comprising a third functional group, the third compound which reacts with the first functional group incorporated on the polymer.

17. The process of claim 14, wherein the unsaturated molecule is at least one of α,α-disubstituted olefin or an allyl derivative.

18. The process of claim 6, wherein the second desired functional group comprises one of an allyl, epoxy, hydroxy, amino, cyano, carboxy, masked carboxy, alkyl, perhaloalky, silyl, silicon containing moiety or phosphorous containing moiety.

19. A process of a catalytic atom transfer functionalization of oligo/polymeric materials having one or more radically transferable atom(s) or group(s), comprising the steps:
providing a polymer having a radically transferable atom or group; and
adding a compound containing one or more α,α-disubstituted olefin group and having α-substituent groups to the polymer in the presence of a transition metal complex which undergoes a redox reaction with the radically transferable atom or group, resulting in the addition of the compound containing the α,α-disubstituted olefin group at the site of the radically transferable atom or group to form a second polymer, transfer of the radically transferable atom or group back to the second polymer, wherein the α-substituent groups of the compound containing the α,α-disubstituted olefin group are selected so that the second polymer having the radically transferable atom or group is not reactive with the transition metal complex, and results in an elimination reaction involving the radically transferable atom or group to form a reactive unsaturated group.

20. The process of claim 19, wherein the α-substituent groups on the α,α-disubstituted olefin group are individually selected from alkyl, substituted alkyl, aryl, and substituted aryl.

21. The process of claim 20, wherein one of the α-substituent groups is a methyl group and the radically transferable atom or group is a halogen, the process further comprising:
forming a functional polymer having a reactive exo-double bond through a dehydrohalogenation elimination reaction.

22. The process of claim 20, wherein one of the α-substituent groups is an aryl group and the radically transferable atom or group is a halogen, the process further comprising:
forming a functional polymer having an endo-double bond through a dehydrohalogenation elimination reaction.

23. The process of claim 22, wherein the coupling compound comprises an α-aryl styrene.

24. The process of claim 23, wherein the α-aryl styrene is selected from diphenylethylene, 1,3-bis(1-phenylethenyl)benzene, or 2,2-bis{4-(1-phenylethenyl)phenyl}propane.

25. The process of claim 19, wherein the polymeric material is an oligomer.

26. The process of claim 19, wherein one α-substituent groups on the α,α-disubstituted olefin is a methyl group and the formed double bond is predominately an exo-double bond.

27. The process of claim 26, wherein a macromonomer with a reactive exo-double bond is prepared.

28. The process of claim 19, wherein the elimination reaction is enhanced by the addition of an acid acceptor.

29. The process of claim 28, wherein the acid acceptor is selected from the group consisting of basic organic molecules, linear and heterocyclic N containing compounds, ion exchange resins or inorganic acid acceptors.

30. A process of a catalytic atom transfer coupling of polymers comprising:
providing a first polymer having a first radically transferable atom or group;
adding a coupling compound containing one or more α,α-disubstituted olefin group(s) and having α-substituent groups to the first polymer in the presence of a transition metal complex which undergoes a redox reaction with the first radically transferable atom or group, resulting in the addition of the coupling compound containing the α,α-disubstituted olefin group at the site of the first radically transferable atom or group to form an extended first polymer, transfer of the radically transferable atom or group back to the extended first polymer, wherein the α-substituent groups of the coupling compound are selected so that the extended first polymer having the radically transferable atom or group is not reactive with the transition metal complex, and results in an elimination reaction comprising the radically transferable atom or group to form a reactive double bond; and
allowing a second polymer having a second radically transferable atom or group in the presence of the transition metal complex to add to the reactive double bond.

31. The process of claim 30, wherein the first polymer and the second polymer are substantially similar.

32. The process of claim 31, further comprising:
forming a functional polymer having an endo-double bond during the elimination reaction and wherein the coupling compound comprises an α-alkyl styrene.

33. The process of claim 32, wherein the coupling compound comprises α-methyl styrene.

34. The process of claim 19, further comprising:
forming a functional polymer comprising an enol/ketone and wherein an α-substituent group comprises a hydroxyl group.

35. The process of claim 30, wherein the coupling compound is a third polymer comprising an isopropenyl group.

36. The process of claim 35, wherein the α,α-disubstituted olefin group is a pendant functional group of the third polymer.

37. The process of claim 35, wherein the extended first polymer is a graft copolymer comprising the first polymer grafted to the third polymer within the graft copolymer chain.

38. The process of claim 30, wherein the first polymer is a mixture of (co)polymers.

39. The process of claim 30, wherein the second polymer has a similar composition and molecular weight to the first polymer.

40. The process of claim 30, wherein a molar ratio of the total moles of the first polymer and the second polymer to the moles of the coupling compound is controlled to form a third polymer of a configuration of at least one of linear, star, graft, and chain extended materials containing a residue of the first polymer and the second polymer.

41. The process of claim 40, wherein the first polymer includes two transferable atoms or groups and the coupling compound contains two α,α-disubstituted olefin groups allowing the formation of a network copolymer containing multiple units of the first polymer.

42. The process of claim 40, wherein the coupling compound contains one α,α-disubstituted olefin group, the first polymer and second polymer have one radically transferable atom or group and a molar ratio of the total moles of the first polymer and the second polymer to the moles of the coupling compound is about 1:0.5.

43. The process of claim 40, wherein the coupling compound contains two α,α-disubstituted olefin groups, the first polymer and second polymer each have one radically transferable atom or group and the molar ratio of the total moles of the first polymer and the second polymer to the moles coupling compound is about 1:0.25.

44. The process of claim 43, wherein the first polymer and the second polymer differ in at least one of molecular weight and composition and a star copolymer is formed.

45. The process of claim 44, wherein a hetero-arm star copolymer is formed.

46. The process of claim 43, wherein the two $\alpha,\alpha$-disubstituted olefin groups differ in reactivity characteristics.

47. The process of claim 40, wherein the coupling compound is a compact molecule and contains three $\alpha,\alpha$-disubstituted olefin groups and wherein the molar ratio is controlled to form a star copolymer with up to six arms.

48. The process of claim 30, wherein the coupling compound contains two $\alpha,\alpha$-disubstituted olefin groups of different reactivities and the first polymer and second polymer each have two radically transferable atoms or groups resulting in one of an extended chain or coupled polymer with an $\alpha,\alpha$-disubstituted olefin group within the chain.

49. The process of claim 40, wherein the coupling compound contains three $\alpha,\alpha$-disubstituted olefin groups and the molar ratio of the total moles of the first polymer and the second polymer to the moles coupling compound is controlled to form a star polymer with up to six arms.

50. The process according to 40, wherein the molar ration is 1:0.167.

51. The process of claim 30, wherein the coupling compound comprises a third polymer.

* * * * *